(12) United States Patent
Graves

(10) Patent No.: US 6,657,186 B2
(45) Date of Patent: Dec. 2, 2003

(54) CHROMATIC DISPERSION DISCRIMINATOR

(75) Inventor: Alan F. Graves, Kanata (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 10/175,065

(22) Filed: Jun. 20, 2002

(65) Prior Publication Data

US 2002/0158191 A1 Oct. 31, 2002

Related U.S. Application Data

(63) Continuation-in-part of application No. 09/842,236, filed on Apr. 26, 2001, now Pat. No. 6,586,724.

(51) Int. Cl.[7] .............................................. G01N 21/25
(52) U.S. Cl. ............................ 250/227.23; 250/227.18; 356/451
(58) Field of Search ........................ 250/227.23, 227.18, 250/227.21, 216, 226; 356/451, 456, 460, 73.1; 359/124, 129, 244, 247

(56) References Cited

U.S. PATENT DOCUMENTS 6,590,910 B2 * 7/2003 Lin .............................. 372/18

OTHER PUBLICATIONS

Eggleton, Benjamin J., *Dynamic dispersion compensation devices for high speed transmission systems*. 2000 Optical Society of America. pp. WH1–1 to WH1–3, OCIS codes: (060.2330) Fiber optics communications, 060.2360 Fiber optics links and subsystems, No date.

Madsen, C.K., *Chromatic and Polarization Mode Dispersion Measurement Technique using Phase–Sensitive Sideband Detection*. 2000 Optical Society of America, pp. M06–1–1to M06–3, OCIS codes: (060.0060) Fiber optics and optical communications, (130.3120) Integrated optics devices.

Strikant, V., *Broadband dispersion and dispersion slope compensation in high bit rate and ultra long haul systems*. 2000 Optical Society of America. pp. TuH1–1 to TuH1–3, OCIS codes: (000.0000) General, No date.

Toshiaki, Okuno, O. Toshihiro, K. Takatoshi, Y. Yokoyama, M. Yoshida, Y. Takahashi, M. Yoshinori and M. Nishimura, *Optimum dispersion of non–zero dispersion shifted fiber for high rate DWDM systems*. 2000 Optical Society of America. pp. TuH4–1 to TuH4–3, OCIS codes: (060.2330) Fiber optics communications, No date.

Anderson Ken E. and Kelvin H. Wagner, *Chromatic and Polarization Mode Dispersion Compensation Using Spectral Holography*. 2000 Optical Society of America. OFC pp. 1 to 3, No date.

(List continued on next page.)

Primary Examiner—Que T. Le

(57) ABSTRACT

A dispersion discriminator and method for determining the amount of dispersion in an optical signal. The discriminator includes first and second dispersion arms for causing first and second additional amounts of dispersion to be added in first and second portions of the optical signal, respectively. The first and second additional amounts are of opposite polarities and preferably of substantially equal magnitude. The discriminator includes a detector capable of receiving the first and second portions of the optical signal from the arms; detecting, for each of a plurality of frequencies, a difference in a characteristic of the first and second portions; determining a particular frequency at which the difference falls outside a predetermined range; and mapping the particular frequency and the difference at that frequency to a magnitude of dispersion in the optical signal. Advantageously, this allows the dispersion of an optical link to be measured without knowledge of the spectrum of the optical signal travelling on that link.

37 Claims, 28 Drawing Sheets

OTHER PUBLICATIONS

Yu Q. and Willner A.E., *Comparison of optical PMD compensation using a variable and fixed differential group delays*.2000 Optical Society of America (3 pages), OCIS codes: (060.2330) Fiber optics communications; (060.2360) Fiber optics links and subsystems, No date.

Petersen M. N., Z. Pan, Lee, S. A. Havstad and A. E. Willner, *Dispersion monitoring and compensation using a single inband subcarrier tone*. 2000 Optical Society of America (3 pages), OCIS codes: (060.2330) Fiber optics communications; (060.2360) Fiber optics links and subsystems, No date.

Karlsson, Magnus Chongjin Xie, Henrik Sunnerud, and Peter A. Andrekson, *Higher Order Polarization Mode Dispersion Compensator with Three Degrees of Freedom*. 2000 Optical Society of America (3 pages), OCIS codes: (060.0060) Fiber optics and optical communications; (260.2030) Dispersion; (260.5430) Polarization, No date.

Le Quan, Torben Veng and Lars Grüner–Nielsen, *New dispersion compensating module for compensation of dispersion and dispersion slope of non–zero dispersion fibres in the C–band*, 2001 Optical Society of America, pp. TuH5–1 to TuH5–3, No date.

Shirasaki, M. and S. Cao, *Compensation of chromatic dispersion and dispersion slope using a virtually imaged phased array*, pp. TuS1–1 to TuS1–3, No date.

Takenouchi, Hirokazu, Takashi Goh and Ishii Tetsuyoshi. *2×40–channel dispersion–slope compensator for 40–Gbit/s WDM transmission systems covering entire C–and L–bands*. 2000 Optical Society of America, pp. TuS2–1 to TuS2–3, No date.

Pan, Z., Q. Yu, Y. Xie, S.A. Havstad, A.E. Willner, D.S. Starodubov and J. Feinberg, *Chromatic dispersion monitoring and automated compensation for NRZ and RZ data using clock regeneration and fading without adding signaling*. 2000 Optical Society of America (3 pages), OCIS codes: (060.2330) Fiber optics communications; (060.2360) Fiber optics links and subsystems, No date.

Zhu, B., L. Leng, L. E. Nelson, S. Stulz, T.N. Nielsen, and D. A. Fishman, *Experimental Investigation of Dispersion Maps for 40 ×10 Gb/s Transmission over 1600 km of Fiber with 100–km Spans Employing Distributed Raman Amplification*.2000 Optical Society of America, pp. TuN3–1 to TuN3–3, OCIS codes: (060.2330) Fiber optics communications; (060.0060) Fiber optics and optical communication, No date.

* cited by examiner ly assigned, U.S. patent application Ser. No.
CHROMATIC DISPERSION DISCRIMINATOR

CROSS-REFERENCES TO RELATED APPLICATIONS

The present application is a continuation-in-part of commonly assigned, U.S. patent application Ser. No. 09/842,236 to Graves, entitled "Chromatic Dispersion Discriminator", filed on Apr. 26, 2001, now U.S. Pat. No. 6,586,724, and hereby incorporated by reference herein.

The present invention is also related in subject matter to commonly assigned, U.S. patent application Ser. No. 10/108,514, entitled "Dispersion Discrimination For Wideband Optical Signals", filed on Mar. 29, 2002 and incorporated by reference herein.

The present invention is also related in subject matter to commonly assigned, U.S. patent application Ser. No. 09/965,810, entitled "Dispersion Discrimination And Compensation System And Optical Switch For Use Therewith", filed on Oct. 2, 2001 and incorporated by reference herein.

FIELD OF THE INVENTION

This invention relates to chromatic dispersion in optical systems, and more particularly to detection or discrimination of chromatic dispersion in optical signals used by optical transmission systems.

BACKGROUND OF THE INVENTION

Current optical fibers have a property known as chromatic dispersion which causes light transmitted along the fiber to experience an amount of propagation delay that is dependent on the frequency, or wavelength, of the light. Optical signals transmitted over these fibers by optical transmission systems are modulated carrier signals which exhibit an optical bandwidth determined by the upper and lower modulation sidebands containing different optical frequencies (higher for upper sideband, lower for lower sideband). These different frequency components of an optical signal will experience different amounts of propagation delay, depending on the frequency (or wavelength) of the component, as the optical signal travels along the fiber, resulting in non-coincident (in time) reception at the far end receiver. The resulting variance in propagation delays among the different frequency components changes the optical signal, thereby making error-free demodulation of the signal more difficult.

At a particular frequency, an optical fiber has a "null" point at which the propagation speed is highest and hence the propagation delay is minimum. On either side of this peak propagation speed, propagation speed diminishes and propagation delay increases. Since dispersion is defined as the change in propagation delay relative to frequency (or wavelength), the dispersion at the null point will be zero and it will be opposite in polarity on either side of this point. The positive dispersion of one type of fiber can be used to approximately compensate for the negative dispersion of another type of fiber, and in this way optical links can be engineered to have minimal dispersion over a narrow frequency (or wavelength) range.

However, in dense wavelength division multiplexed (DWDM) systems, which typically have anywhere from 40 to 160 DWDM optical signals modulated on carriers spaced apart at 50–100 GHz and using optical carriers in the 1520–1580 nm range, engineering optical links to provide minimal dispersion for all of the DWDM optical signals is difficult, if at all possible, because of the wide range in frequency (or wavelength) of the signals. This becomes more difficult still as new transmission bands are added (L=long wavelength, beyond about 1600 nm, S=short wavelength, below about 1500 nm). Typically, the amount of dispersion imparted on a group of DWDM optical signals transmitted over an optical link will vary significantly across the range of signals. When these DWDM signals are switched with optical signals from other optical links having different dispersion characteristics, the result is a new group of DWDM optical signals having an even wider, and now non-systematic variance in dispersion across the range of signals. This result is most prevalent in versions of automatically switched optical networks (ASON) which use purely photonic switches (as opposed to electro-optical switches and transponders) because the links over which optical signals travel between source and destination nodes in the network change dynamically to adapt to changing traffic demands placed on the network.

Therefore, it would be desirable to have a means of detecting the amount of dispersion in individual optical signals received over a dispersive optical link or at least discriminating which polarity of chromatic dispersion is present, thereby allowing the correct amount of dispersion compensation to be applied to each optical signal, in either an open-loop (magnitude/polarity detection) or closed loop (residual polarity detection) application.

SUMMARY OF THE INVENTION

The invention uses the chromatic dispersive properties of two or more different types of optical fibers in order to determine the polarity and magnitude of dispersion that a received optical signal has undergone as a result of being transmitted over one or more dispersive optical links. Embodiments of the invention offer the advantage of allowing dispersion detection or discrimination to be performed on a per wavelength basis which is the first step to enabling compensation to be performed on individual optical signals on the basis of the amount of dispersion each optical carrier signal has undergone during transmission over an optical link, thereby allowing for more accurate dispersion compensation as compared to means employing engineered links which provide predetermined dispersion compensation. Embodiments of the invention also offer the advantage of allowing the dispersion of an optical link to be measured without requiring knowledge of the spectrum of the optical signal travelling on that link.

According to a first broad aspect of the present invention, there is provided a dispersion discriminator for determining the amount of dispersion in an amplitude modulated optical signal. The amplitude modulated optical signal is a double side band signal such as may be produced by Amplitude Shift Keying (ASK), which is the on-off, or quasi on-off, amplitude modulation used in conventional optical systems. The dispersion discriminator includes a first dispersion arm for causing a first additional amount of dispersion in a first portion of the optical signal and a second dispersion arm for causing a second additional amount of dispersion in a second portion of the optical signal, the first and second additional amounts being of opposite polarities. Preferably, the magnitude of the first additional amount of dispersion is substantially equal to the magnitude of the second additional amount of dispersion, which leads to technical advantages such as increased detection sensitivity.

The dispersion discriminator further includes a dispersion detector capable of receiving the first and second portions of the optical signal from the respective dispersion arms;

detecting, for each of a plurality of electrical frequencies, a difference in a characteristic of the first and second portions of the optical signal; determining a particular electrical frequency at which said difference falls outside a predetermined range; and mapping the particular electrical frequency and the difference at the particular electrical frequency to a magnitude of dispersion in the optical signal.

According to a second broad aspect, the present invention may be summarized as a method of determining an amount of dispersion in an amplitude modulated optical signal from first and second portions of the optical signal, the first portion of the optical signal having travelled along a first dispersion arm that adds a first additional amount of dispersion, the second portion of the optical signal having travelled along a second dispersion arm that adds a second additional amount of dispersion, the first and second additional amounts being of opposite polarity. The method includes receiving the first and second portions of the optical signal from the respective dispersion arms, detecting (for each of a plurality of electrical frequencies) a difference in a characteristic of the first and second portions of the optical signal, determining a particular electrical frequency at which said difference falls outside a predetermined range and mapping the particular electrical frequency and the difference at the particular electrical frequency to a magnitude of dispersion in the optical signal.

These and various other aspects of the present invention will best be understood upon a reading of the following detailed description of specific embodiments of the invention in conjunction with the accompanying drawings.

DETAILED DESCRIPTION OF THE PREFERRED EMBODIMENTS

Figure 1:
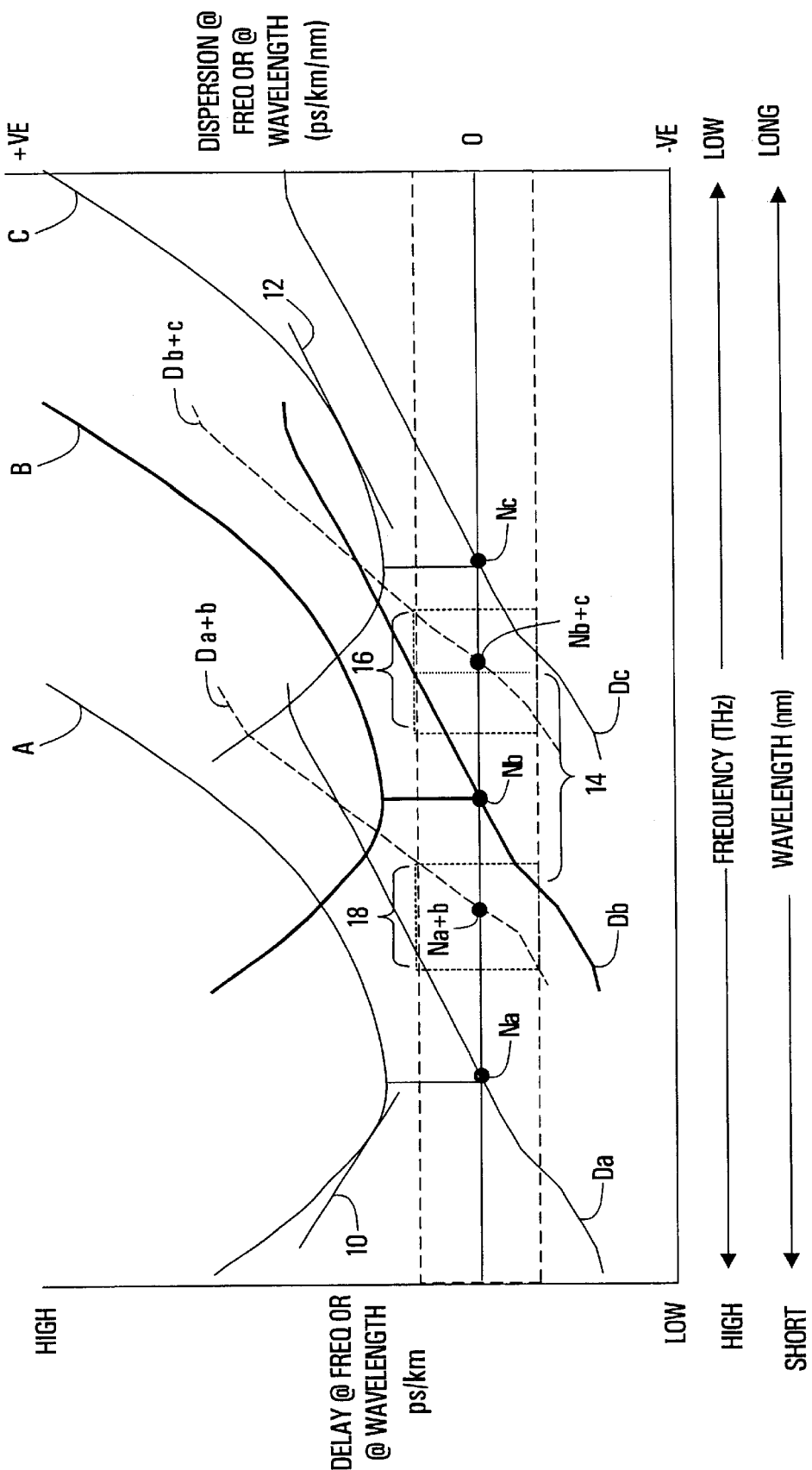
FIG. 1 is a graph showing the transmission delay and resultant dispersive properties against optical wavelength or frequency for three different types of fibers and links composed of these fiber types.

Optical fiber provides a maximum velocity of propagation for light at only one band of wavelengths, and at other wavelengths above and below this band it shows a slightly lower velocity of propagation. This manifests itself as a delay through a long optical fiber path that is related to the optical carrier frequency or wavelength. The point at which maximum velocity is achieved can be moved by changing the design of the fiber or its material system, but the same basic generic shape is usually followed. Delay, per se, is not a problem. However, the fact that the delay has a frequency/wavelength-sensitive component is a problem because, for any given optical carrier that is modulated with data, it will contain information-related side bands at slightly different optical frequencies.

For example, a 10 GHz wide modulation signal on a 194 THz optical carrier will have components at 193.99–194.01 THz, or from 193,990 GHz to 194,010 GHz. Since the data is amplitude modulated on to the optical carrier (usually in an Amplitude Shift Key or quasi-on/off mode) the modulated carrier will exhibit two side-bands, namely, an upper and a lower side-band. If the delay varies across the frequencies occupied by this modulated carrier, then the upper side-band will propagate at a slightly different speed to the carrier and the lower side-band will exhibit an equal but opposite effect. This can give rise to destructive interference or cancellation of some of the sideband spectral components at the receiver, if the phase shift of those components at a particular frequency approaches +/−90 degrees (or 180 degrees total between the sidebands). At an angle of +/−45 degrees (or 90 degrees total between the sidebands), the cancellation is less severe, resulting in a 3 dB attenuation. The slope of the delay with wavelength or frequency (i.e. the differential of the delay with frequency or wavelength) is known as chromatic dispersion and is expressed in units of time by units of wavelength or frequency (e.g., ps/nm or ps/GHz). Since chromatic dispersion is usually linearly additive along a fiber, the measure of fiber dispersion is usually normalized to a standard length, e.g. 1 km in which case the fiber dispersion performance would be expressed as ps/nm-km or ps/GHz-km. Both forms of expressing dispersion are valid but one results in the dispersion having approximately $1/130^{th}$–$1/140^{th}$ of the numeric value and the opposite sign (since wavelength is inversely proportional to frequency).

Conventionally, dispersion is specified relative to optical carrier wavelength, but when dealing with information sidebands from known bit-rate modulation, it is more convenient to use optical carrier frequencies. Specifying dispersion relative to frequency also matches the specification of the International Telecommunication Union (ITU) DWDM grid, which is on a frequency plan with 100 GHz increments though these are often expressed in terms of resultant wavelengths. Hereinafter, either frequency relative dispersion or wavelength relative dispersion figures will be used according to which type of dispersion figure simplifies the explanation of the invention.

For any given type of optical fiber, there is a "null" point at a given frequency, depending on the dispersive properties of the fiber, where the delay is a minimum and hence the dispersion is zero. The amounts of dispersion on either side of this null point are opposite in polarity. Different fibers have different zero dispersion "null" points and hence have different dispersion values at any given wavelength. The slope of the dispersion characteristics is always positive and is just left-shifted or right-shifted. Also, longer fiber paths will show a proportionally greater slope as well as a greater absolute value of dispersion.

FIG. 1 shows three propagation delay curves characteristics, A, B, and C of delay versus optical wavelength or frequency for three different types of fiber, each having a different dispersion characteristic, and their corresponding dispersion curves Da, Db, and Dc, dispersion being defined as the rate of change of propagation delay with optical frequency or wavelength. A line 10 shows the slope of a portion of the first delay curve A in which the dispersion is positive relative to increasing carrier frequency. Positive dispersion means that higher frequency signals propagate slower than the lower frequency signals and hence become phase-delayed. Another line 12 shows the slope of a portion of the third delay curve C in which the dispersion is negative relative to increasing carrier frequency. Negative dispersion means that higher frequencies signals propagate faster than lower frequencies signals and hence become phase-advanced. The respective null points for the dispersion curves Da, Db, and Dc are the frequencies where dispersion is zero and are shown as points Na, Nb, and Nc.

The second dispersion curve Db shows dispersion from a fiber that is part of a transmission link. Overlaid on this curve Db is an arbitrary "low dispersion" window 14, over which an arbitrary transmission system would perform well. By adding a compensating length of fiber having a dispersion characteristic matching the third dispersion curve Dc in the central office (CO) and in series with the transmission link fiber, it is possible to shift up in wavelength (down in frequency) the band of received wavelengths over which the arbitrary transmission system would work. However, this shift is done with the penalty of reducing the width of the original "low dispersion" window 14 (since the optical path is now significantly longer), resulting in the new dispersion window 16 for the fourth dispersion curve Db+c, which has a new point Nb+c of zero dispersion. A similar but opposite effect can be achieved by using instead a third fiber having a dispersion characteristic matching the first dispersion curve Da, which would result in another window 18 of low dispersion and a fifth dispersion curve Da+b, which has a new point Na+b of zero dispersion. This dispersion compensation technique can be used to make a transmission system operating across the entire three windows of low dispersion (14, 16, 18) by first demultiplexing a received DWDM signal into groups of carriers, each group falling within a particular low dispersion window, and then passing the signals of each group through a length of fiber, that provides adequate dispersion compensation for the signals in that group. Alternatively the fiber transmission path itself can be composed of a concatenated mixture of fiber types, using fibers of dispersion values that compensate, or partially compensate, for each other.

Figure 2:
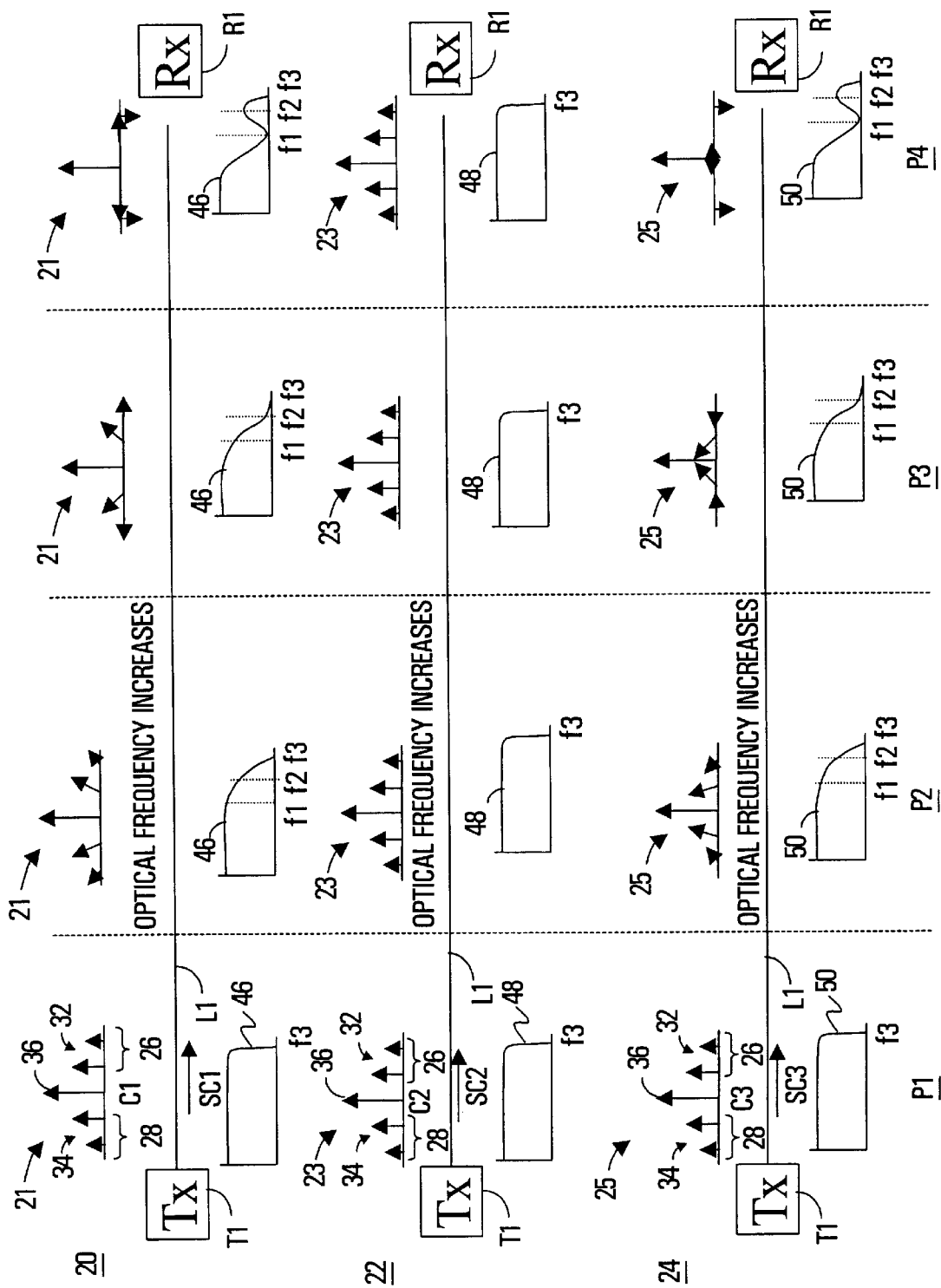
FIG. 2 is a diagram showing the effects of dispersion on the transmission of optical signals for three different cases: negative dispersion, zero dispersion, and positive dispersion.
Figure 2A:
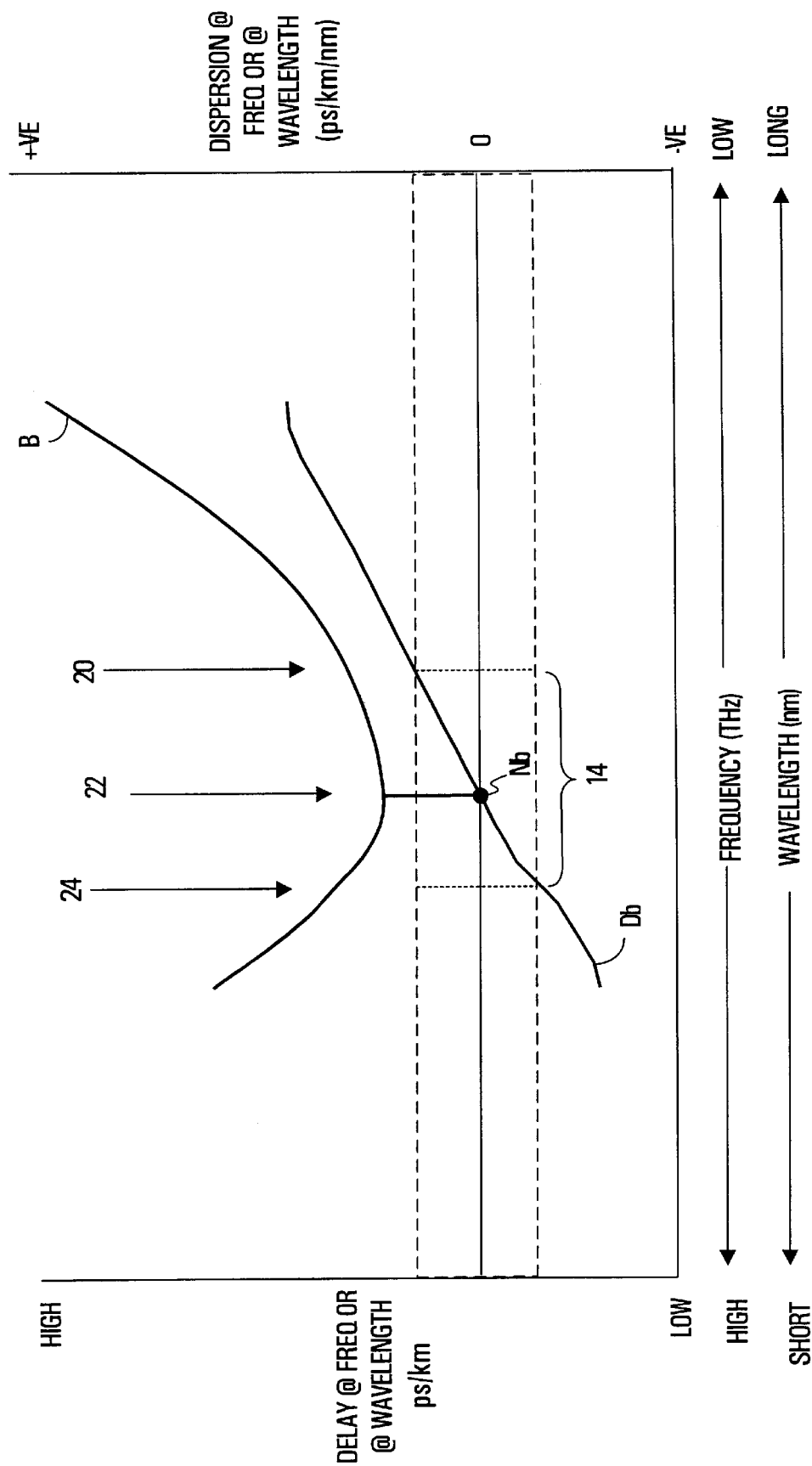
FIG. 2a displays the central dispersion curve of FIG. 1 and shows the locations along this curve that the three cases of dispersion in FIG. 2 occur.

Referring to FIGS. 2 and 2a the effects of dispersion on the transmission of optical signals will now be explained. FIG. 2 shows the effects of dispersion on the transmission of optical signals for three different cases: negative dispersion 20, zero dispersion 22, and positive dispersion 24. FIG. 2a shows the relationship between the responses for positive 24, negative 20 and null dispersion 22 and where such responses would occur, on a normal fiber propagation delay or dispersion plot. In each case, an optical signal SC1, SC2, SC3 is transmitted from an optical transmitter T1 over a dispersive optical transmission link L1 and received by an optical receiver R1. However, the frequency of the optical carrier C1, C2, C3 is different from one case to another such that the dispersion undergone by the optical signals as they propagate along the transmission link L1 is different in each case. A phase-amplitude diagram 21, 23, 25 of the amplitude and phase relationship of the side-band and carrier components of each signal and a power spectrum diagram 46, 48, 50 after normal envelope detection of each signal is provided for each case at four different points (P1, P2, P3, and P4) along the link L1. In the phase-amplitude diagrams, an arrow rotation from the vertical represents a phase shift at a particular modulation side-band frequency and the distance from the center optical carrier arrow to the base of the sideband arrow is representative of the modulation frequency. Hence higher modulation frequencies are further from the central optical carrier arrow. The modulation format is assumed to be standard Amplitude Shift Key, where a "one" represents a "high" and "zero" represents a "low", as is normal in fiber optic systems, and which produces a symmetrical double sideband signal, though the results are true for any double sideband signal and hence could be applied to QAM-type signals (although not VSB analog TV signals since these are not double sideband signals).

Referring to the zero dispersion case 22, an amplitude modulated communication signal transmitted optically will have upper 26 and lower 28 side-band components containing the actual information and spreading out over an overall signal spectrum, including example spectral components labelled f1, f2, f3 of the data rate on either side of the optical carrier C2. In a system having zero dispersion, these sidebands (26, 28) will maintain their time-relationships to each other as shown by arrows 32, 34, 36 which represent the amplitude and relative phase of the upper side band components 26, lower side band components 28, and carrier components C2, respectively.

Referring to the positive dispersion case 24, the upper side-band 26 is propagated more slowly than the carrier C3 and so the upper side-band components, represented by the arrows 32, become progressively more phase-lagged relative to the carrier C3, with both increasing fiber path length and increasing sideband modulation frequency (which results in a larger difference in the sideband optical frequency and the optical carrier frequency). Accordingly, the arrows 32 representing the upper side-band components are shown rotated anti-clockwise, representing a phase lag, resulting in their rotating towards the carrier C3. At the same time, the lower side-band 28 is propagated more quickly than the carrier C3 and so the lower side-band components, represented by the arrows 34, become phase-advanced relative to the carrier C3, resulting in their phase vector becoming advanced, which is shown by clockwise rotation. Accordingly, the arrows 34 representing in the lower side-band components are shown rotated towards the carrier C3. This phase shifting effect is proportional to the difference in frequency that separates the individual side-bands from the optical carrier and is proportional to the amount of dispersion on the link (i.e., the transmission distance in a uniform dispersive fiber). When the phase shift of the higher harmonic f2 components of the side-bands 26, 28 has reached +/−90 degrees, as shown at point P3, they will completely cancel out each other in the double sideband spectrum detector used in a typical optical receiver. The result is that the information carried by these harmonics f2 in the side-bands 26, 28 will be lost. At longer lengths, these higher harmonic f2 components are shifted by more than +/−90 degrees, and when they reach +/−180 degrees, as shown at point P4, they again fully constructively add in the detection process in the receiver R1, but are inverted in polarity, relative to the lower harmonic f1 components of the signal. However, if the highest frequency components are rotated +/−180 degrees, then the frequency components half way to the upper frequency are rotated +/−90 degrees and therefore cancel each other out, creating a broad notch at the harmonic f1 in the received signal, rendering it useless. The onset of problems occurs with less than a 90 degree phase shift of the higher harmonic f2 components, since even a +/−45 degree phase shift is enough to reduce the amplitude of these components by 3 dB, as shown at point P2.

Referring to the negative dispersion case 20, the power spectrum diagram 46 is the same at each of the points (P1, P2, P3, P4) along the link L1 as that of the positive dispersion case 24, however this results from an opposite effect of dispersion as can be observed from the phase-amplitude diagram 21, which shows the upper and lower side-band components rotated away from the carrier C1.

Figure 3:
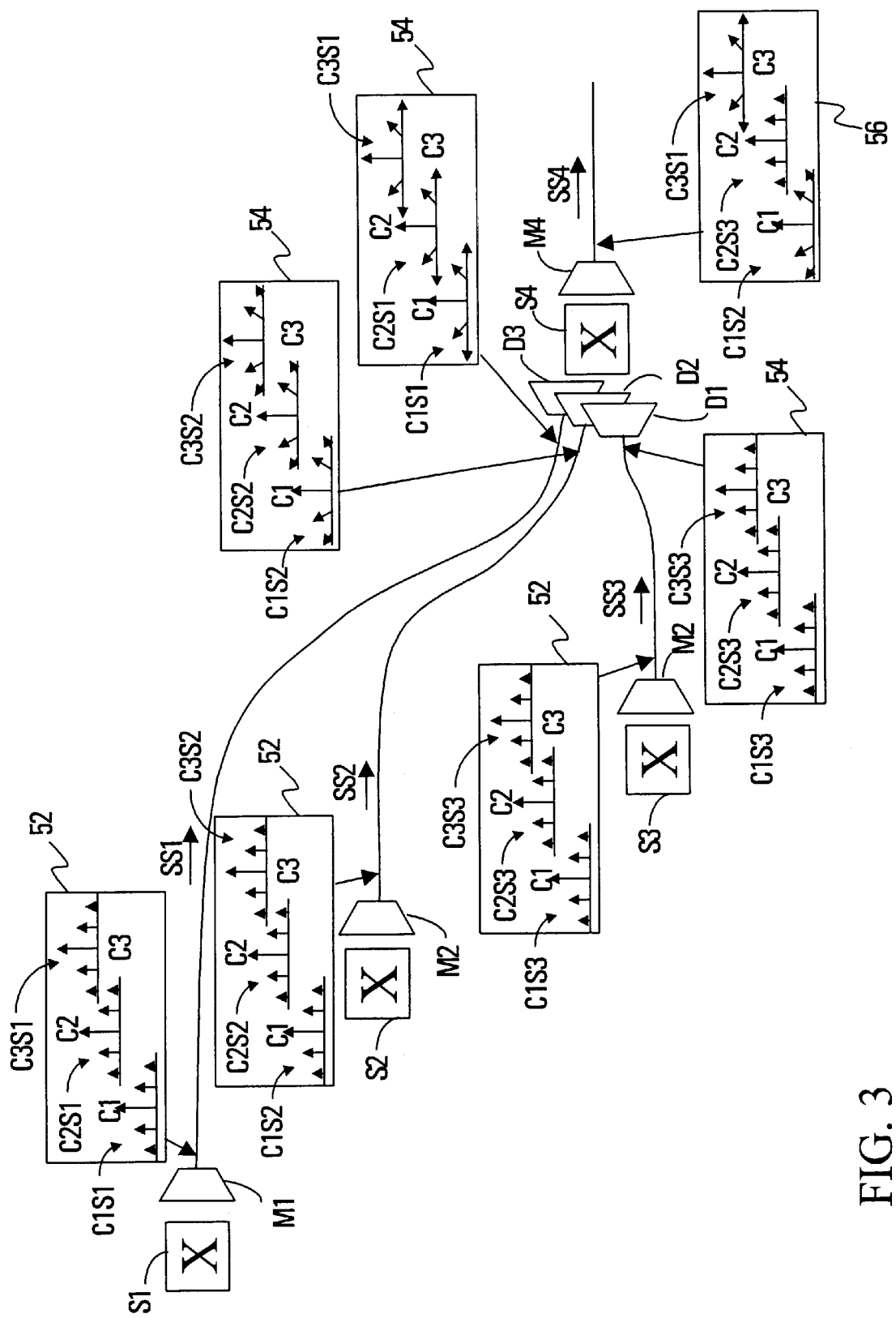
FIG. 3 is a schematic diagram showing how adjacent wavelengths in an output DWDM stream from a photonically interconnected node may have completely different ancestries and hence dispersion impairments.

FIG. 3 shows how adjacent wavelengths in an output DWDM stream may have completely different ancestries and hence impairments. Consequently, either broadband lambda-by-lambda compensators need to be strategically placed throughout the network, or dispersion must be compensated on a node-by-node basis.

FIG. 3 shows three switches S1, S2, S3, which have respective multiplexers M1, M2, M3 that each multiplex three DWDM signals of different carrier frequencies C1, C2, C3 into a single respective DWDM stream SS1, SS2, SS3 and transmit them to another switch S4. Shown in the figure are phase-amplitude diagrams 52 for each DWDM signal immediately after transmission onto a transmission link connected to the lambda-granular photonic switch S4. The various links feeding switch S4 have different ancestries (paths from source) and hence different and usually uncorrelated dispersion characteristics, hence the DWDM streams SS1, SS2, SS3 undergo different amounts of dispersion while propagating along their respective links. The signals in the stream SS1 output by the switch S1 are C1S1, C2S1, and C3S1; the signals in the stream SS2 output by the switch S2 are C1S2, C2S2, and C3S2; and the signals in the stream SS3 output by the switch S3 are C1S3, C2S3, and C3S3. The switch S4 has three demultiplexers D1, D2, D3, each of which receives one of the streams and demultiplexes into its constituent DWDM signals. As shown by the phase-amplitude diagrams 54 at the end of the links, the DWDM signals received by the demultiplexer D1 have undergone no chromatic dispersion, while the signals received by the demultiplexer D2 have undergone some positive dispersion, and the signals received at the demultiplexer D3 have undergone even more positive dispersion. After the signals have been routed by the switch S4, a multiplexer M4 combines the DWDM signals C1S2, C2S3, and C3S1 into an output DWDM stream SS4. As shown by the phase-amplitude diagram 56 at the output of the multiplexer M4, the resulting output stream SS4 includes three DWDM signals each with a different amount of dispersion, and consequently requiring a different amount of dispersion compensation.

Figure 4:
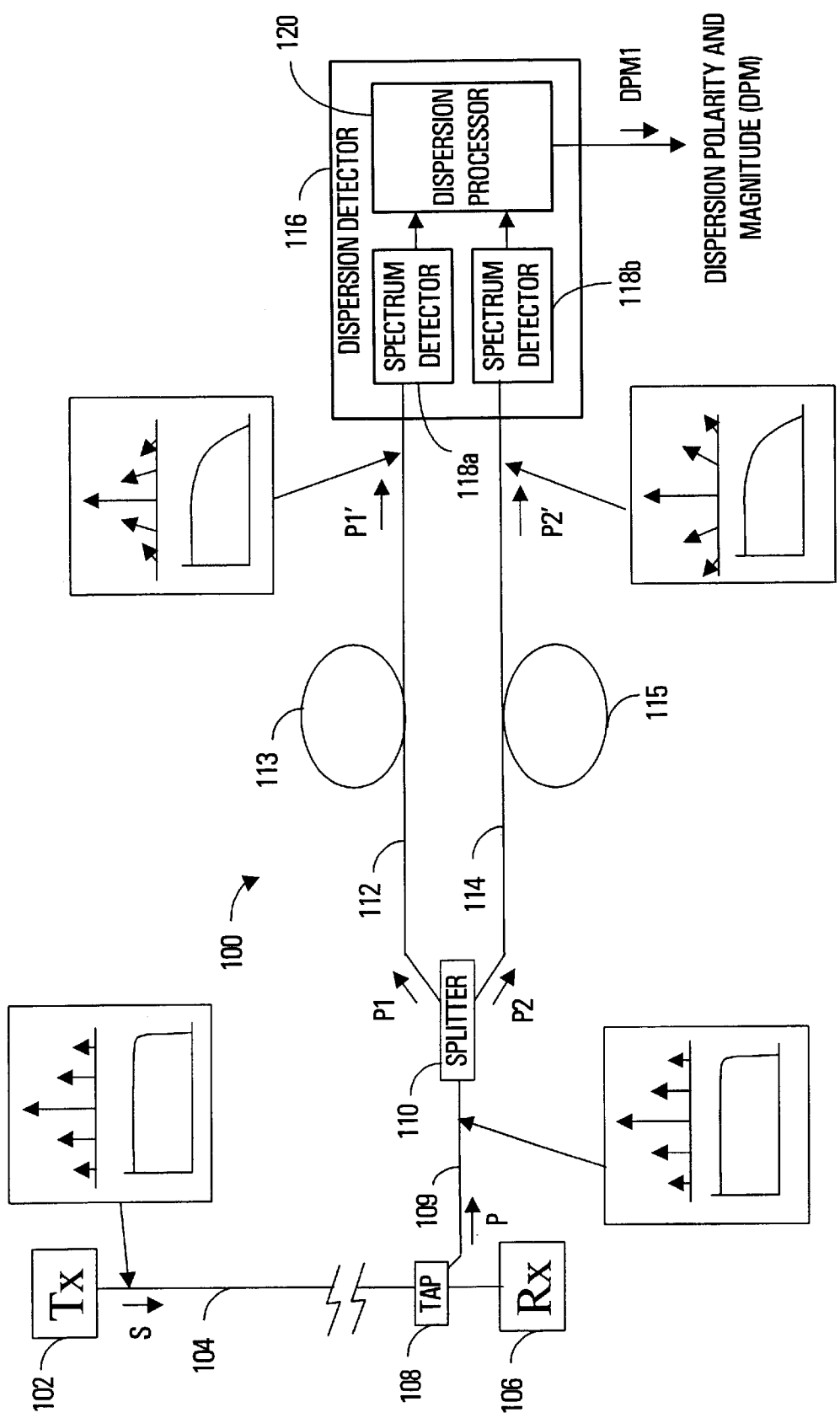
FIG. 4 is a high-level block diagram of a dispersion discriminator in accordance with a first embodiment of the invention.
Figure 4A:
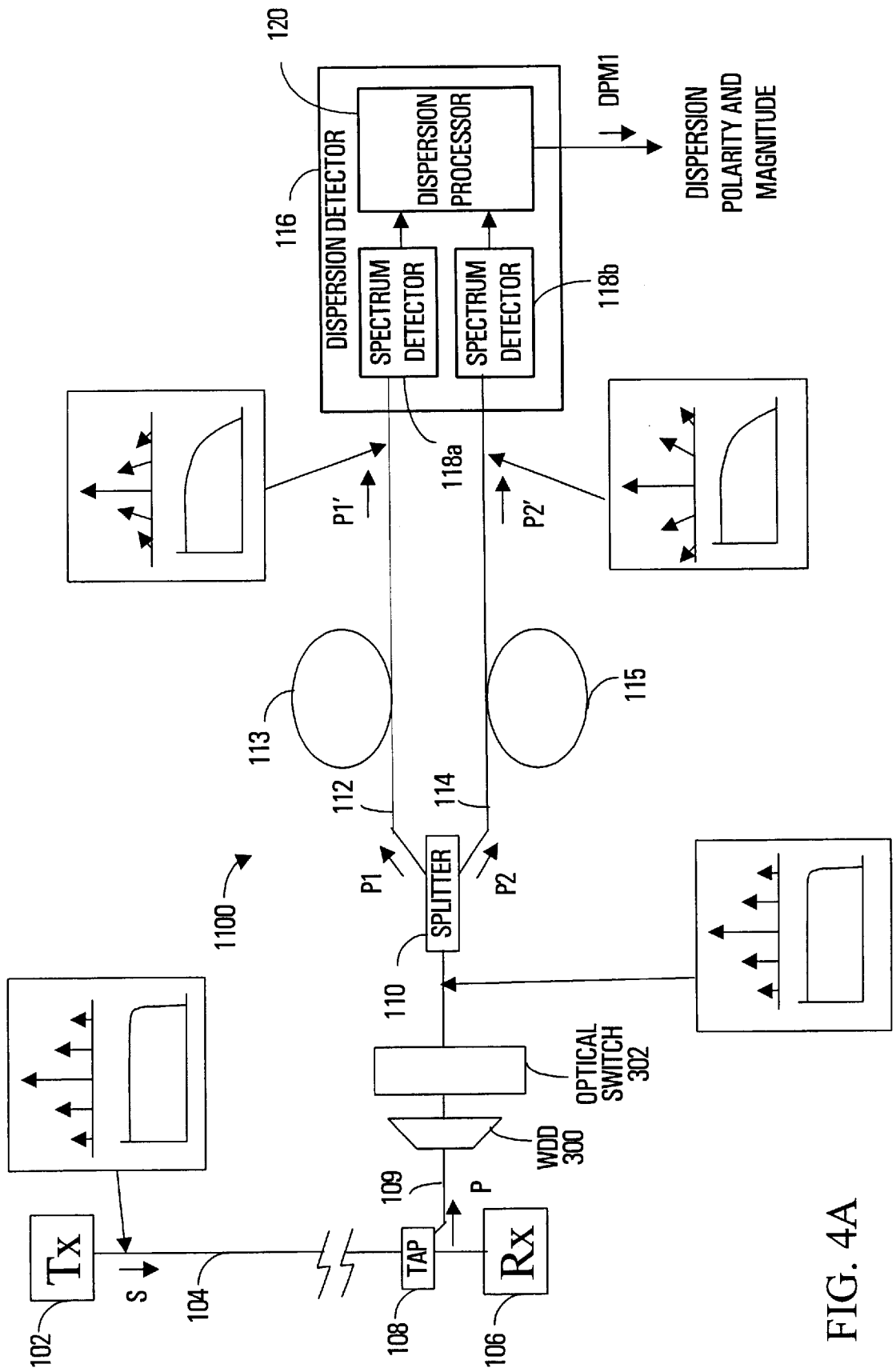
FIG. 4a is a high-level block diagram of a dispersion discriminator in accordance with a second embodiment of the invention.

FIG. 4 shows, in a high-level block diagram, a dispersion discriminator 100 in accordance with a first embodiment of the invention. The dispersion discriminator 100 is coupled to part of an optical transmission system (102, 104, 108, 106) and measures the dispersion along that system. In this case, an optical transmitter 102 transmits an optical signal S over a zero dispersion transmission path 104 of unknown dispersion, which is to be measured, and which is terminated by an optical receiver 106. In the case shown in FIG. 4, the level of dispersion shown in the transmission path is zero, to allow the clear illustration of the effects of the discriminator arms, but as will be shown later, this need not be the case. An optical tap 108 coupled to the link 104 taps a portion P of the signal S and routes this portion P over a short optical fiber 109 to the dispersion discriminator 100, which operates by dividing the signal into two equal portions and adding additional dispersion, ideally of equal magnitude but opposite sign, to each of the portions. The portion P is received by the discriminator 100 which includes an optical splitter 110 coupled to the fiber 109 at its input and to one end of a positive dispersion arm 112 at one of its outputs and to one end of a negative dispersion arm 114 at its other output.

The splitter 110 divides the signal P into two portions represented by signals P1 and P2. The signal P1 traverses the positive dispersion arm 112, which comprises a coil of fiber 113 or other controlled dispersive element, which exhibits positive dispersion at the optical frequency (or wavelength) of interest, and the signal P2 traverses the negative dispersion arm 114, which comprises a coil of fiber 115 or other controlled dispersive element, which exhibits negative dispersion at the optical frequency (or wavelength) of interest. The two signals P1 and P2 are received by a dispersion detector 116 that is coupled to the positive 112 and negative 114 dispersion arms at their other ends and operates to compute the input dispersion from the fiber link, based entirely upon the differences in the two received signals from the two dispersive arms 112, 114, thereby being independent of the actual spectral content from the source, since this would affect both arm outputs in the same manner, whereas the discriminator examines power spectral density differences between the two arms. Thus the discriminator 100 is able to determine the phase shift of the signal S after propagating along the transmission link 104 by adding a small amount of positive and negative dispersion to parts P1 and P2 of the signal S, via the positive 112 and negative 114 dispersion arms, and examining the impact on the signals P1' and P2' received at the dispersion detector 116.

Specifically, the signals P1' and P2' are analyzed by passing them through two conventional spectrum detectors 118$a$ and 118$b$ coupled to the arms 112, 114. A processor 120 coupled to the detectors 118$a$, 118$b$ analyzes the respective signals E1, E2 from the detectors 118$a$, 118$b$, determines the polarity and magnitude of dispersion in the signal S, and outputs the resulting determination in a dispersion polarity and magnitude (DPM) output signal DPM1. The output signal DPM1 gives an indication of polarity and magnitude of dispersion in the optical signal input to the dispersion discriminator, and a dispersion compensator for compensating the dispersion can use this indication.

In a "balanced" (i.e., no transmission dispersion) case, these two detectors 118$a$ and 118$b$ will show nominally identical outputs. However, if the signal S has undergone dispersion from propagating along the transmission link 104, the detector 118$a$ or 118$b$ on the discriminator arm 112, 114 with the same dispersion polarity will show a signal degradation (i.e., increased high frequency loss) whilst the detector 118$a$ or 118$b$ on the other arm 114, 112 will show a relative improvement. In a balanced zero dispersion case as shown in FIG. 4, the discriminator will show a high frequency roll-off due to its internal dispersion, necessary for the discriminator to work, at W GHz, where W is derived from the following mathematical calculations.

For the Positive Dispersion Arm:

F(−3 dB)=frequency at which spectral line in modulation has rotated 45 degrees or ⅛ of complete cycle at the modulation frequency. For "y" km of "z" ns/km-GHz dispersion fiber in the discriminator, this is equal to a frequency of "W" GHz where dispersive delay=y·z·W ns at frequency W. For a 45 degree phase shift at W GHz, the delay is equal to 0.125 cycle or 0.125/W (ns). This results in the equation:

$$|y*z*W|=0.125/W \text{ or } W2=0.125/|y*z| \text{ or } W=(0.125/|y*z|)^{1/2} \quad \text{EQ.1}$$

If the units of dispersion are ps/GHz-km then EQ. 1 modifies to:

$$W=(125/|y*z|)^{1/2} \quad \text{EQ.2}$$

For the Negative Dispersion Arm:

F (−3 dB)=frequency at which spectral line in modulation has rotated 45 degrees or ⅛ of complete cycle at the modulation frequency. For "y" km of "−z" ns/km-GHz dispersion fiber in the discriminator, this is equal to a frequency of "W" GHz where dispersive delay=y·(−z)·W ns at frequency W. For a 45 degree phase shift at W GHz the delay is equal to 0.125 cycle or 0.125/W (ns). This results in the equation:

$$|y*z*W|=0.125/W \text{ or } W2=0.125/|y*z| \text{ or } W=(0.125/|y*z|)^{1/2} \quad \text{EQ.3}$$

If the units of dispersion are ps/GHz-km then EQ. 3 modifies to:

$$W=(125/|y*z|)^{1/2} \quad \text{EQ.4}$$

FIG. 4$a$ is a high-level block diagram of a dispersion discriminator 1100 in accordance with a second embodiment of the invention. The dispersion discriminator 1100 includes a wavelength division demultiplexer (WDD) 300 in series with an optical switch 302. The series-connected demultiplexer 300 and switch 302 are coupled between the optical tap 108 and the optical splitter 110, and are used for selecting an optical signal that has a carrier wavelength in the operating range of the dispersion discriminator 1100. The operating range of the dispersion discriminator 1100 is defined as the range of carrier wavelengths for which the positive 112 and negative 114 dispersion arms add additional amounts of dispersion that are opposite in polarity and substantially equal in magnitude to their respective portions of the selected optical signal.

The degree to which the additional amounts are equal, that is, regarding the term "substantially equal", depends on the sensitivity of the dispersion detector 116 and the desired sensitivity of the dispersion discriminator 1100 itself. As will be explained later in more detail with reference to FIGS. 8 and 9, the degree of inequality in the magnitude of the additional amounts of dispersion subtracts from the sensitivity of the dispersion detector. For example, where the dispersion detector 116 has a sensitivity of 5–10%, and the inequality in magnitude of additional dispersion of the dispersion arms 112, 114 is 2%, the overall sensitivity of the dispersion discriminator 110 would be in the range of 7–12% (i.e. the inequality lessens the overall sensitivity of the dispersion discriminator).

Of course, the term "substantially equal" is relative to desired performance of the dispersion discriminator. Generally, however, acceptable inequality in the magnitude of the additional amount of dispersion of the positive 112 and negative 114 dispersion arms does not extend to the point in which the difference in dispersion between the respective portions of the selected optical signal is no longer detectable. If necessary, the range of optical frequencies over which the dispersion discriminator 1100 remains balanced may be increased by using the dispersion discriminator described in related U.S. patent application Ser. No. 10/108,514, filed on Mar. 29, 2002 and incorporated herein by reference.

The spectrum detectors 118$a$, 118$b$ make use of conventional simple photo-receivers in which the upper and lower sidebands are combined and individual side-band phase information is lost, as is normal in double sideband demodulation processes, producing a photo-detector output proportional to the power of the real component (the "vertical magnitude" of the addition of the arrow vectors in the spectral arrow diagrams). Under such circumstances, the spectrum detectors 118a, 118b cannot and do not show a different output for the same amount of positive or negative dispersion, although they show a different output for different amounts of dispersion. Hence the spectrum detectors 118a, 118b can include simple magnitude detectors, the simplest version of which is a P-I-N diode receiver.

Figure 5:
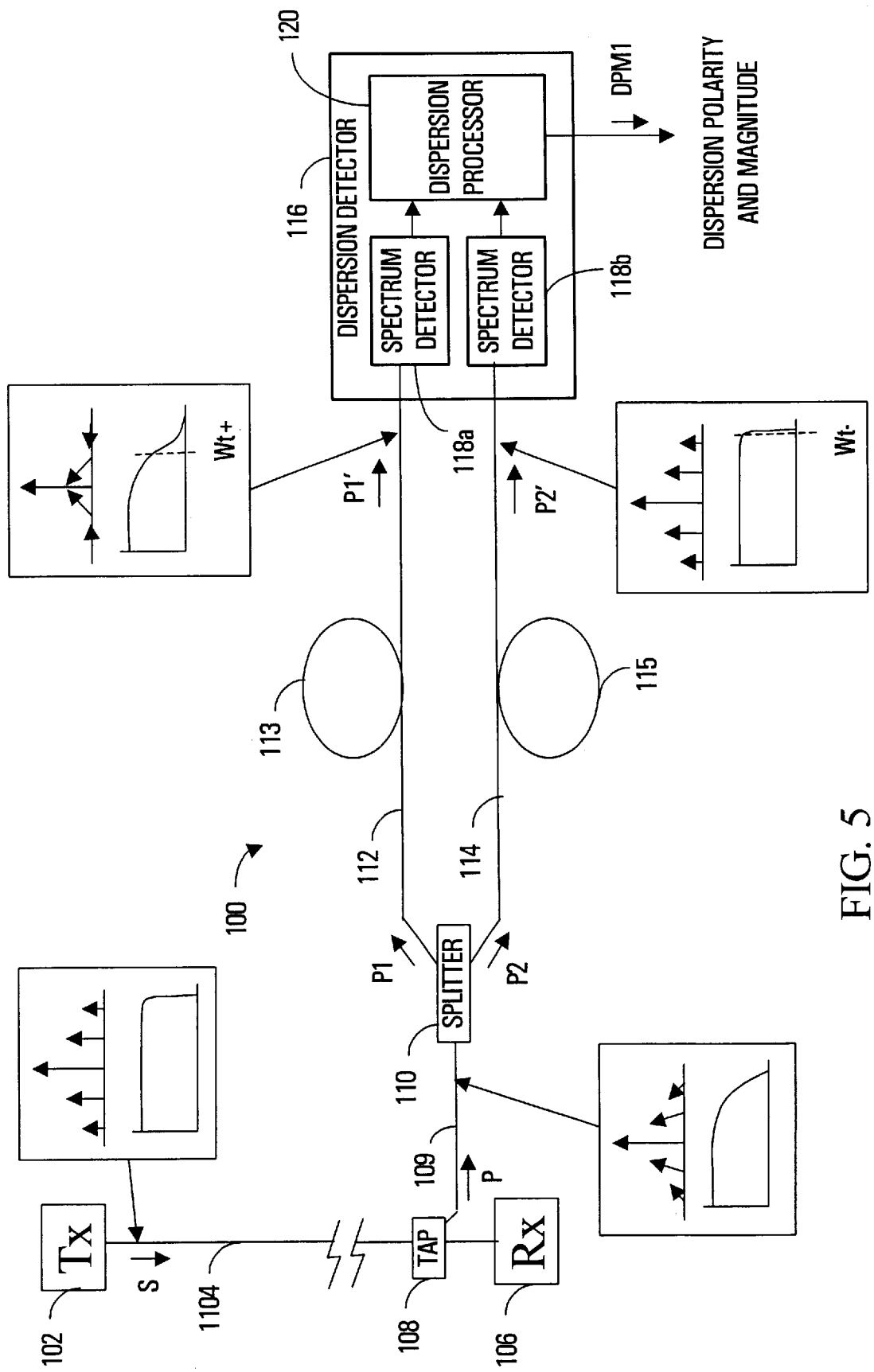
FIG. 5 depicts the operation of the dispersion discriminator of FIG. 4 on an input signal having a moderate amount of positive dispersion.

Referring to FIG. 5, the operation of the dispersion discriminator 100 of FIG. 4 on an input signal to be measured from the optical link (102, 1104, 108, 106) and having moderate positive dispersion is shown. The signal S is transmitted from the transmitter 102 along a positive dispersion transmission link 1104, which terminates at the receiver 106. When an optical signal has been transmitted via a dispersive path with "positive" dispersion, then the discriminator 100 becomes unbalanced, with one arm adding incremental dispersion and resulting in greater degradation, and the other arm partially or even totally compensating the incoming dispersion and hence exhibiting relatively less degradation. This effect can be observed from the phase-amplitude and power spectrum diagrams for the signals P1' and P2' received by the dispersion detector 116. The phase distortion present on the signal P at the input of the dispersion discriminator is added to by the dispersion in the positive arm 112 and subtracted from by the dispersion in the negative arm 114. This addition has the effect that the signal P1' on the positive arm 112 has a −3 dB cut-off point relative to the source, $W_{t_+}$, that falls in frequency as the input dispersion rises. The subtraction on the negative dispersion arm 114 has the effect that the signal P2' on this arm 114 has a −3 dB cut-off point, $W_{t_-}$, that rises until the dispersion on the input signal P is equal but opposite to the dispersion of the negative dispersion arm 114. As the dispersion on the input signal P continues to rise further, the −3 dB cut-off point $W_{t_-}$ falls, but always remaining above −3 dB cut-off point $W_{t_+}$ of the positive arm 112.

Since the input signal spectrum of the modulation sidebands is not known, the polarity of the dispersion of the input signal P is achieved by comparing the two signals P1' and P2' received at the dispersion detector 116 to determine which one exhibits the greater bandwidth. This determination can be done by comparing the high-frequency components of the signals P1' and P2'. Alternatively, as will be described later, a third, nominally zero-dispersion arm can be added to the discriminator 100. This will reinforce the ability of the discriminator 100 to not only discriminate dispersion polarity, but also to measure dispersion magnitude unambiguously. In still other embodiments to be described later, the discriminator 100 is designed to measure dispersion magnitude unambiguously without the addition of a third nominally zero-dispersion arm and in the continued absence of foreknowledge of the input signal spectrum.

With continued reference to FIG. 5, the negative dispersion arm 114 introduces opposite and equal dispersion in the signal P2 resulting in the signal P2' having sidebands that are more nearly phase-aligned to the carrier. In the diagram of FIG. 5, the special case of complete cancellation is shown, but complete cancellation is not required and will usually not be achieved, with under-cancellation or over-cancellation still producing a lesser impairment than is the case in the other arm where the measured path dispersion and the arm dispersion are additive. This improvement in phase-alignment can be observed from the phase-amplitude diagram for the signal P2'. Normally, this phase-aligned condition would not be the case. Instead, the transmission link 1104 would have a much higher dispersion than the relatively short coil of fiber 115 in the negative dispersion arm 114.

For the Positive Dispersion Arm:

F(−3 dB)=frequency at which spectral line in modulation has rotated 45 degree or ⅛ of complete cycle at modulation frequency. For "y" km of "z" ns/km-GHz dispersion fiber in the discriminator concatenated with "Y" km of "Z" ns per km per GHz fiber this is equal to a frequency of "$W_{t_+}$" GHz where dispersive delay=$\{(Y*Z)+(y*z)\} * W_{t_+}$(ns) at frequency=$W_{t_+}$. For a 45 degree phase shift at $W_{t_+}$ GHz the delay is equal to 0.125 cycle or $0.125/W$ (ns). This results in the equation:

$$|\{(Y*Z)+(y*z)\}*W_{t_+}|=0.125/W_{t_+} \text{ or } W_{t_+}^2=0.125/|\{(Y*Z)+(y*z)\}| \text{ or}$$
$$W_{t_+}=(0.125/|\{(Y*Z)+(y*z)\}*|)^{1/2} \quad \text{EQ. 5}$$

If the units of measure for the dispersion are ps per GHz-km then EQ. 5 modifies to:

$$W_{t_+}=(125/|\{(Y*Z)+(y*z)\}*|)^{1/2} \quad \text{EQ. 6}$$

For the Negative Dispersion Arm:

F(−3 dB)=frequency at which spectral line in modulation has rotated 45 degrees or ⅛ of complete cycle at modulation frequency. For "y" km of "−z" ns/km-GHz dispersion fiber in the discriminator concatenated with "Y" km of "Z" ns per km per GHz fiber, this is equal to a frequency of "$W_{t_-}$" GHz where dispersive delay=$\{(Y*Z)-(y*z)\}*W$ (ns) at frequency $W_{t_-}$. For a 45 degree phase shift at $W_{t_-}$ GHz, the delay is equal to 0.125 cycle or $0.125/W_{t_-}$ (ns). This results in the equation:

$$|\{(Y*Z)-(y*z)\}*W_{t_-}|=0.125/W_{t_-} \text{ or } W_{t_-}^2=0.125/|\{(Y*Z)-(y*z)\}| \text{ or}$$
$$W_{t_-}=(0.125/|\{(Y*Z)-(y*z)\}*|)^{1/2} \quad \text{EQ. 7}$$

If the units of measure for the dispersion are ps per GHz-km then EQ. 7 modifies to:

$$W_{t_-}=(125/|\{(Y*Z)-(y*z)\}*|)^{1/2} \quad \text{EQ. 8}$$

Figure 6:
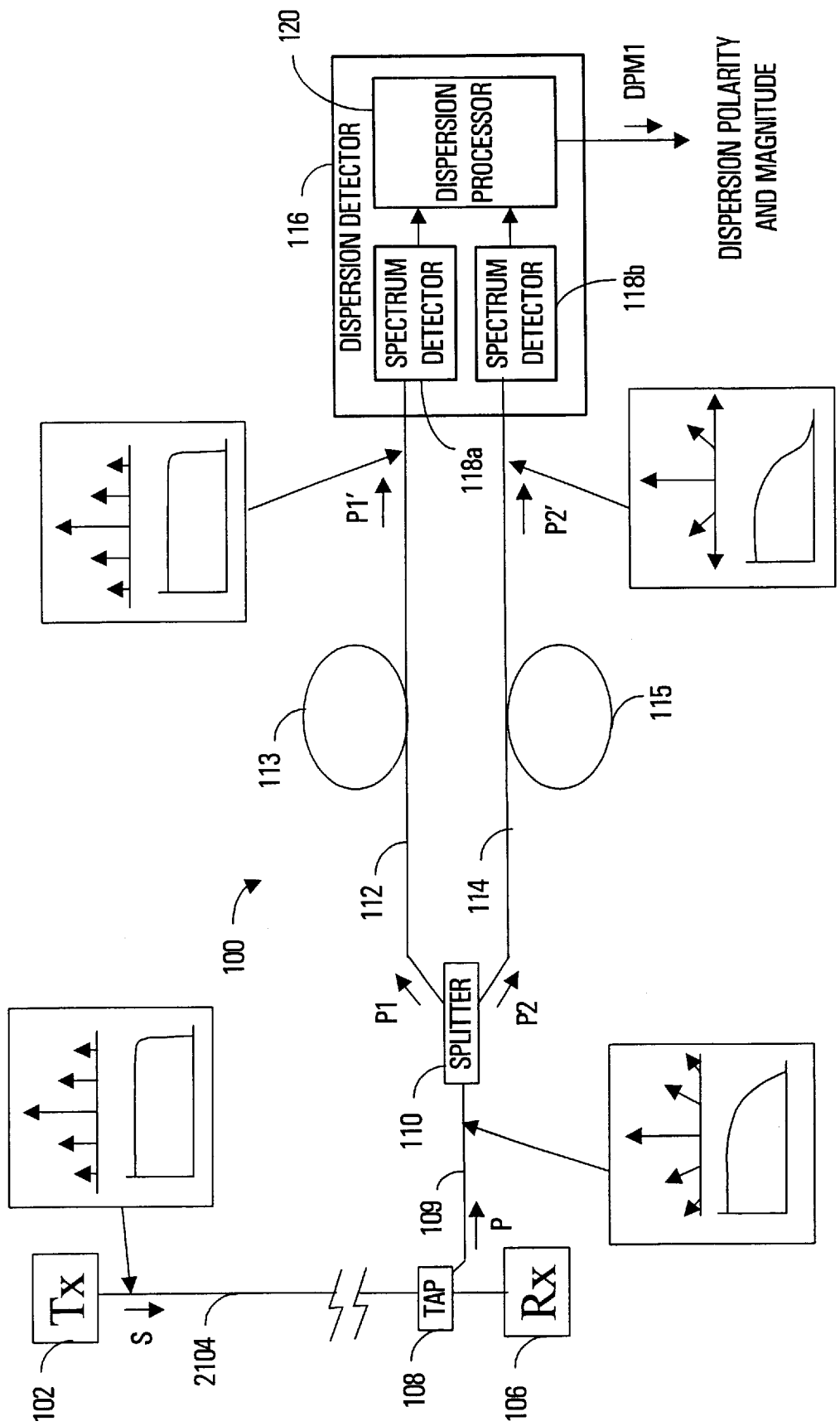
FIG. 6 depicts the operation of the dispersion discriminator of FIG. 4 on an input signal having a moderate amount of negative dispersion.

Referring to FIG. 6, the operation of the dispersion discriminator 100 of FIG. 4 on an input signal having moderate negative dispersion is shown. The signal S is transmitted from the transmitter 102 along a negative dispersion transmission link 2104, which terminates at the receiver 106. In this case, the dispersion on the transmission link 2104 is of the same magnitude and opposite polarity as the dispersion in the positive discriminator arm 112. This can be observed from the phase-amplitude diagram of the signal P1' on the positive dispersion arm 112, as the side bands are phase-aligned with the carrier (i.e., all the arrows of the phase-amplitude diagram are vertical). Normally, this phase-aligned condition would not be the case. Instead, the transmission link 2104 would have a much higher dispersion than the relatively short coil of fiber 113 in the positive dispersion arm 112.

Figure 7:
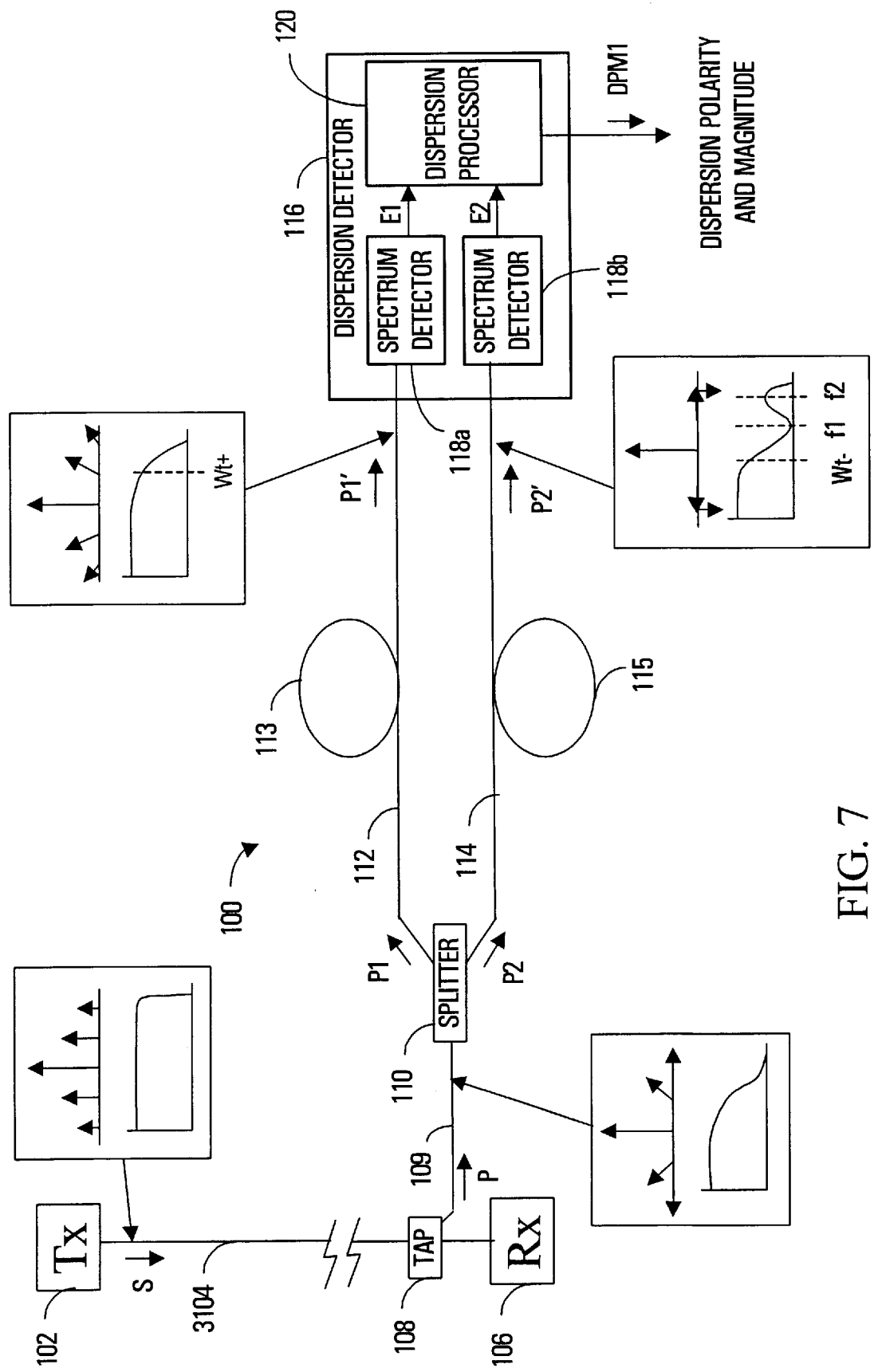
FIG. 7 depicts the operation of the dispersion discriminator of FIG. 4 on an input signal having a large amount of negative dispersion.

FIG. 7 shows a case of a very large negative dispersion on a transmission link 3104. In this case the negative arm 114 has phase-shifted the high frequency components of the signal P2 from close to 90 degrees to beyond 90 degrees so the power spectrum diagram for the signal P2' shows a broad notch at the first side-band frequency f1, followed by a second spectral peak at the second side-band frequency f2. The signal P1' at the end of positive arm 112 still exhibits significant high frequency cancellation effects, as can be observed from its power spectrum diagram. Nevertheless, the first 3 dB down point ($W_{t_-}$) on the negative arm 114 is much lower in frequency than the corresponding 3 dB roll-off point ($W_{t_+}$) on the positive arm 112. Consequently, by appropriate processing at the dispersion detector 116, the polarity and approximate magnitude of dispersion in the signal S can be determined.

For the purpose of determining the required discriminator sensitivity, the dispersion characteristics of typical transmission link fiber and dispersion compensating devices will now be considered. Typical transmission link fibers are within a range of dispersion of 4–17 ps/nm-km. This dispersion has a monotonic positive slope with increasing wavelength. Specialized dispersion-compensation fibers can provide dispersions up to 100 ps/nm per dB of loss for wideband (40 nm) and 500 ps/nm per dB for narrowband. Assuming 0.2 dB per km, the latter would translate to 100 ps/nm per km. At 1500 nm wavelength, the frequency of the carrier is $2 \times 10^5$ GHz (i.e. c=300,000 km/sec, f carrier=$3 \times 10^8/1.5 \times 10^{-6}$=$2 \times 10^{14}$ Hz or $2 \times 10^5$ GHz). A 1 nm change in wavelength at 1500 nm wavelength will result in a 1/1500 change in frequency, which equals $2 \times 10^5/1.5 \times 10^3$=133.33 GHz. Hence the dispersion for transmission link fiber can be quoted as −0.03 (i.e. −4/133.33) to −0.127 (i.e. −17/133.33) ps/GHz-km (typically about 0.075 ps/GHz-km) and the dispersion for compensation fiber can be quoted as 0.75 (i.e. 100/133.33) to 3.76 (i.e. 500/133.33) ps/GHzdB.

The following calculation determines the −3 dB roll-off point for the case of zero dispersion on the input signal S. The −3 dB roll-off frequencies are important in determining the frequency sensitivity required by the dispersion detector 116, as will be discussed later. The following math could be easily extended to plot the power spectrum across the complete pass-band.

Example −3 dB Roll-off Frequency Calculation for Zero Transmission Path Dispersion:

Recalling the equation (EQ. 1) for the −3 dB cut-off frequency (W) determined previously with respect to FIG. 4:

$$W = (0.125/|y^*z|)^{1/2} \qquad \text{EQ. 1}$$

If we assume that W=5 GHz, and 1 dB of dispersion-compensating fiber is 5 km long (i.e. 0.2 dB/km) then z=0.75 to 3.75 ps/GHz-dB converts to 0.15–0.75 ps/GHz-km, and y=unknown to be determined, then (from EQ. 1):

$$25 = 0.125/y^*0.75^*10^{-3}$$

$$y = 0.125/25^*0.75^*10^{-3} = 0.125/0.01875 \text{ km}$$

=6.667 km for the upper end (0.75 ps/GHz-km) of the dispersion range and five times this (i.e. 33.33 km) for the lower end (0.15 ps/GHz-km) of dispersion range for dispersion compensating fiber. A dispersion discriminator with a 12 km spool 113, 115 of 0.4 ps/GHz-km fiber would provide a −3 dB cut-off frequency in the positive/negative dispersion arm 112, 114 of:

$$W = 0.125/(12^*0.4^*10^{-3})^{1/2} = 5.10 \text{ GHz}.$$

The dispersion detector 116 determines the difference in −3 dB roll-off frequency of the signals P1' and P2' from the positive 112 and negative 114 arms in order to determine the polarity and magnitude of dispersion that the signal S has undergone while propagating along the link 104. Recall the equations, EQ. 6 and EQ. 8, for the −3 dB frequency ($W_{t_+}$ and $W_{t_-}$) in the positive 112 and negative 114 arms, respectively, which were derived earlier with reference to FIG. 5.

Expressing EQ.6 and EQ. 8 in terms of total dispersion (D) of the transmission link 104 and total dispersion (d) of the positive/negative dispersion arms 112, 114 is useful in plotting the −3 dB frequencies ($W_{t_+}$ and $W_{t_-}$) vs. total dispersion (D) of the transmission link 104 in order to determine the required frequency sensitivity of the dispersion detector 116.

$$W_{t_+} = (125/|\{(Y^*Z)+(y^*z)\}|)^{1/2} \qquad \text{EQ. 6}$$

where the dispersion values are expressed in ps per GHz-km, which can also be expressed as:

$$W_{t_+} = (125/|\{(D)+(d)\}|)^{1/2} \qquad \text{EQ. 6'}$$

where D=total dispersion of the transmission link 104, d=total dispersion of the positive arm 112.

$$W_{t_-} = (125/|\{(Y^*Z)-(y^*z)\}|)^{1/2} \qquad \text{EQ. 8}$$

where the dispersion values are expressed in ps per GHz-km, which can also be expressed as:

$$W_{t_-} = (125/|\{(D)-(d)\}|)^{1/2} \qquad \text{EQ. 8'}$$

where D=total dispersion of transmission link 104, d=total dispersion the negative arm 114.

Figure 8:
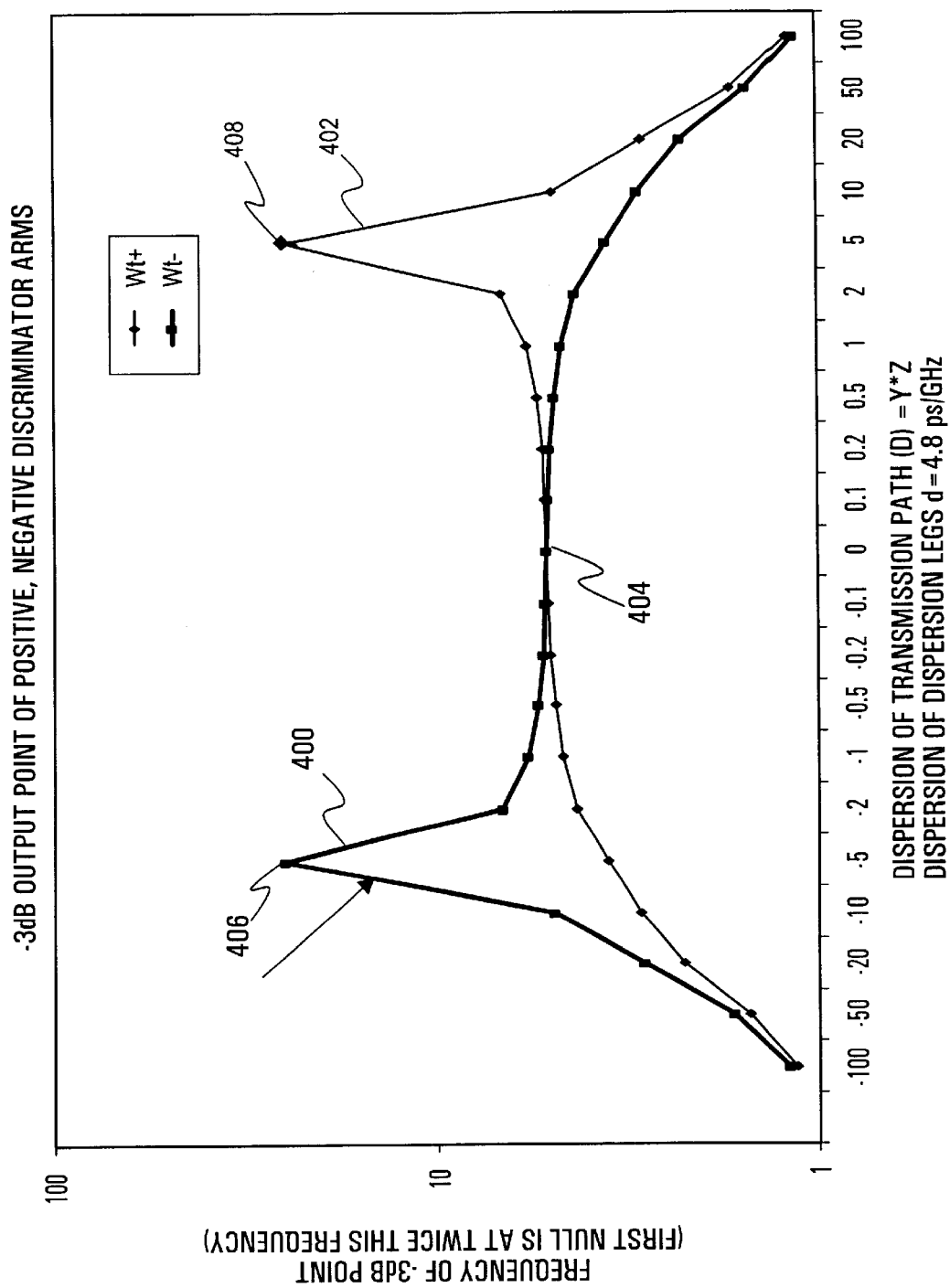
FIG. 8 is a graph displaying curves of the −3 dB roll-off frequencies of the first spectral notches detected relative to the transmitted source signal for the signals output from the discriminator arms of the dispersion discriminator of FIG. 4, for one set of arm dispersion values as a function of different amounts of positive and negative dispersion on the signal input to the dispersion discriminator

FIG. 8 displays curves 400, 402 of the −3 dB frequencies ($W_{t_+}$, $W_{t_-}$) of the signals P1', P2' output from the discriminator arms 112, 114, respectively, as a function of positive and negative dispersion on the input signal P, for the case where each discriminator arm has an incremental dispersion of 4.8 ps/GHz. The curves 400, 402 are symmetrical to each other about the zero dispersion point 404. Moving away from the zero dispersion point 404 in either direction one arm of the dispersion discriminator 100 (e.g., the positive dispersion arm 112) shows a monotonic fall-off in −3 dB frequency and the other arm (114) shows an increase in −3 dB frequency until the dispersion is equal but opposite to the dispersion in the first arm (112), then the dispersion in the other arm (114) falls off, but always remains above that of the first arm (112). Note that both curves 400, 402 display respective poles 406, 408 when the dispersion (D) of the transmission path is equal and opposite to that of the respective dispersion arms 112, 114, whereby dispersion of the arm and the path cancel each other and the resulting signal has no dispersion.

By comparing the power in the signals P1' and P2' output from the arms 112, 114 the signal with the higher −3 dB cut-off frequency ($W_{t_+}$, $W_{t_-}$), and consequently the polarity of the total dispersion (D) in the transmission link 104 effecting the signal S can be determined. This comparison is straightforward because both arms 112, 114 of the discriminator are fed by the same input signal P, which is split into equal portions P1, P2 that enter respective arms 112, 114 of the discriminator 100. The magnitude of the total dispersion (D) can be determined from the relationship between the outputs E1, E2 of spectrum detectors 118a, 118b. This determination will be shown later. Assuming that the dispersion detector 116 can detect a 5–10% unbalance in the power measurement, and that, at the −3 dB point, the rate of fall of the spectral energy is trending towards 6 dB per octave, then the discriminator polarity detection function range should be from about 0.25–0.45 ps/GHz to about 100 ps/GHz, for this example. This range corresponds to dispersive paths of 8–15 km up to about 3333 km with the best case assumed outside plant fiber, and 2–3.8 up to about 833 km with the worst case fiber. Of course this is one example of a design and the parameters can be adjusted, e.g., by changing per-arm dispersion, and/or fiber length, to achieve different operating ranges and −3 dB cut-off frequencies. In particular, with the increase in the use of 10 or 40 Gb/s transmission, the discriminator −3 dB cut-off frequencies can be moved up into a (balanced case) value of 10 or even 20 GHz, since both 10 and 40 Gb/s systems contain energy at these rates. This would shorten the arm fibers by a factor of 2:1 or 4:1.

Figure 9:
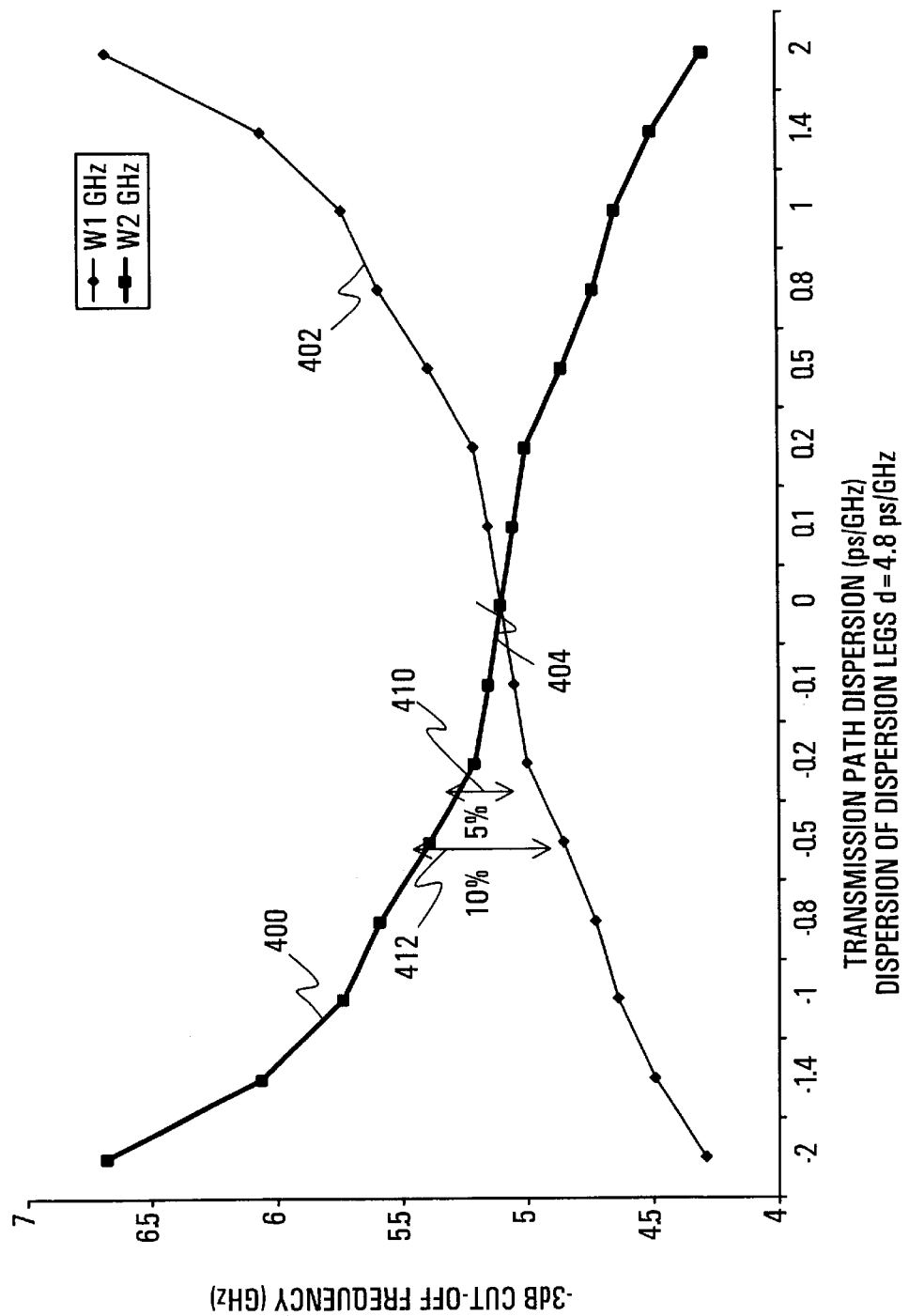
FIG. 9 shows the cross-over region of the curves of FIG. 8 in more detail and plotted on linear frequency scale for the same arm dispersion values.

FIG. 9 shows the cross-over region of the curves 400, 402 in more detail and plotted on a linear frequency scale. The basic discriminator sensitivity is determined by the precision of the measurement and comparison of the power of the signals P1' and P2'. This precision can be increased by using slow frequency scanning and relatively long integration times. This is also necessary because the integration time at one frequency band must be substantially longer than the differences in arm delays, to ensure that the same data sample window in time is being analyzed, since one must allow for the case of a time-variant spectrum in the data stream. Note the points 410, 412 at which the two −3 dB points are 5 and 10% apart, respectively, are shown on the figure. This occurs at a dispersion of about 0.2–0.5 ps/GHz on the transmission path under test, which would have resulted in a −3 dB roll-off on the transmission path alone, around $(4.8/0.2)^{0.5}$ to $(4.8/0.5)^{0.5}$ times higher than the 5.1 GHz roll-off in the discriminator arms, i.e., a range of about $5.1 \times 24^{0.5} = 25$ GHz down to about $5.1 \times 9.6^{0.5} = 16$ GHz for the sensitivity threshold of this discriminator design. Since 10 Gb/s systems are expected to be substantially unaffected by roll-offs above about 7–10 GHz, the specific set of parameters used in this discriminator provides a high margin of sensitivity above the requirements 10 Gb/s transmission schemes.

Since the dispersion discriminator 100 operates by comparing modified to unmodified (or differently modified) versions of the same signal, it makes no assumptions or demands on the data format, bit-rate or spectrum of the signal other than that there must be signal spectral energy present at the sideband frequencies at which the discriminator 100 is operating, and that the signal has both upper and lower sidebands (as is the case with ASK modulation, for example). Furthermore, the dispersion discriminator 100 does not need information on the originating spectrum of the signal.

Figure 10:
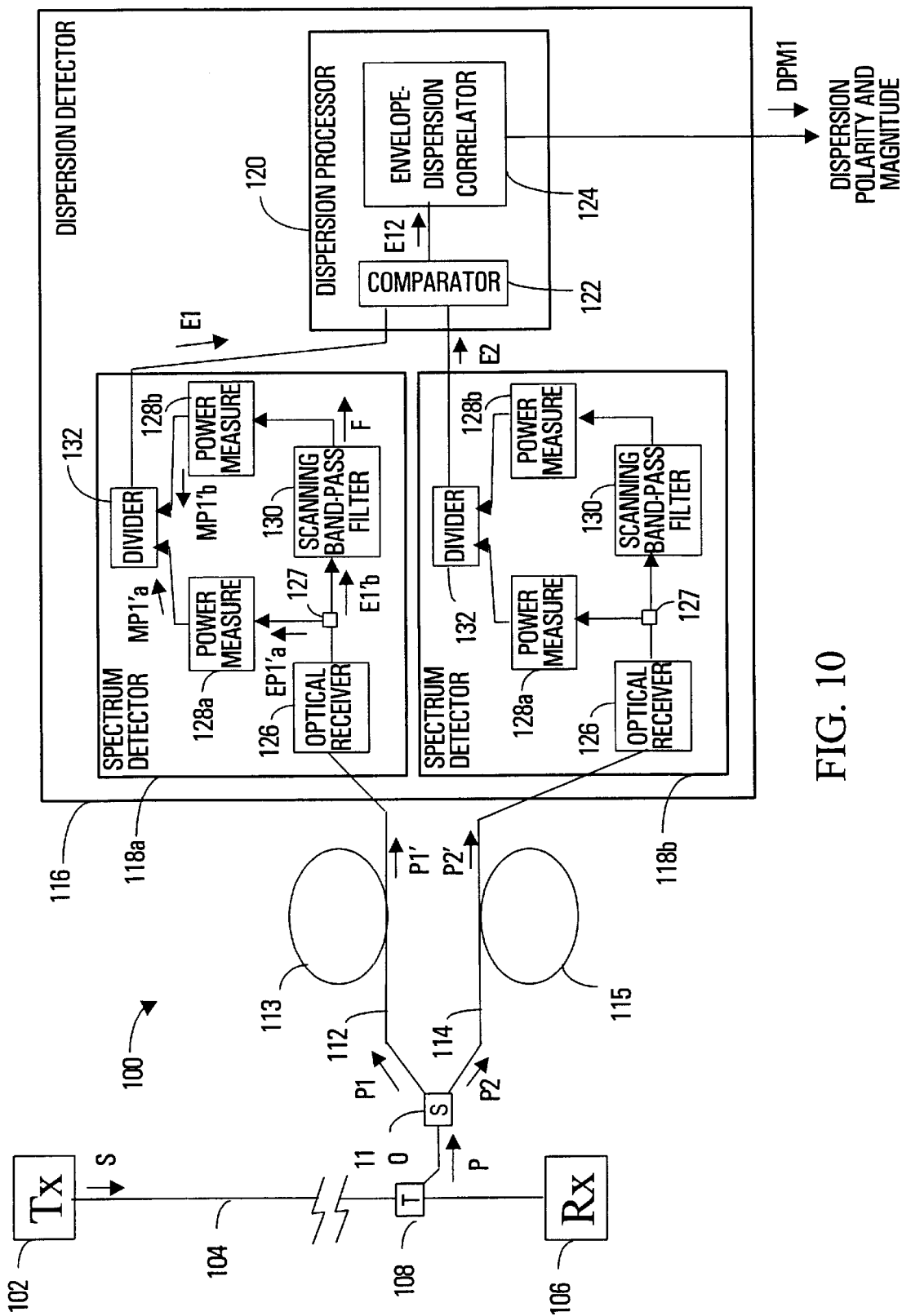
FIG. 10 is a block diagram showing the dispersion discriminator of FIG. 4 in greater detail.

FIG. 10 shows the dispersion discriminator 100 of FIG. 4 in greater detail. The dispersion detector 116 includes the spectrum detectors 118a, 118b, coupled between the dispersion arms 112, 114 and the processor 120. The first spectrum detector 118a is coupled between the positive dispersion arm 112 and the processor 120, while the second spectrum detector 118b is coupled between the negative dispersion arm 114 and the processor 120. Since the spectrum detectors 118a, 118b have the same internal structure, as depicted by the functional block diagram in FIG. 10, a description of the first spectrum detector 118a only should suffice in order to understand the present embodiment of the invention.

The first spectrum detector 118a includes an optical receiver 126 coupled to the input of the detector 118a at its input and coupled to an electrical splitter 127 at its output. The optical receiver 126 linearly receives, i.e., linearly demodulates and converts, the optical signal P1' to d.c. coupled analog electrical signal EP1' representing the analog envelope of the modulated optical carrier. The electrical splitter 127 splits the signal EP1' into two signals EP1'a and EP1'b of equal power. One output of the splitter 127 is coupled to the input of a power measuring device 128a (which measures the mean d.c. level on the receiver output and hence the received input power), whose output is coupled to the input of a divider 132. The other output of the splitter 127 is coupled to the input of a scanning band-pass filter 130, whose output is coupled to the input of another power measuring device 128b.

As an alternative to a single scanning band pass filter 130, a bank of fixed filters of bandwidth consistent with the measurement time and accuracy/sensitivity required (i.e., the broader the filter passband, the less time required to measure but also the less resolution/accuracy of the result), each of which has its own power measurement block or which are switched sequentially to the power measurement block could be used. This alternative arrangement has the advantage that multiple measurements can be done in parallel.

The output of the other power measuring device 128b is coupled to another input of the divider 132, while the output of the divider 132 is coupled to the output of the spectrum detector 118a which is connected to an input of the processor 120. A power measurement MP1'a (representing the received power in the overall optical carrier) is made on the signal EP1'a by the power measuring device 128a and another power measurement MP1'b is made by the other power measuring device 128b on a portion F of the signal EP1'b in a frequency range selected by the scanning filter 130. The first power measurement MP1'a is divided by the second power measurement MP1'b in the divider 132 and the result E1 is output to the processor 120. The second spectrum detector 118b operates in a like fashion to produce, from the signal P2', a signal E2 which is also output to the processor 120.

The processor 120 includes a comparator 122 having two inputs, each input coupled to a respective spectrum detector 118a, 118b and an output coupled to the input of an spectrum-dispersion correlator 124. The correlator 124 determines the polarity and magnitude of dispersion on the input signal P to the dispersion discriminator 100 from ratios E1, E2 of the power measurements (e.g. MP1'a and MP1'b for the signal E1) made by the spectrum detectors 118a, 118b. This is achieved by way of a look-up table as described later on in greater detail. The spectrum-dispersion correlator 124 outputs this determination of dispersion polarity and magnitude in the signal DPM1.

For further clarity, the optical receiver 126 is a linear wideband optical receiver, and the first power measuring device 128a measures the total received power MP1'a in the signal EP1'a. The scanning band-pass filter 130 and second power measuring device 128b form a scanning filter-power measuring device, which scans frequency and measures the power MP1'b of selected spectral components F in the signal EP1'b. This sequence of measurements MP1'b is then normalized by dividing it by the total received power MP1'a to remove any effects from different losses, receiver sensitivities between the discriminator arms 112, 114, etc.

The linear receivers are broadband devices but, since no individual bit discrimination decisions are being made in the following equipment (which only examine spectral shapes and power densities), the effects of receiver noise is very different. In particular, to receive and discriminate individual bits in a receiver-discriminator requires a signal-to-receiver Gaussian noise ratio of the order of 20 dB, whereas to avoid the spectral differences between the two receivers being masked by the receiver noise requires a much lower SNR. As an example the receiver/discriminator sensitivity would be halved at a point where the signal and noise were at the same power. Hence, although the receiver is broadband, it can be driven with a signal that is 10–17 dB below that of the data receiver in the main transmission path, which has to make individual logic decisions on each bit to an extreme level of accuracy. This permits the use of an asymmetric tap and can also accommodate the loss effects of the splitter and arm fiber. An example budget would be: arm-loss 2.4 dB, splitter loss 3.3 dB, receiver power requirement differential (relative traffic receiver) 15 dB, giving ratio of split powers (traffic/monitor)=15−2.4−3.3=9.3 dB, allowing the use of a 90:10 or 80:20 splitter. Alternatively, with a more symmetrical power splitter to feed the discriminator, or by the use of the discriminator after an optical amplifier stage, there will be enough loss-budget tolerance in the discriminator to allow the use of series selective elements such as the DWDM filter and selector optical switch as was shown in FIG. 4.

The normalized output sequence E1, E2 from each divider 132 associated with a respective discriminator arm 112, 114 is fed to the processor 120. The comparator 122 determines which arm is exhibiting the higher high frequency roll-off measurement as a function of the data-points in the sequence. This will be shown for the cases of zero input dispersion, positive input dispersion, negative input dispersion, and highly negative dispersion (the highly positive dispersion case being intuitively obvious from the highly negative case). The spectrum-dispersion correlator 124 determines the magnitude of dispersion in the input signal P to the dispersion discriminator 100 and outputs the result of this determination in the signal DPM1.

Figure 11:
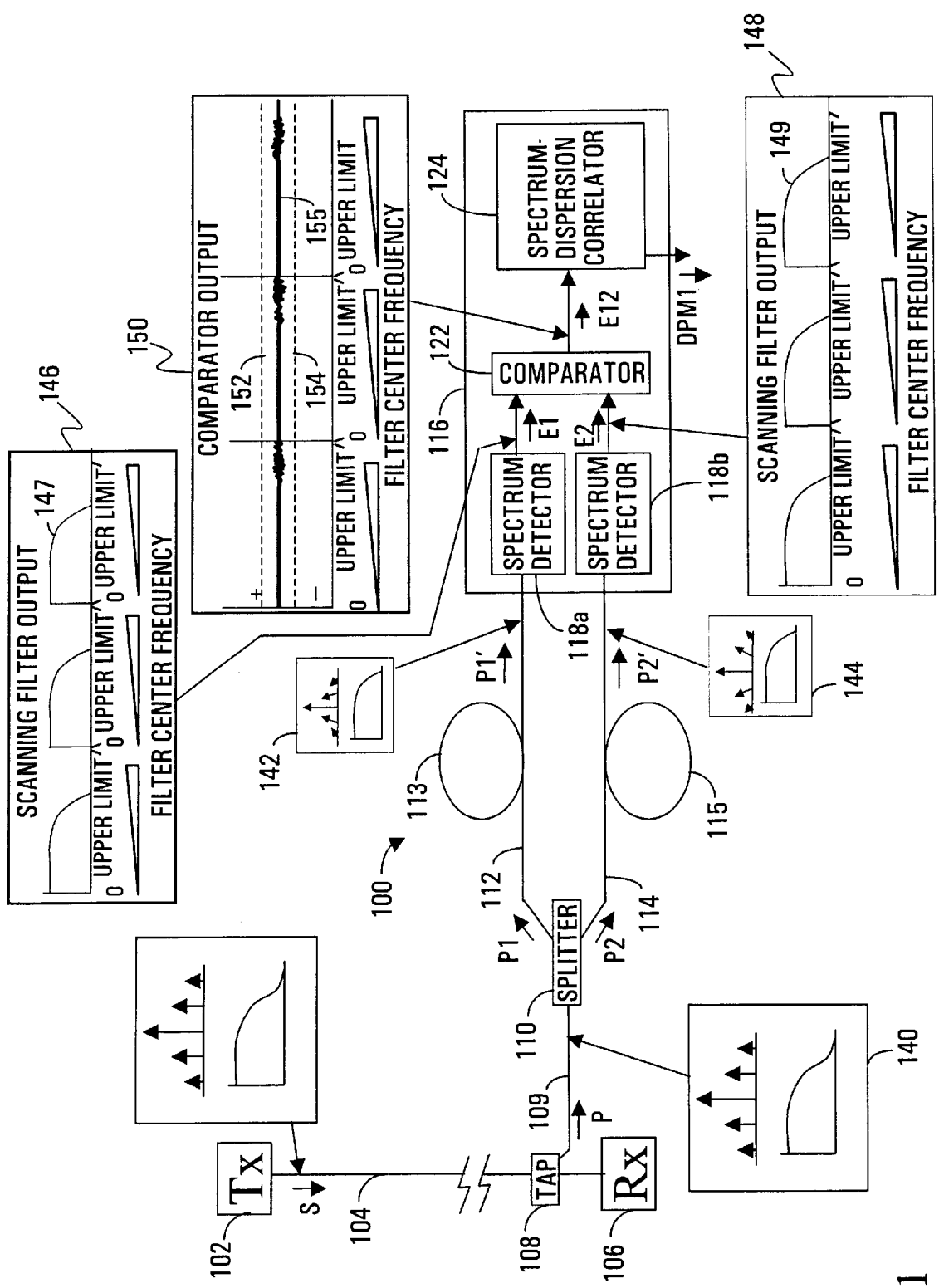
FIG. 11 depicts the operation of the dispersion discriminator of FIG. 10 on an input signal having negligible dispersion.

FIG. 11 is a diagram of the dispersion discriminator 1100 of FIG. 10 with waveforms of certain signals to explain its operation. The portion P of the signal S, transmitted by the optical transmitter 102, is tapped from the transmission link 104 by the tap 108 and input to the dispersion discriminator 100. The phase-amplitude and power spectrum diagrams for the signal P are shown in a box 140 beside the signal P. From these diagrams, it can be observed that the signal P has no dispersion, and hence represents a zero dispersion source to the dispersion discriminator 100. The signal P is split into the two signals P1 and P2 by the splitter 110. After traversing the positive 112 and negative 114 dispersions arms respectively, the altered versions P1' and P2' of the signals P1 and P2 arrive at the inputs of the dispersion detector 116. Phase-amplitude and power spectrum diagrams are shown in boxes 142 and 144 for the altered signals P1' and P2', respectively. From these diagrams, it can be seen that the signal P1' has a positive dispersion (i.e. arrows in phase-amplitude diagram are rotated towards the carrier) and that the signal P2' has a negative dispersion (i.e. arrows in the phase-amplitude diagram are rotated away from the carrier).

The operation of the spectrum detectors 118a and 118b was described previously with respect to FIG. 10. Specifically, the first spectrum detector 118a outputs the signal E1 and the second spectrum detector 118b outputs the signal E2. Amplitude vs. time curves 147 and 149 for these signals E1 and E2 are shown in boxes 146 and 148, respectively. As indicated by the curves 147, 149, the amplitude of the signals E1, E2 remains constant initially, but rolls off in amplitude with time as the frequency of the scanning band-pass filter 130 in each spectrum detector 118a, 118b is increased, with additional notches appearing in the amplitude spectrum at higher frequencies. The signals E1 and E2 are input to the comparator 122 and the resultant signal E12 is input to the spectrum-dispersion correlator 124. An amplitude vs. time curve 155 of the signal E12 is shown in a box 150. The curve 155 remains at a relatively constant value, with some small amount of noise when the signals E1 and E2 have low levels, and between positive 152 and negative 154 decision thresholds. Since the signal E12 does not cross either of the thresholds 152, 154, the comparator 122 provides the spectrum-dispersion correlator 124 with the indication of no detectable dispersion in the input signal P. This result is indicated in the signal DPM1 output by the spectrum-dispersion correlator 124.

It is to be noted that the noise level will increase as the signals from the two filters of the two spectrum detectors fall and hence a measurement of whether an adequate level of power remains on either input of comparator 122 can be made. If neither input has a significant signal component, then the validity of the output of 122 can be terminated (since at this point it is just comparing noise with noise). When this occurs after the bandpass frequency of the filters has been beyond a certain lower bound, then a successful measurement of "no detectable dispersion" has been made. However, if this occurs at low filter frequency settings, then there is actually no signal present, and an error condition can be flagged.

For further clarity, the normalized power measurements represented by the signals E1 and E2 track the power spectral density of the modulation sidebands at the input to the discriminator optical receivers 126. Whilst the relationship of these normalized power measurements to the power of the source transmitter 102 is unknown (i.e. the original line code may have had a roll-off in its spectrum) the determination of which signal P1', P2' is exhibiting the lower high frequency roll-off is determined by comparing the outputs E1, E2 of the two spectrum detectors 118a, 118b. Any perturbations in the originating spectrum will result in a common-mode effect, but perturbations due to transmission will result in a differential effect. Under these conditions, it is not necessary to have a copy of the original data to determine the polarity of the dispersion.

Figure 12:
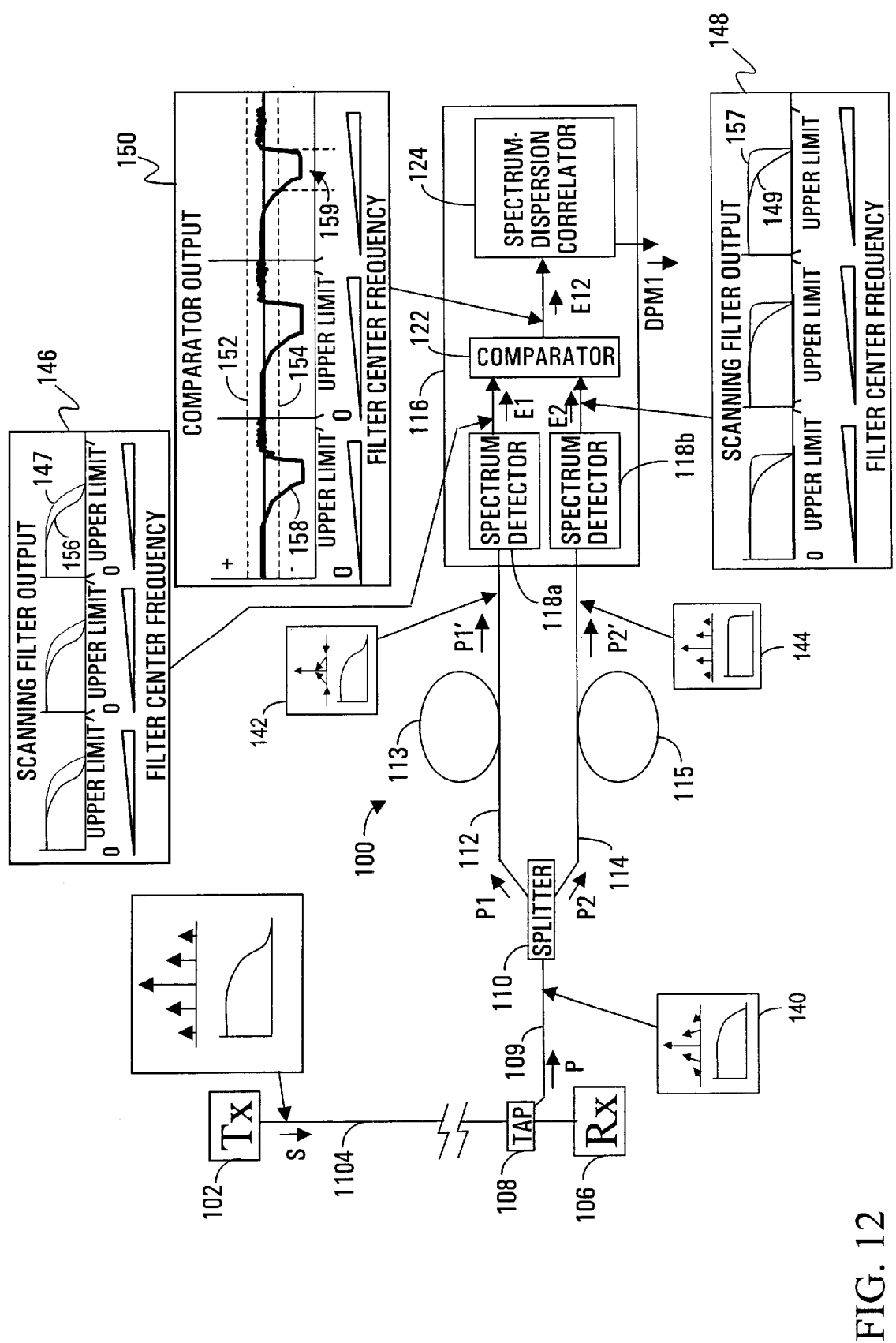
FIG. 12 depicts the operation of the dispersion discriminator of FIG. 10 on an input signal having a moderate amount of positive dispersion.

FIG. 12 shows the operation of the discriminator 100 with a moderate amount of positive dispersion in the input signal P. Under this condition, the positive dispersion arm 112 further band-limits the sidebands of the signal P1', as can be observed from the phase-amplitude and power spectrum diagrams in the box 142, while the negative arm 114 partially or fully compensates for the positive dispersion on the input signal P. This compensation can be observed from the phase-amplitude and power spectrum diagrams in the box 144 for the signal P2'. As a result of propagating along the positive 112 and negative 114 dispersion arms, the signals P1' and P2' have different bandwidths. This difference can be determined by comparing the spectra of the signals E1 and E2 at the outputs of the spectrum detectors 118a and 118b.

The scanning band-pass filter 130 and power measuring device 128b in each spectrum detector 118a, 118b provide a crude spectral analysis. Typically, the scanning band pass filter 130 would have a filter "Q" value in the order of 15–50 with measurements every $1/16^{th}$ or $1/32^{nd}$ of an octave (one $32^{nd}$ was used in the modelling). Alternatively, an arrangement including a series of fixed filters, each with a power monitor, and each spaced approximately $1/8^{th}$ to $1/16^{th}$ of an octave apart, over the range of about 800 MHz to about 8 GHz could be used. This arrangement would result in the need for 3.2×16=about 52 filters/receivers to achieve high precision, or fewer filters (about 13 to about 26) to achieve low precision, which would be relatively simple and low cost since most of the filters (those from about 800 MHz to about 3 GHz) could be simple resonant structures on a printed circuit board (e.g. resonant quarter-wave stubs). Whether a scanning band-pass filter 130, a series of scanning filters, or a bank of fixed filters is used, the power measurements are processed in the same way. Alternatively, a fixed filter shape and a heterodyne scanning technique could be used. In this case the signal is combined with a scanning radio-frequency (RF) source and the resultant sum or difference components are filtered in a fixed microwave filter. This replaces the array of filters with a sweep oscillator, a mixer and a single fixed filter.

Curves 156 and 157 in the boxes 146 and 148 respectively display amplitude vs. time of the signals E1 and E2. These signals E1 and E2 correlate to the frequency spectra of the signals P1' and P2', which are input to the dispersion detector 116. The comparator 122 processes these signals E1 and E2 in a manner which effectively compares the power measurements starting from the lowest frequency and moving to an upper limit to determine which of the two signals P1' or P2' input to the dispersion detector 116 has the earlier roll-off in spectral components. Comparing from lower to higher frequencies enables detection of the first roll-off frequency without interference from effects of high frequency components. For example, when high dispersion paths are analysed, the high-frequency components may have been rotated beyond 90 degrees, thereby introducing a high power lobe beyond the first (and subsequent) spectral nulls. In the box 146, the curve 156 corresponding to the positive dispersion source and positive dispersion arm 112 is shown having an earlier roll-off in spectral components than the curve 146 corresponding to the zero dispersion source through the same arm 112. In the box 148, the curve 157 corresponding to the positive dispersion source and negative dispersion arm 114 is shown having a later roll-off in spectral components than the curve 149 corresponding to the zero dispersion source through the same arm 114.

Curve 158 in the box 150 shows the amplitude vs. time of the signal E12 output from the comparator 122. The curve 158 is below the negative threshold 154 during a period 159 when the curve 156, corresponding to the signal E1, is less in magnitude than the curve 157, corresponding to the signal E2, thereby indicating a positive dispersion source. Note that in this instance, the curve 158 never crosses the positive threshold 152.

The spectrum-dispersion correlator 124 receives the signal E12 from the comparator 122 and uses the polarity as well as the magnitude of this signal to determine the polarity and magnitude of dispersion in the signal P. This determination is made by using the data from the crossover region 204 of FIG. 9 relating the difference in −3 dB cut-off frequencies to transmission path dispersion (D) for given amount of known dispersion (d) in the positive 112 and negative 114 dispersion arms. This data may be kept in the form of a table which is indexed according to the polarity and magnitude of the comparator output signal E12. The resulting determination of polarity and magnitude of dispersion in the input signal P is output by the spectrum-dispersion correlator 124 in the signal DPM1. Other ways of determining the dispersion in the input signal P will be described later on with reference to FIGS. 19–24.

Figure 13:
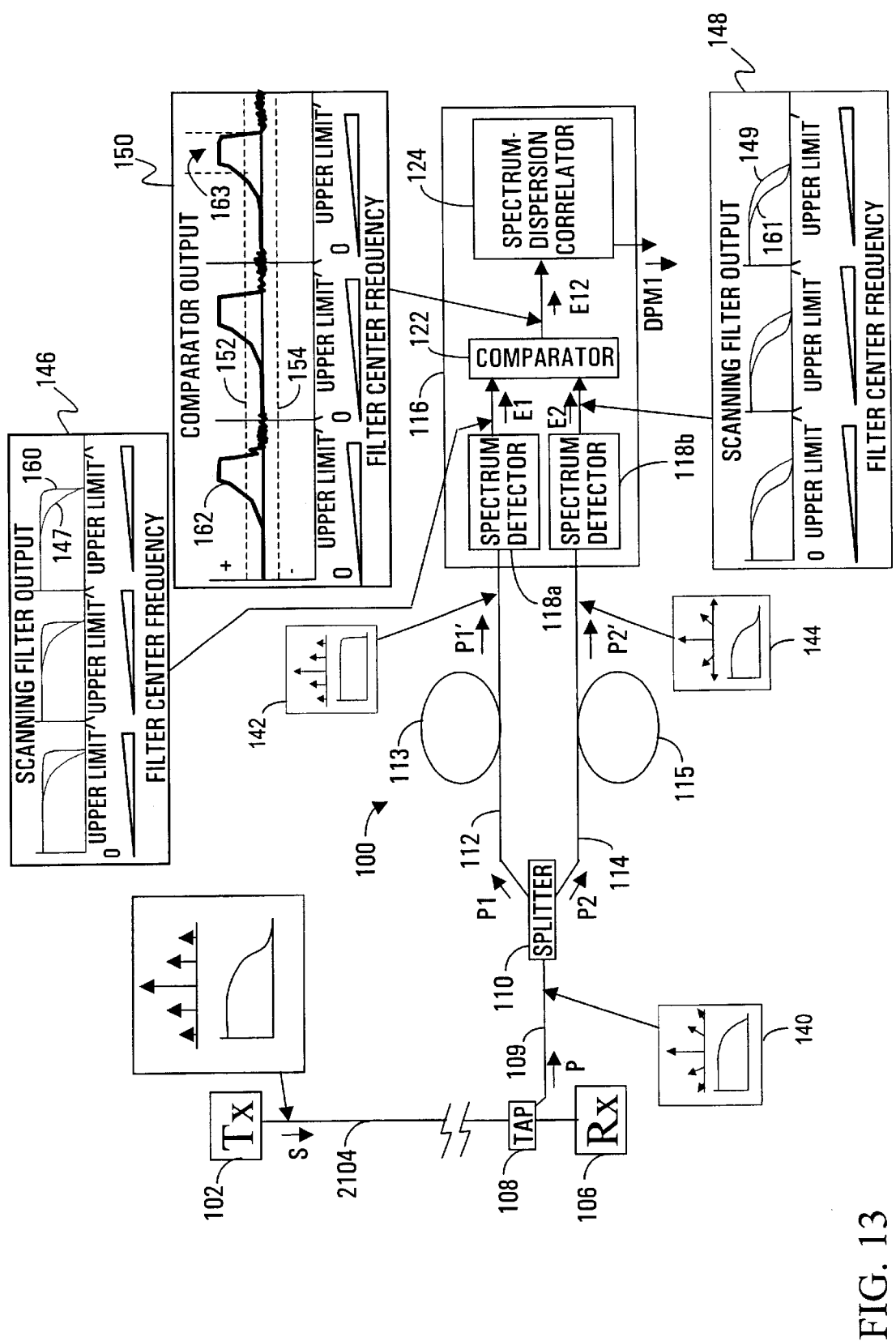
FIG. 13 depicts the operation of the dispersion discriminator of FIG. 10 on an input signal having a moderate amount of negative dispersion.

FIG. 13 shows the operation of the dispersion discriminator 100 with a moderate amount of negative dispersion in the input signal P. Note that the effects of the two arms 112, 114 have been reversed, providing a basic polarity discrimination. Note that, as in the case shown in FIG. 12, the comparator 122 will remain approximately balanced with increasing frequency until the differences in the dispersion of the arms 112, 114 impact the spectral components of the signals P1' and P2', at which point the magnitude of the signal E1 or E2 with maximum dispersion will reduce, causing the comparator 122 to become unbalanced, thereby indicating the polarity of dispersion in the input signal P. Amplitude vs. time curves 160 and 161 of the signals E1 and E2 are shown in the boxes 146 and 148, respectively. Curve 162 representing amplitude vs. time of the output signal E12 of the comparator 122 is shown in the box 150. The curve 162 is above the positive threshold 152 for a period of time 163 in which the signal E1 is greater in magnitude than the signal E2, thereby indicating negative dispersion in the input signal P of the dispersion discriminator 100.

Furthermore, the frequency at which the comparator 122 becomes unbalanced can provide a rough indication of the level of dispersion present. For example, from FIGS. 8 and 9, the lowest frequency at which a significant difference in the −3 dB cut-off frequencies for the two arms 112, 114 can be observed will approximately follow the lesser bandwidth of the two discriminator plots 200, 202. An approximate relationship would be:

100 ps/GHz at 1.1 GHz (dispersion from about 1333 km of typical OSP fiber)
  50 ps/GHz at 1.5 GHz (dispersion from about 667 km of typical OSP fiber)
  20 ps/GHz at 2.2 GHz (dispersion from about 266 km of typical OSP fiber)
  10 ps/GHZ at 3 GHz (dispersion from about 133 km of typical OSP fiber)
  5 ps/GHz at 3.5 GHz (dispersion from about 67 km of typical OSP fiber)
  2 ps/GHz at 4.1 GHz (dispersion from about 26.7 km of typical OSP fiber)
  1 ps/GHz at 4.8 GHz (dispersion from about 13.3 km of typical OSP fiber)

Hence the discriminator has sufficient sensitivity for both 10 Gb/s and 40 Gb/s. At 10 Gb/s, the signal should be dispersion-compensated down to less than about 100 km of residual dispersion (although lower is better). At 40 Gb/s, the signal has to be dispersion compensated down to about one-sixteenth of the length tolerable for 10 Gb/s (or about 6–7 km), although lower is better. Whilst the discriminator in itself does not provide compensation, it has the required sensitivity to be used as part of an auto-compensation system.

These numbers (e.g. from the approximate relationship above) are used in the spectrum-dispersion correlator 124 to provide a model of dispersion for a given transmission link 104, whereby an approximate magnitude and polarity of the dispersion in the input signal P of the dispersion discriminator 100 can be determined. The spectrum-dispersion correlator 124 can be implemented with a microprocessor running a program stored in an on-chip, or external, memory that in effect performs, for a given dispersion model, a table look-up of dispersion for the frequency at which the comparator becomes unbalanced.

Figure 14:
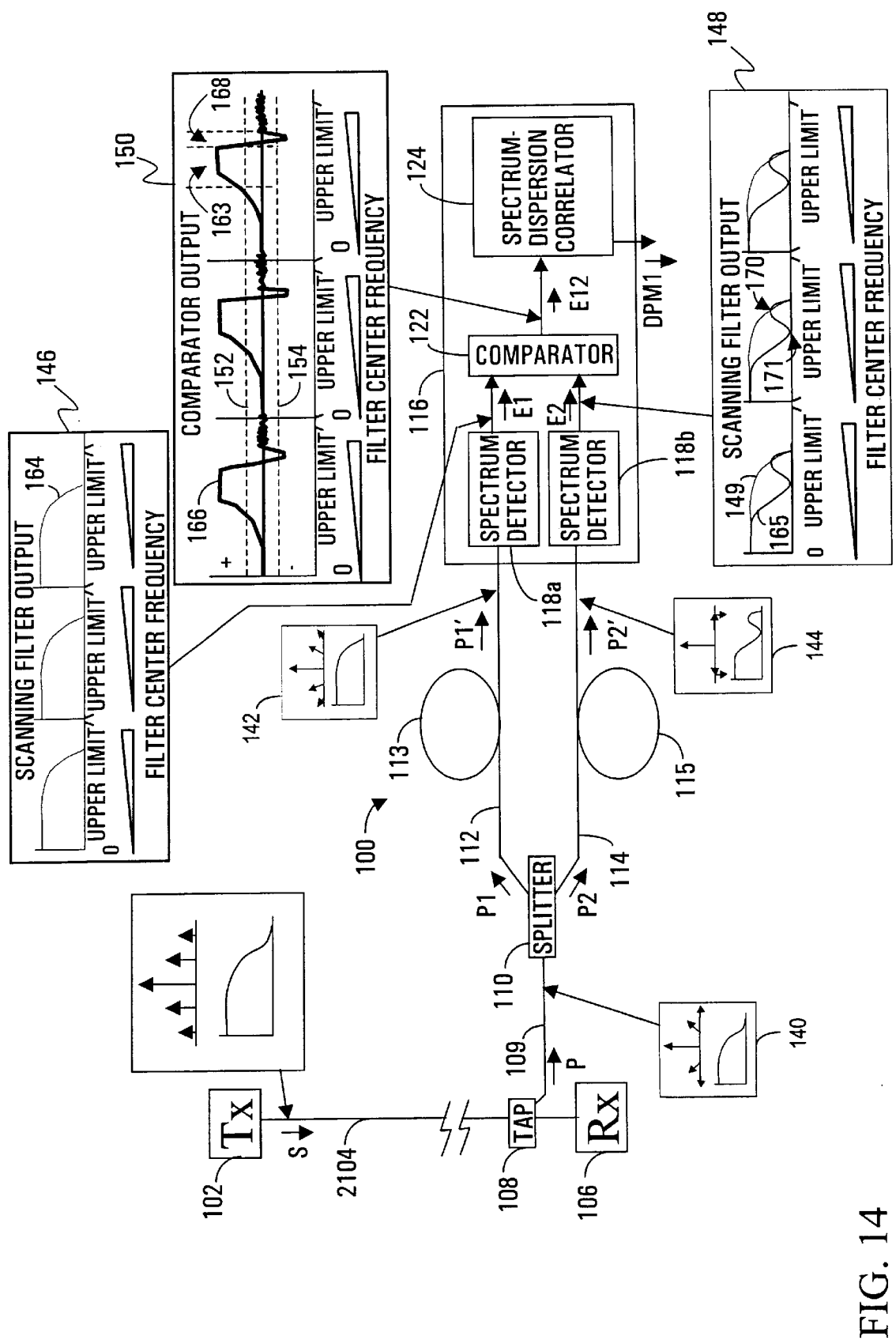
FIG. 14 depicts the operation of the dispersion discriminator of FIG. 10 on an input signal having a large amount of negative dispersion.

FIG. 14 shows the operation of the dispersion discriminator 100 with a large amount of negative dispersion in the input signal P. In this case, the negative dispersion arm 114 adds further negative dispersion to the signal P2', thereby driving the highest frequency components well beyond a +/−90-degree phase shift so that these components start to add constructively, but in anti-phase, producing a secondary peak in the power spectrum, beyond a cancellation notch, which is now at mid-frequencies. An amplitude vs. time curve 165 of the signal E2, which corresponds to the power spectrum of the signal P2', is shown in the box 148. The secondary peak and cancellation notch in this power spectrum is shown by the peak 170 and notch 171, respectively, in the curve 165. The positive dispersion arm 112 reduces the impairments of the incoming signal P1 but does not cancel them. An amplitude vs. time curve 164 of the signal E1, which corresponds to the power spectrum of the signal P1', is shown in the box 146. Curve 164 is similar in shape to that of curve 147, which corresponds the zero dispersion source case.

An amplitude versus time curve 166 of the signal E12 is displayed in the box 150. The curve 166 has a first period 167 above the positive threshold 152 when the signal E1 is greater in magnitude than the signal E2, and a second period 168 when the signal E2 is greater in magnitude than the signal E1. Hence, there are now frequencies where the comparator 122 is balanced, frequencies where the comparator 122 is unbalanced in a positive direction (i.e. during the first period 167) and frequencies where the comparator 122 is unbalanced in a negative direction (i.e. during the second period 168). However, scanning from lower to higher frequencies results in the first instance of imbalance of the comparator 122 being indicative of the polarity of the input dispersion. In this case, the first period 167 of imbalance indicates negative dispersion in the input signal P of the dispersion discriminator 100. The second period 168 of imbalance in a direction opposite to the first period of imbalance 167 indicates a high amount of dispersion in the input signal P. This second indication is used by the spectrum-dispersion correlator 124 in determining the magnitude of dispersion in the input signal P.

Figure 15:
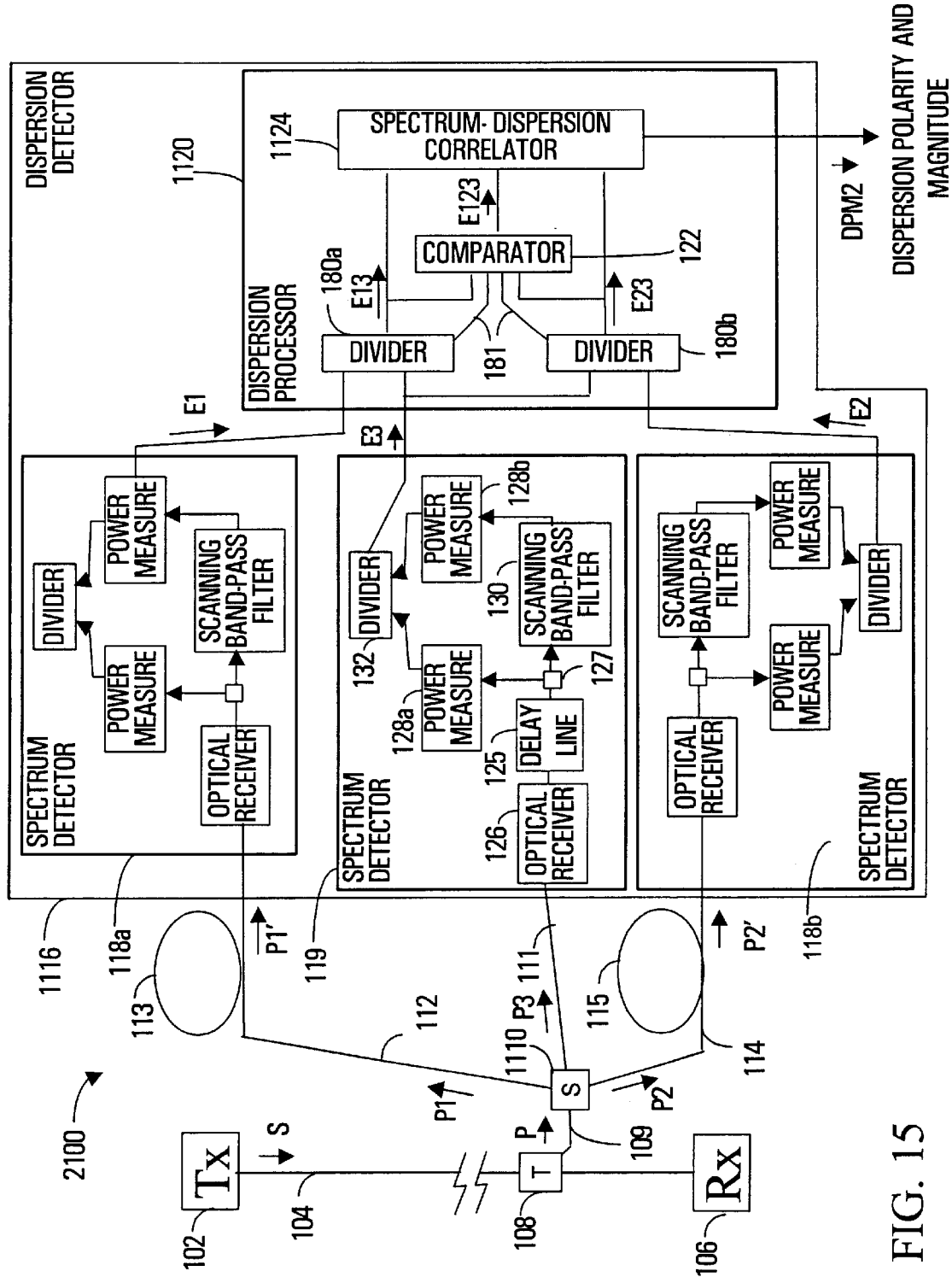
FIG. 15 is a functional block diagram of a three-arm dispersion discriminator in accordance with a third embodiment of the present invention.

FIG. 15 shows a three-arm dispersion discriminator 2100 in accordance with another embodiment of the present invention. The three-arm dispersion discriminator 2100 is similar to the previous two-arm dispersion discriminator 100, except an additional arm 111 having zero dispersion and coupled to an output of a three-arm splitter 1110 has been added. Additionally, a spectrum detector 119 for the zero dispersion arm 111 has been added to a modified dispersion detector 1116. The modified the dispersion detector 1116 also includes a modified dispersion processor 1120, which has inputs coupled to the outputs of respective spectrum detectors 118a, 118b and 119. The modified dispersion detector 1116 includes a pair of dividers 180a and 180b; the first divider 180a is coupled to the outputs of the spectrum detectors 118a and 119, and the second divider 180b is coupled to the outputs of the spectrum detectors 118b and 119. The output of each divider 180a and 180b is coupled to the comparator 122 and to a modified spectrum-dispersion correlator 1124.

The spectrum detector 119 coupled to the zero dispersion arm 111 is similar to the spectrum detectors 118a and 118b previously described, except that it includes a delay line 125 coupled between the optical receiver 126 and the electrical splitter 127. The delay line 125 is for compensating delays in the positive 112 and negative 114 dispersion arms resulting from the respective dispersive coils of the fiber 113, 115 included in those arms. In the case where the output data from the scanning filter has been digitized, the delay line 125 could be implemented by means of a FIFO, otherwise an analog delay circuit could be used.

In operation, a signal S transmitted by the optical transmitter 102 propagates along the dispersive transmission path 104 resulting in a dispersed optical signal S'. The optical tap 108 taps portion P of this dispersed signal S' and couples it to the three-arm splitter 1110 via the optical fiber 109. The splitter 1110 splits the signal P into three portions represented by the signals P1, P2, and P3. The signal P1 propagates along the positive dispersion arm 112, while the signal P2 propagates along the negative dispersion arm 114 and the signal P3 propagates along the zero-dispersion arm 111. Propagated signals P1' and P2' arrive at inputs to their respective spectrum detectors 118a and 118b, which output signals E1 and E2 corresponding to the power spectral density of the propagated signals P1' and P2'. The signal P3 propagates along the zero-dispersion arm 111 unaffected and arrives at the input of the spectrum detector 119 which outputs a signal E3 corresponding to the power spectral density of the signal P3.

The first divider 180a divides the signal E1 by the signal E3 and outputs a resulting signal E13 to the comparator 122 and the spectrum-dispersion correlator 1124. Similarly, the second divider 180b divides the signal E2 by the signal E3 and outputs are resulting signal E23 to the comparator 122 and the spectrum-dispersion correlator 1124. The comparator 122 subtracts the signal E13 from the signal E23 and outputs a difference signal E123 to the spectrum-dispersion correlator 1124. The spectrum-dispersion correlator 1124 analyzes the difference signal E123 to determine the polarity and magnitude of dispersion in the input signal P, which determination is then output in a signal DPM2 to be used by a dispersion compensator, or other like apparatus.

This determination may be accomplished using empirical data stored in a table as described previously. Additionally, the comparator 122 is provided with disable inputs 181 coupled to the dividers 180a and 180b to avoid divide-by-zero errors. When the dividers 180a, 180b have an output below a predetermined level (i.e. are at or close to zero spectral density), disable outputs on the dividers 180a, 180b provide a signal to disable the comparator 122 via its disable inputs. This condition can only occur when there is no signal spectrum present or the scanning has already passed the first 3 dB cut-off frequency, this only being the case when the discriminator is balanced and therefore there is zero dispersion on the input.

Figure 16:
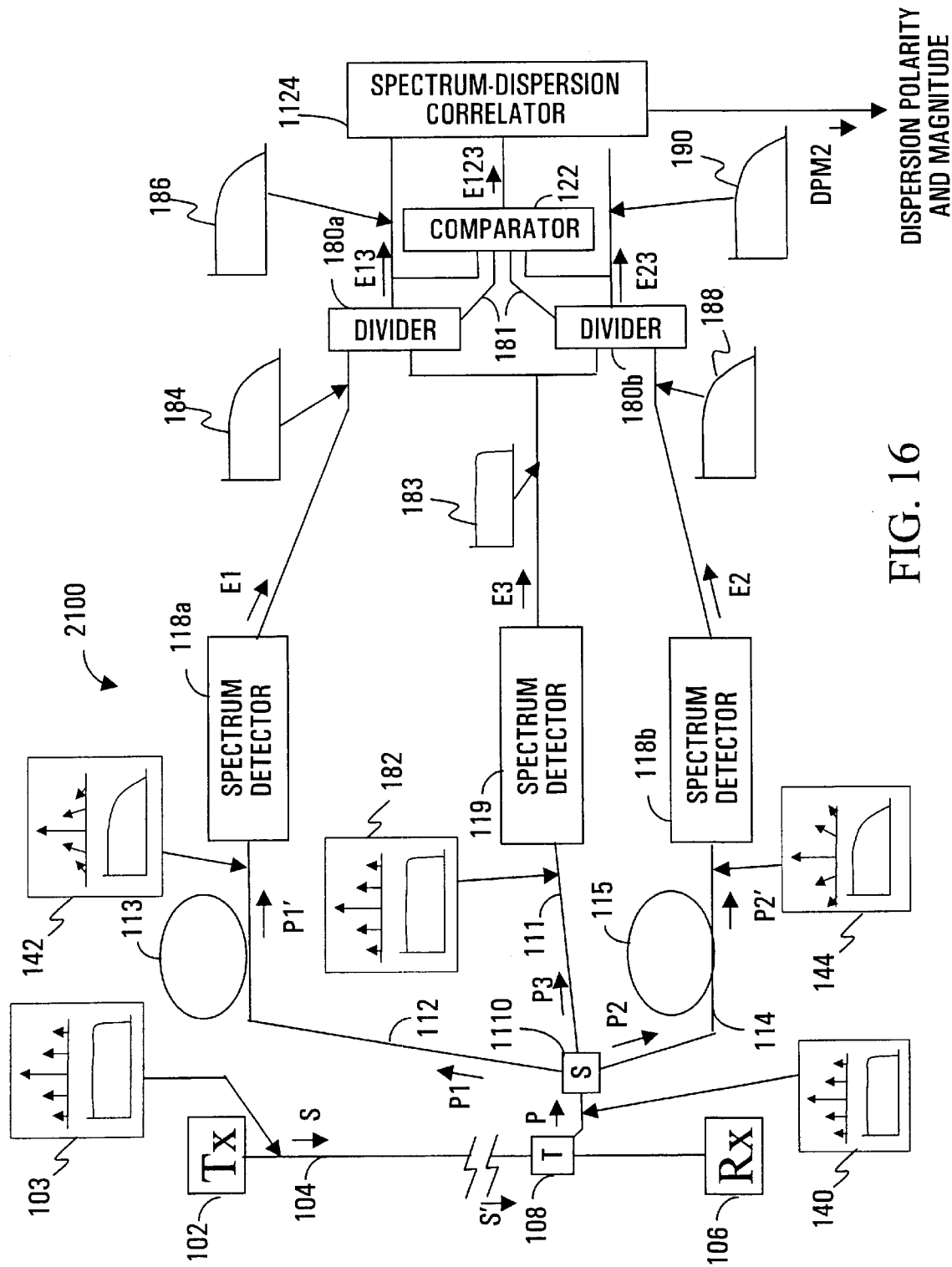
FIG. 16 depicts the operation of the dispersion discriminator of FIG. 15 on an input signal having negligible dispersion.

FIG. 16 shows the operation of the three-armed dispersion discriminator 2100 in the case of an input signal P with zero dispersion. Phase-amplitude and power spectrum diagrams for the signal S and a tapped portion P thereof are shown in boxes 103 and 140 respectively. In this case, the transmission path 104 has no dispersion effects on the signal tests, as can be observed from the phase-amplitude and power spectrum diagrams in the boxes 103 and 140, which are the same. Phase-amplitude and power spectrum diagrams in boxes 142, 182, and 144 are shown for the signals P1', P3, and P2' after propagation along the positive 112, zero 111, and negative 114 dispersion arms, respectively.

As can be observed from these diagrams, the signal P3 displays no dispersive effects while the signal P1' displays positive dispersion effects and the signal P2' displays negative dispersion effects. As can be observed from the power spectrum diagrams, the signals P1' and P2' affected by a dispersion have a lower −3 dB roll-off frequency than the signal P3, which the dispersion discriminator 2100 has not affected by dispersion. The dividers 180a and 180b use the power spectrum of the unaffected signal P3 (i.e., the signal E3 of the spectrum detector 119) to normalize the outputs E1 and E2 of the spectrum detectors 118a and 118b. The amplitude vs. time response of the signal E3 is shown by the curve 183. The normalization of the signal E1 is shown by the curve 184 representing the amplitude vs. time response of the signal E1, and the curve 186 representing the amplitude vs. time response of the signal E1 after being normalized by the signal E3, which results in the signal E13. Similarly, the curve 188 represents the amplitude vs. time response of the signal E2, and the curve 190 represents the amplitude vs. time response of the signal E2 after being normalized by the signal E3, which results in the signal E23. By comparing the signals E13 and E23 the comparator 122 is effectively comparing the power spectrum of the dispersed signals P1' and to P2' normalized by the power spectrum of the and dispersed signal P3.

Figure 17:
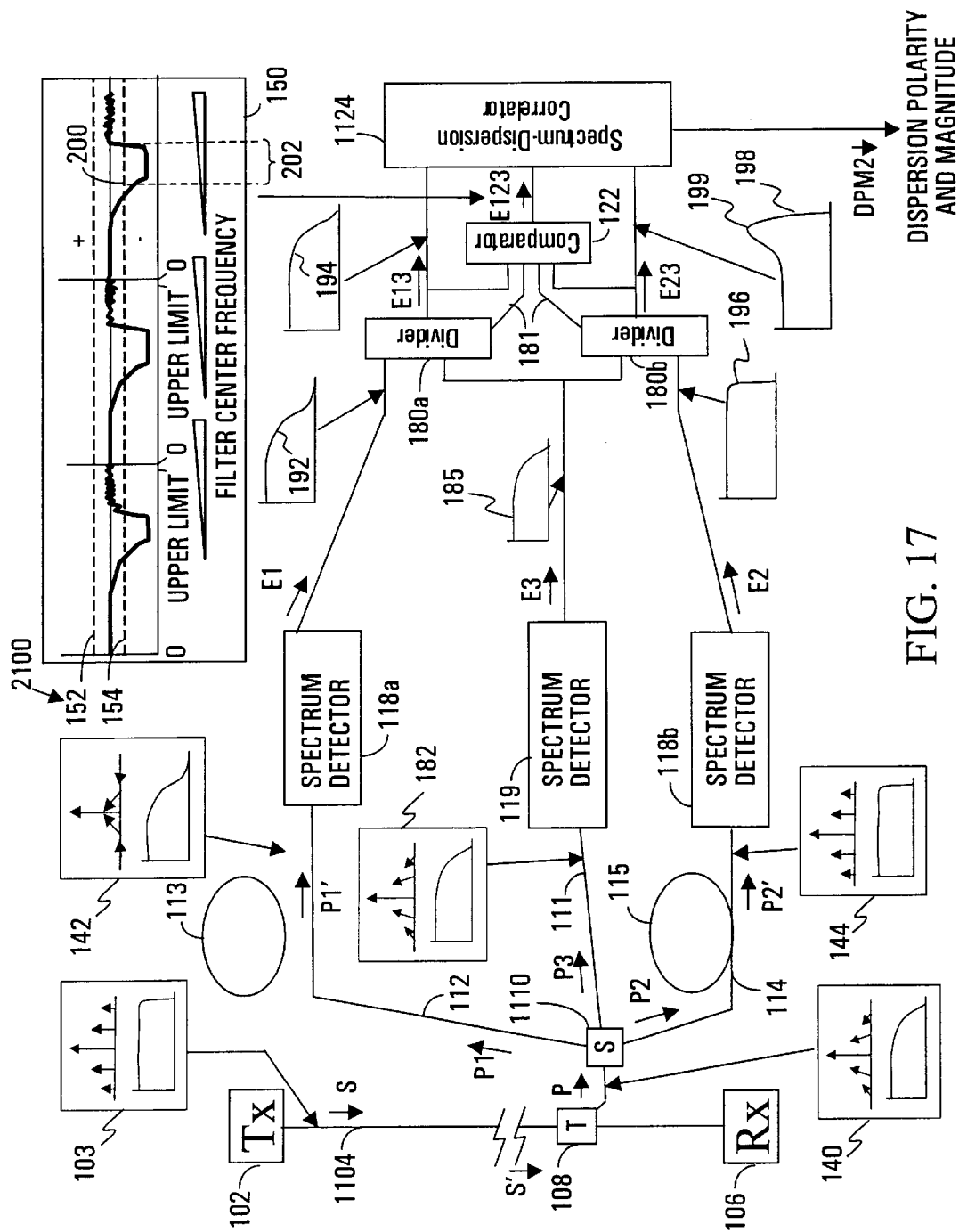
FIG. 17 depicts the operation of the dispersion discriminator of FIG. 15 on an input signal having a moderate amount of positive dispersion.

FIG. 17 shows the operation of the three-armed dispersion discriminator 2100 in the case of an input signal P with positive dispersion. In this case, the phase-amplitude and power spectrum diagrams for the signal P in box 140 display the effects of positive dispersion via rotation of the arrows, which represent the side bands, towards the carrier and a reduction in the −3 dB roll-off frequency compared to those in the box 103 for the signal S. The phase-amplitude and power spectrum diagrams in boxes 142, 182, and 144 display the effects of the positive 112, zero 111, and negative 114 dispersion arms on the signals P1, P3, and P2, respectively. The amplitude vs. time response of the signal E3 is shown by the curve 185. The effect of normalizing the signal E1 with the signal E3 can be observed by comparing curve 192, which corresponds to the signal E1, with curve 194, which corresponds to normalized signal E13. Effectively, the process of normalization tends to enhance any difference in the power spectrum of the signal P1', P2' from the positive 112 or negative 114 dispersion arm from that of the signal P3 from the zero dispersion arm 111. Curve 198 represents the amplitude vs. time response of the normalized signal E23, which is the signal E3 after being normalized by the signal E2 represented by curve 196. The increase in the −3 dB roll-off frequency in the signal P2 caused by the negative dispersion arm 114 can be observed by a peak 199 in the curve 198. Curve 200 displayed in the box 150 shows the amplitude vs. time response of the signal E123, which is the result of subtracting the signal E23 from the signal E13. The curve 200 extends below the negative threshold 154 for a period 202, corresponding approximately to the duration of the peak 199, where the signal E23 is greater in magnitude than the signal E13, thereby indicating positive dispersion in the input signal P.

Figure 18:
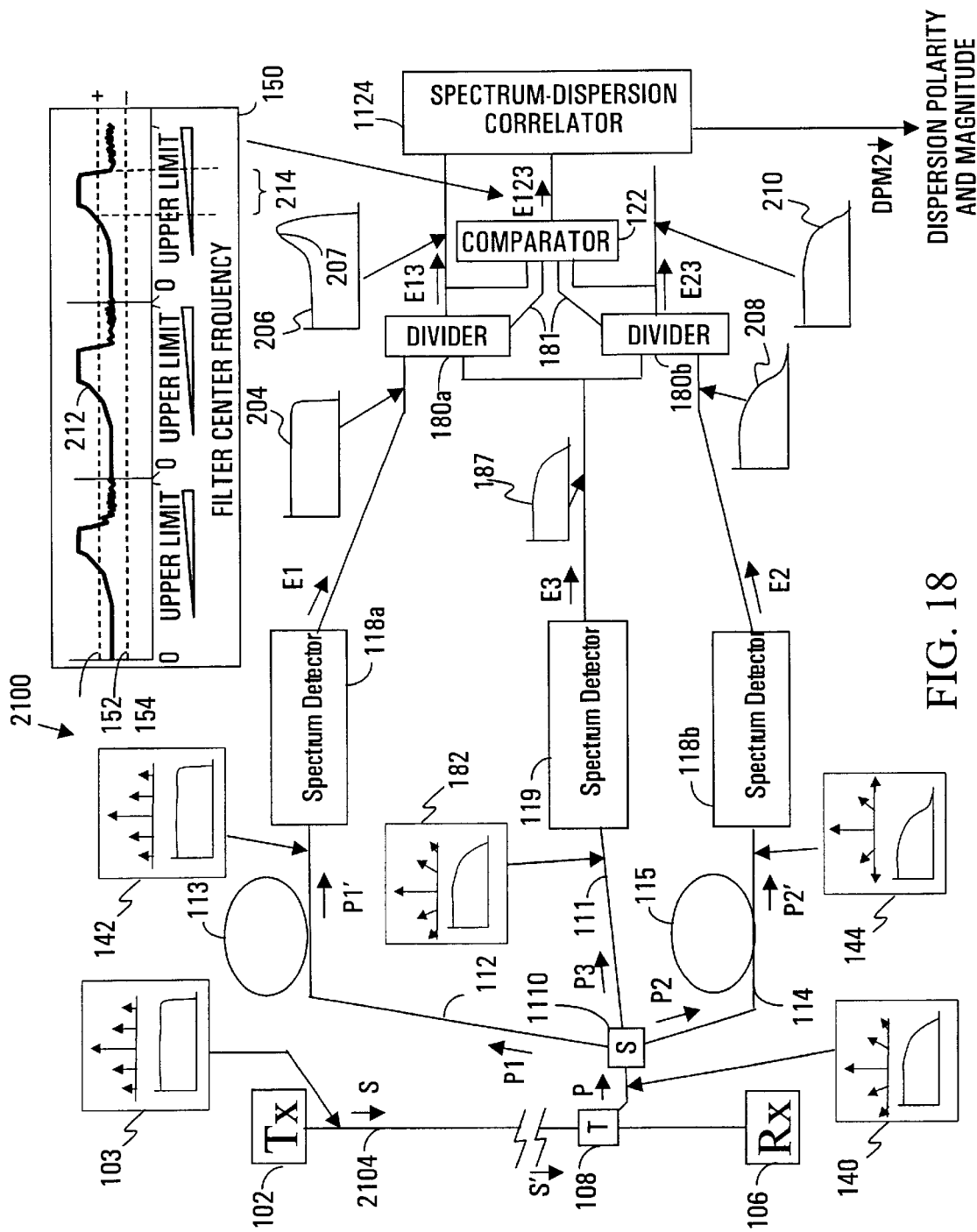
FIG. 18 depicts the operation of the dispersion discriminator of FIG. 15 on an input signal having a moderate amount of negative dispersion.

FIG. 18 shows the operation of the three-armed dispersion discriminator 2100 in the case of an input signal P having negative dispersion. In this case, the phase-amplitude and power spectrum diagrams for the signal P in box 140 display the effects of negative dispersion via rotation of the arrows, which represent the side bands, away from the carrier and a reduction in the −3 dB roll-off frequency compared to those in the box 103 for the signal S. The phase-amplitude and power spectrum diagrams in boxes 142, 182, and 144 display the effects of the positive 112, zero 111, and negative 114 dispersion arms on the signals P1, P3, and P2, respectively. The amplitude vs. time response of the signal E3 is shown by the curve 183. The effect of normalizing the signal E1 with the signal E3 can be observed by comparing curve 204, which corresponds to the signal E1, with curve 206, which corresponds to the normalized signal E13. Effectively, the process of normalization tends to enhance any difference in the power spectrum of the signal P1', P2' from the positive 112 or negative 114 dispersion arm from that of the signal P3 from the zero dispersion arm 111. Curve 210 represents the amplitude vs. time response of the normalized signal E23, which is the signal E3 after being normalized by the signal E2 represented by curve 208. The increase in the −3 dB roll-off frequency in the signal P1 caused by the positive dispersion arm 112 can be observed by a peak 207 in the curve 206. Curve 212 displayed in the box 202 displays the amplitude vs. time response of the signal E123, which is the result of subtracting the signal E23 from the signal E13. The curve 212 extends above the positive threshold 152 for a period 214, corresponding approximately to the duration of the peak 207, where the signal E13 is greater in magnitude than the signal E23, thereby indicating negative dispersion in the input signal P.

An advantage of the three-armed dispersion discriminator 2100 over the two-arm dispersion discriminator 100 is the improved dispersion detection sensitivity gained by adding the zero dispersion arm with which normalization of the power spectrum of signals from the other two arms 112, 114 is enabled, thereby enhancing any differences in their power spectra and allowing ambiguities in the measured spectral roll-off to be resolved. For instance, considering FIG. 9, there are not one, but two dispersion levels, albeit at different pairs of frequencies, that give the same delta between the amplitudes measured in the two arms. This is resolved in the two-arm case by recourse to frequency of roll-off analysis as was mentioned earlier. However in the three arm case, the frequency of roll-off of the two arms can be determined directly against the input signal, rather than against an "anti-dispersed" version of the input signal, resulting in a more accurate measure of the roll-off frequency. More specifically, the measured roll-off frequency $F_{-3dB}$ can be expressed as $F_{-3dB} = (0.125/|D_1 + D_2|)^{1/2}$ where $D1$ is the dispersion on the optical path and $D2$ is the dispersion on one arm of the discriminator.

Clearly, where portions of the optical signal required by the dispersion discriminator can be supplied by the system in which it is used, the optical splitter provided to obtain these portions from a single optical signal is not required and hence may be removed from the dispersion discriminator.

Figure 19:
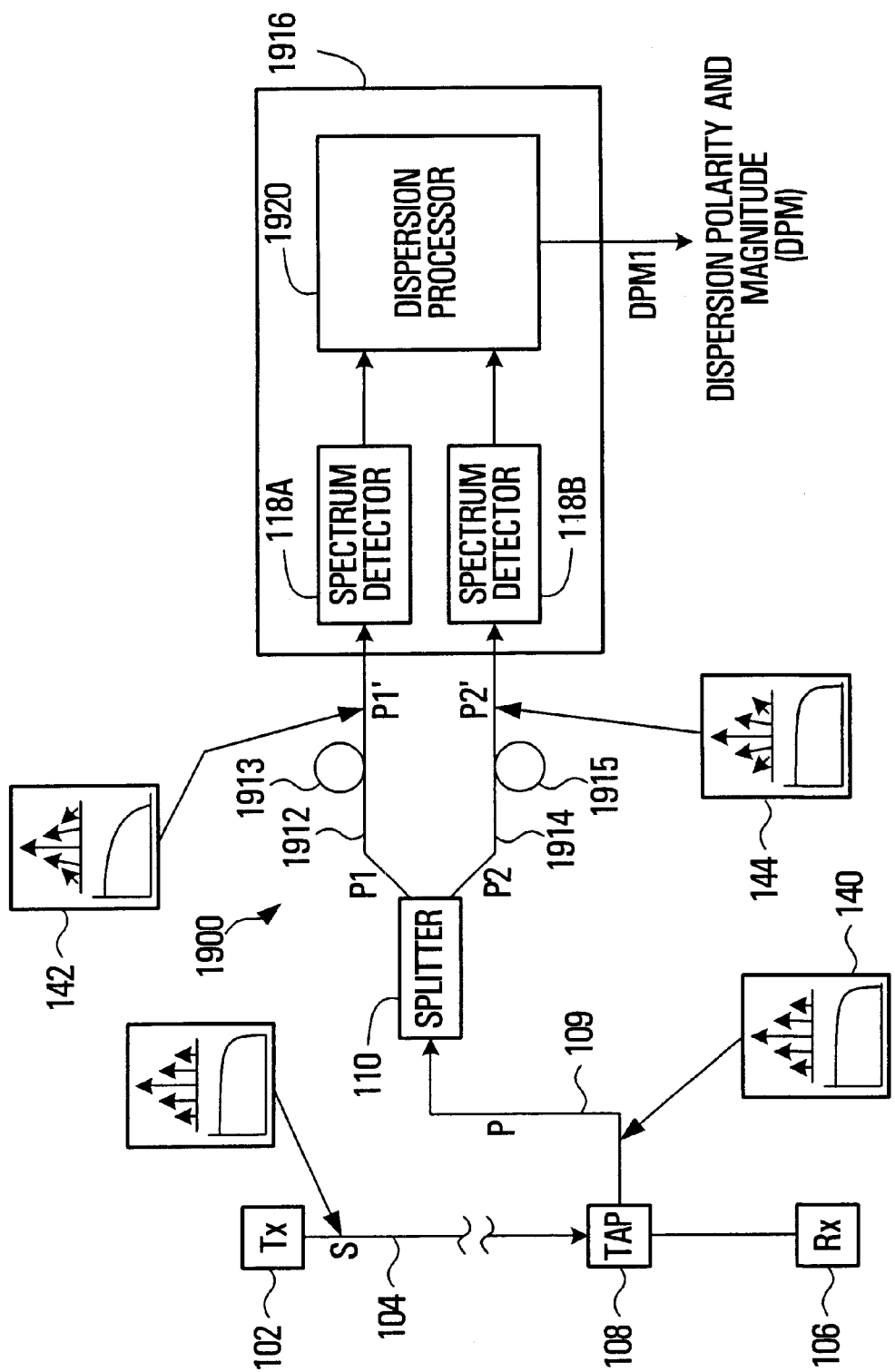
FIG. 19 is a high-level block diagram of a dispersion discriminator in accordance with a first embodiment of the invention.

FIG. 19 shows, in high-level block diagram form, a dispersion discriminator 1900 in accordance with a further embodiment of the invention. The dispersion discriminator 1900 is similar to the dispersion discriminator 100 of FIG. 4 in that it is coupled to part of an optical transmission system (102, 104, 108, 106) and measures the dispersion along that system. More specifically, an optical transmitter 102 transmits an optical signal S over a link 104 (in this case, a zero-dispersion transmission path) which is terminated by an optical receiver 106. As with the dispersion discriminator 100, an optical tap 108 coupled to the link 104 taps a portion P of the signal S and routes this portion P over a short optical fiber 109 to the dispersion discriminator 1900. The optical tap 108 may be asymmetric, such that it taps less than 50% (e.g., 10% or 20%) of the optical energy on the link 104 over to optical fiber 109).

The dispersion discriminator 1900 operates by dividing the signal on optical fiber 109 into two equal portions and adding additional dispersion. In particular, the portion P is received by the discriminator 1900, which includes an optical splitter 110 (e.g., a symmetric eye-splitter) having two outputs and coupled to the fiber 109 at an input. The splitter 110 divides the signal P at its input into two portions represented by signals P1 and P2, provided at its outputs. The portion P1 at one of the outputs of the splitter 110 enters one end of a first dispersion arm 1912 and the portion P2 at the other of the outputs of the splitter 110 enters one end of a second dispersion arm 1914.

The signal P1 traverses the first dispersion arm 1912, which comprises a coil of fiber 1913 exhibiting a first dispersion at the optical frequency (or wavelength) of interest, and the signal P2 traverses the second dispersion arm 1914, which comprises a coil of fiber 1915 exhibiting a second, opposite-polarity dispersion at the optical frequency (or wavelength) of interest. Thus, the first 1912 and second 1914 dispersion arms add amounts of dispersion that are of opposite sign to each of the portions P1 and P2. While not absolutely necessary, it is preferable that the magnitude of the additional dispersion introduced by the first dispersion arm 1912 be substantially equal to the magnitude of the additional dispersion introduced by the second dispersion arm 1914. This allows the following technical benefits to be achieved:

a) it allows a subsequent dispersion detector 1916 to function at a maximum sensitivity and minimum error for zero input dispersion;
   b) it allows the dispersion detector 1916 to respond equally in the magnitude measurement domain to input dispersion of either polarity at a given magnitude;

c) it allows a single unambiguous monotonic dispersion magnitude versus measured frequency calibration curve to be used (see FIG. 26 later on);

d) it allows the dispersion detector to measure dispersion polarity with greater precision;

e) it minimizes chromatic effects within the arms of the dispersion discriminator 1900 itself by maximizing the separation between the two amounts of dispersion added by the two arms and allowing shorter arms to be used.

The two signals P1 and P2 are received by a dispersion detector 1916 that is coupled to the first 1912 and second 1914 dispersion arms at their other ends. As will now be shown in greater detail, the discriminator 1900 is able to determine the amount of dispersion in the signal S after propagating along the transmission link 104 by adding different amounts of dispersion to parts P1 and P2 of the signal S via the first 1912 and second 1914 dispersion arms, and by then examining the impact on the signals P1' and P2' received at the dispersion detector 1916. This is achieved without reference to measurements of the spectrum of the originating signal.

Specifically, the signals P1' and P2' are analyzed by passing them through two conventional spectrum detectors 118a and 118b coupled to the arms 1912, 1914. A dispersion processor 1920 coupled to the detectors 118a, 118b analyzes the respective signals E1, E2 from the detectors 118a, 118b, determines the amount (polarity and. magnitude) of dispersion in the signal S and outputs the resulting determination in a dispersion polarity and magnitude (DPM) output signal DPM1. The output signal DPM1 gives an indication of measured amount (polarity and magnitude) of dispersion in the optical signal input to the dispersion discriminator 1900, and this indication can be used by a dispersion compensating sub-system as shown in above-references U.S. patent application Ser. No. 09/965,810 for compensating the dispersion.

Figure 20:
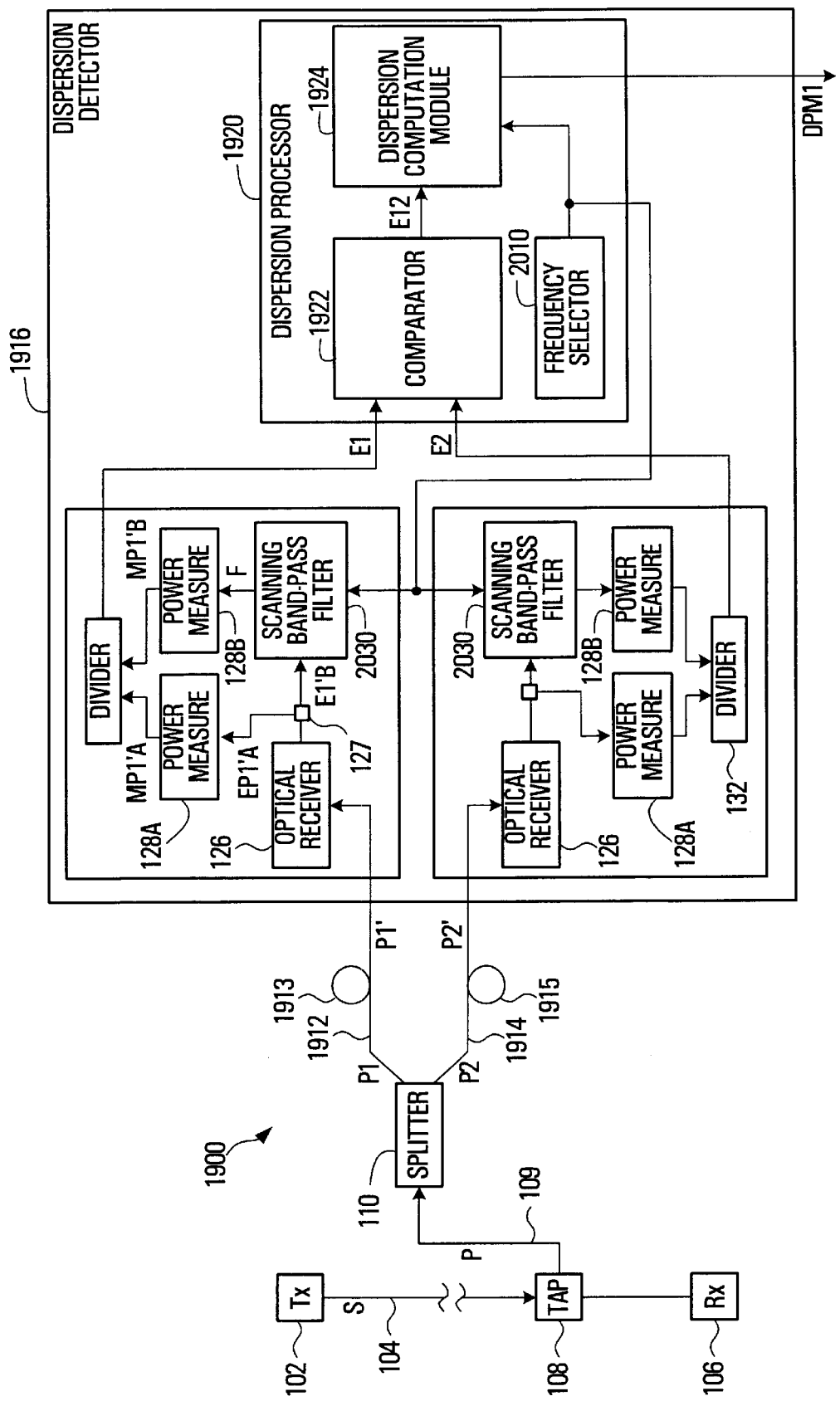
FIG. 20 is a block diagram showing the dispersion discriminator of FIG. 19 in greater detail.

FIG. 20 shows the dispersion discriminator 1900 of FIG. 19 in greater detail. The dispersion detector 1916 includes the spectrum detectors 118a, 18b, coupled between the dispersion arms 1912, 1914 and the dispersion processor 1920. The first spectrum detector 118a is coupled between the first dispersion arm 1912 and the dispersion processor 1920, while the second spectrum detector 118b is coupled between the second dispersion arm 1914 and the dispersion processor 1920. Since the spectrum detectors 118a, 118b have the same internal structure, as depicted by the functional block diagram in FIG. 20, a description of the first spectrum detector 118a only should suffice in order to understand the present embodiment of the invention.

The first spectrum detector 118a includes an optical receiver 126 with an input coupled to the input of the detector 118a and with an output coupled to an electrical splitter 127. The optical receiver 126 linearly receives (i.e., linearly demodulates and converts) the optical signal P1' to d.c. coupled analog electrical signal EP1' representing the analog envelope of the modulated optical carrier. The electrical splitter 127 splits the signal EP1' into two signals EP1'a and EP1'b of equal power. One output of the splitter 127 is coupled to the input of a power measuring device 128a (which measures the mean d.c. level on the receiver output and hence the received input power), whose output is coupled to the input of a divider 132. The other output of the splitter 127 is coupled to the input of a scanning band-pass filter 2030, whose output is coupled to the input of another power measuring device 128b.

The scanning band-pass filter 2030 is operable to admit, at its output, the portion of the signal received at its input which occupies a time-varying, controllable range of electrical frequencies. More specifically, this range of electrical frequencies will be characterized by a scan center electrical frequency which begins at a low electrical frequency (at or near d.c.) and increases over time to a high electrical frequency (e.g., several MHz or above). Control of the instantaneous center electrical frequency of the electrical frequency range admitted by the scanning band-pass filter 2030 in both spectrum detectors 118a, 118b may be achieved by an electrical frequency selector 2010 in the dispersion processor 1920. Thus, the electrical frequency selector 2010 provides its output to the scanning band-pass filters 2030 in each of the spectrum detectors 118a, 118b as well as to the dispersion computation module 1924.

As an alternative to a single scanning band pass filter 2030, it is within the scope of the present invention to use a bank of fixed filters of relatively narrow bandwidth about different scan center electrical frequencies, each of which has its own power measurement block or which may be switched sequentially to a common power measurement block. Control of the filter currently being used to admit the signal received from the splitter 127 could be provided by the electrical frequency selector 2010. The identity of the actual block being used at a given time would be communicated by the electrical frequency selector 2010 to the dispersion computation module 1924 in order to provide information as to the electrical frequency range of the signal currently being admitted by the spectrum detectors 118a, 118b. This alternative arrangement has the advantage that multiple measurements can be done in parallel.

The output of the other power measuring device 128b is coupled to another input of the divider 132, while the output of the divider 132 is coupled to the output of the spectrum detector 118a which is connected to an input of the dispersion processor 1920. A power measurement MP1'a is made on the signal EP1'a by the power measuring device 128a and another power measurement MP1'b is made by the other power measuring device 128b on a portion F of the signal EP1'b in the electrical frequency range currently being admitted by the scanning band-pass filter 2030 under control of the electrical frequency selector 2010. The first power measurement MP1'a is divided by the second power measurement MP1'b in the divider 132 and the result E1 is output to the dispersion processor 1920.

Thus, the scanning band-pass filter 2030 and second power measuring device 128b form a scanning filter-power measuring device, which scans electrical frequency and measures the power MP1'b of selected spectral components F in the signal EP1'b. This sequence of measurements MP1'b is then normalized by dividing it by the total received power MP1'a to remove any effects from different losses, receiver sensitivities between the discriminator arms 1912, 1914, etc. The second spectrum detector 118b operates in a like fashion to produce, from the signal P2', a signal E2 which is also output to the dispersion processor 1920. Thus, the normalized output sequence E1, E2 from the divider 132 associated with each discriminator arm 1912, 1914 is fed to the dispersion processor 1920.

The dispersion processor 1920 includes a comparator 1922 having two inputs respectively coupled to the spectrum detectors 118a, 118b, as well as an output. The comparator 1922 can be similar or identical to the comparator 122 in FIG. 10. The comparator 1922 is operable to produce, at its output, an indication of the difference in the ratios E1, E2 of the power measurements made by the spectrum detectors 118a, 118b. The output of the comparator 1922 is coupled to a first input of a dispersion computation module 1924. The dispersion computation module 1924 has a second input for receiving the output of the electrical frequency selector 2010 that controls the scan center electrical frequency of the scanning band-pass filters 2030. In this way, the dispersion compensation module 1924 has knowledge of the scan center electrical frequency of the scanning band-pass filters 2030 that is associated with the difference measurement currently being supplied by the comparator 1922.

The dispersion computation module 1924 determines the amount of dispersion on the input signal P by (i) identifying a particular scan center electrical frequency at which the difference supplied by the comparator 1922 falls outside a predetermined range (defined by upper and lower bounds) and (ii) mapping this particular scan center electrical frequency to a dispersion polarity and magnitude. The dispersion computation module 1924 can be implemented with a microprocessor running a program stored in an on-chip, or external, memory that performs a table look-up or mathematical computation in order to obtain the final dispersion value. Further details of this process are given immediately below. The dispersion computation module 1924 outputs this determination of dispersion value in the signal DPM1.

Those skilled in the art will appreciate that there are various ways in which the output of the comparator 1922 in the discriminator 1900 of FIGS. 19 and 20 can be used by the dispersion computation module 1924 to determine the particular scan center electrical frequency at which the difference in power spectral density falls outside a predetermined range. With reference to the following, there is shown a series of mathematical calculations that lead to the desired result.

Let the transmission link 104 be "T" km long and consist of fiber with a dispersion coefficient of "D" ps/GHz-km. The dispersion on the transmission link is therefore "T*D" ps/GHz. Let the dispersion discriminator 1900 have two arms 1912 and 1914, each of length "L1" or "L2" km and of dispersion "d1" or "d2" ps/GHz-km. Let the frequency of a particular sideband component of the signal be represented as "F" GHz and let the rotation of that sideband component be "r" radians. Furthermore, let "C" denote the proportion of the sideband component recovered relative to what would have been recovered with no phase shifts or delays due to dispersion. In such a case, $$c = 1/F \text{ ns}, \quad (i)$$

where "c" is the duration of one cycle of the sideband frequency F during which its phase vector would rotate $2*\pi$ radians;

$$t_T = F*(T*D)/1000 \text{ ns}, \quad (ii)$$

where "$t_T$" is the level of dispersion, as a time difference between the carrier and the sideband frequency F after traversing the transmission path;

$$t_{T+A1} = F*[(T*D) + (L1*d1)]/1000 \text{ ns}, \quad (iii)$$

where "$t_{T+A1}$" is the level of dispersion, as a time difference between the carrier and the sideband frequency F after traversing the transmission path and arm 1912;

$$t_{T+A2} = F*[(T*D) + (L2*d2)]/1000 \text{ ns}, \quad (iv)$$

where "$t_{T+A2}$" is the level of dispersion, as a time difference between the carrier and the sideband frequency F after traversing the transmission path and arm 1914;

$$2*r_T = 4*\pi*t_T/c = \{4*\pi*F*(T*D)/1000\}/(1/F) = 4*\pi*F^{2*}(T*D)/1000 \quad (v)$$

where $2*r_t$ is the phase shift between the upper and lower sideband components (frequecies F and –F) after traversing the transmission path;

$$2*r_{T+A1} = 4*\pi*t_{T+A1}/c = \{4*\pi*F*[(T*D) + (L1*d1)]/1000\}/(1/F) = 4*\pi*F^{2*}[(T*D) + (L1*d1)]/1000, \quad (vi)$$

where "$2*r_{T+A1}$" is the phase shift between the upper and lower sideband components (frequencies F and –F) after traversing the transmission path and arm 1912;

$$2*r_{T+A2} = 4*\pi*t_{T+A2}/c = \{4*\pi*F*[(T*D) + (L2*d2)]/1000\}/(1/F) = 4*\pi*F^{2*}[(T*D) + (L2*d2)]/1000 \quad (vii)$$

where "$2*r_{T+A1}$" is the phase shift between the upper and lower sideband components (frequencies F and –F) after traversing the transmission path and arm 1914;

$$C_T = |\cos(2*r_T)| = |\cos(4*\pi*F^{2*}(T*D)/1000)| \text{ or, in dB terms, } C_T \text{ (dB)} = 10 \log[|\cos(4*\pi*F^{2*}(T*D)/1000)|], \quad (viii)$$

where $C_T$ is the real component of the relative magnitude of the sideband component after transmission down the fiber;

$$C_{T+A1} = |\cos(2*r_{T+A1})| = |\cos(4*\pi*F^{2*}(T*D + L1*d1)/1000)| \text{ or, in dB terms, } C_{T+A1} \text{ (dB)} = 10 \log[|\cos(4*\pi*F^{2*}(T*D + L1*d1)/1000)|], \quad (ix)$$

where $C_{T+A1}$ is the real component of the relative magnitude of the sideband component after transmission down the fiber and arm 1912;

$$C_{T+A2} = |\cos(2*r_{T+A2})| = |\cos(4*\pi*F^{2*}(T*D + L1*d2)/1000)| \text{ or, in dB terms, } C_{T+A2} \text{ (dB)} = 10 \log[|\cos(4*\pi*F^{2*}(T*D + L1*d2)/1000)|], \quad (x)$$

where $C_{T+A2}$ is the real component of the relative magnitude of the sideband component after transmission down the fiber and arm 1914;

$$U1 = C_{T+A1} - C_{T+A2} \text{ or, in dB terms, } U1 \text{ (dB)} = 10 \log[|\cos(4*\pi*F^{2*}(T*D + L1*d1)/1000)|] - 10 \log[|\cos(4*\pi*F^{2*}(T*D + L2*d2)/1000)|], \quad (xi)$$

where U1 represents the difference in the real component of the relative magnitude of the sideband component after transmission down the fiber and each of the two arms 1912, 1914; and $$U2 = -U1 = C_{T+A2} - C_{T+A1} \text{ or, in dB terms, } U2 \text{ (dB)} = 10 \log[|\cos(4*\pi*F^{2*}(T*D + L2*d2)/1000)|] - 10 \log[|\cos(4*\pi*F^{2*}(T*D + L1*d1)/1000)|]. \quad (xii)$$

In one embodiment, F is increased from a minimum scan center frequency and the relative differences U1 and U2 are monitored until either U1 or U2 exceeds a threshold (u/t). Conversely, U1 can be monitored until it either exceeds (u/t) or falls below (–u/t) or a different value (–u/t)*. The value of "u/t" is a dB value, typically in the range of 1–3, though other values can be used. Depending on whether it is U1 or U2 that has exceeded the threshold, one can determine the polarity of the dispersion on the transmission link. In another embodiment, the difference would be absolute, i.e., it could be measured as $C_{T+A1} - C_{T+A2}$ vs. $C_{T+A2} - C_{T+A1}$ (without the dB factor). In such a case, depending on whether it is $C_{T+A1} - C_{T+A2}$ or $C_{T+A2} - C_{T+A1}$ that has exceeded the threshold, one can determine the polarity of the dispersion on the transmission link. Meanwhile, the value of F at which the threshold is crossed can be denoted $F_{thresh}$, which, when combined with the polarity, can be associated to a unique value of the transmission link dispersion. Note again that the upper and lower bounds of the predetermined range need not be symmetrically disposed about zero.

Figure 25:
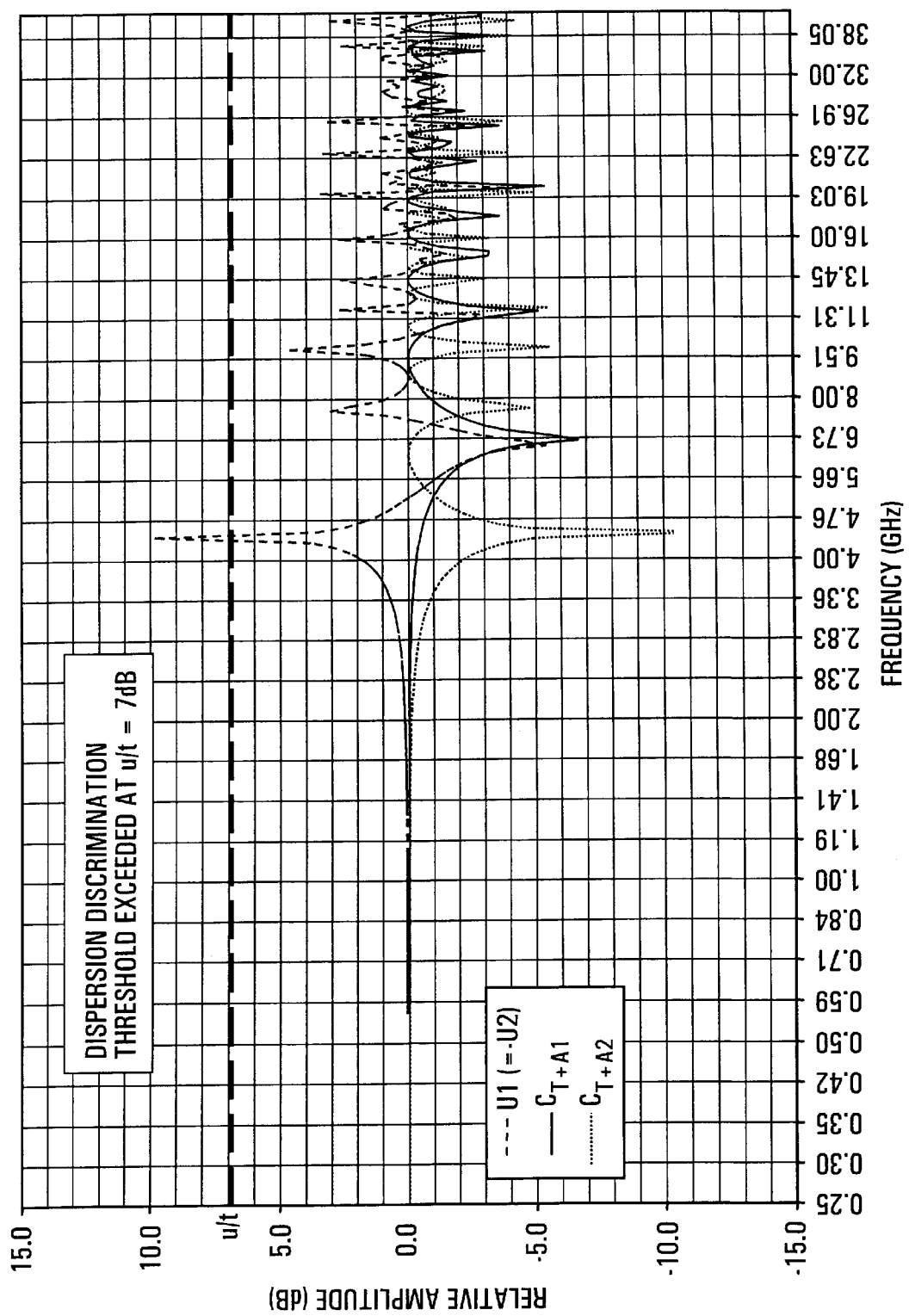
FIG. 25 is a graph showing magnitude-versus-scan-center-frequency curves for each of two discriminator arms as well as a difference curve representative of the difference between the two magnitude-versus-scan-center-frequency curves.

FIG. 25 is a graph showing the curves of $C_{T+A1}$ vs. F, $C_{T+A2}$ vs. F, and U1 vs. F for an example value of positive dispersion (since $C_{T+A2}$ rolls off before $C_{T+A1}$). Of course, the curve of U2 vs. F will be the exact opposite of the curve of U1 vs. F. It is noted that there is a roll-off in $C_{T+A1}$ and $C_{T+A2}$, resulting in the development of notches at increasingly closely spaced values of F. The evolution of U1 vs. F therefore results in a curve that exceeds a threshold u/t at a given frequency $F_{thresh}$.

Assuming that it is U1 that has crossed "u/t" then one has:

$$u/t \text{ (dB)}=10 \log[|\cos (4*\pi*F_{thresh}^{2}*(T*D+L1*d1)/1000)|]-10 \log [|\cos (4*\pi*F_{thresh}^{2}*(T*D+L2*d2)/1000)|]. \quad \text{(xiii)}$$

Since all of "u/t", PI, $F_{thresh}$, L1, d1, L2, d2 are known and since scanning was begun from the lowest scan center frequency, it should be apparent that the solution to the above equation will yield the lowest possible angular solution for the "cos" term. This leaves the only unknowns as being T and D. However, since T and D only appear above in Equation (xiii) in the form T*D, the only unknown is T*D, which is the total dispersion along the transmission link, as desired. Moreover, if the fiber type (and hence T) is known, then in addition the length of the transmission path along which originates the incoming signal can be computed.

Figure 26:
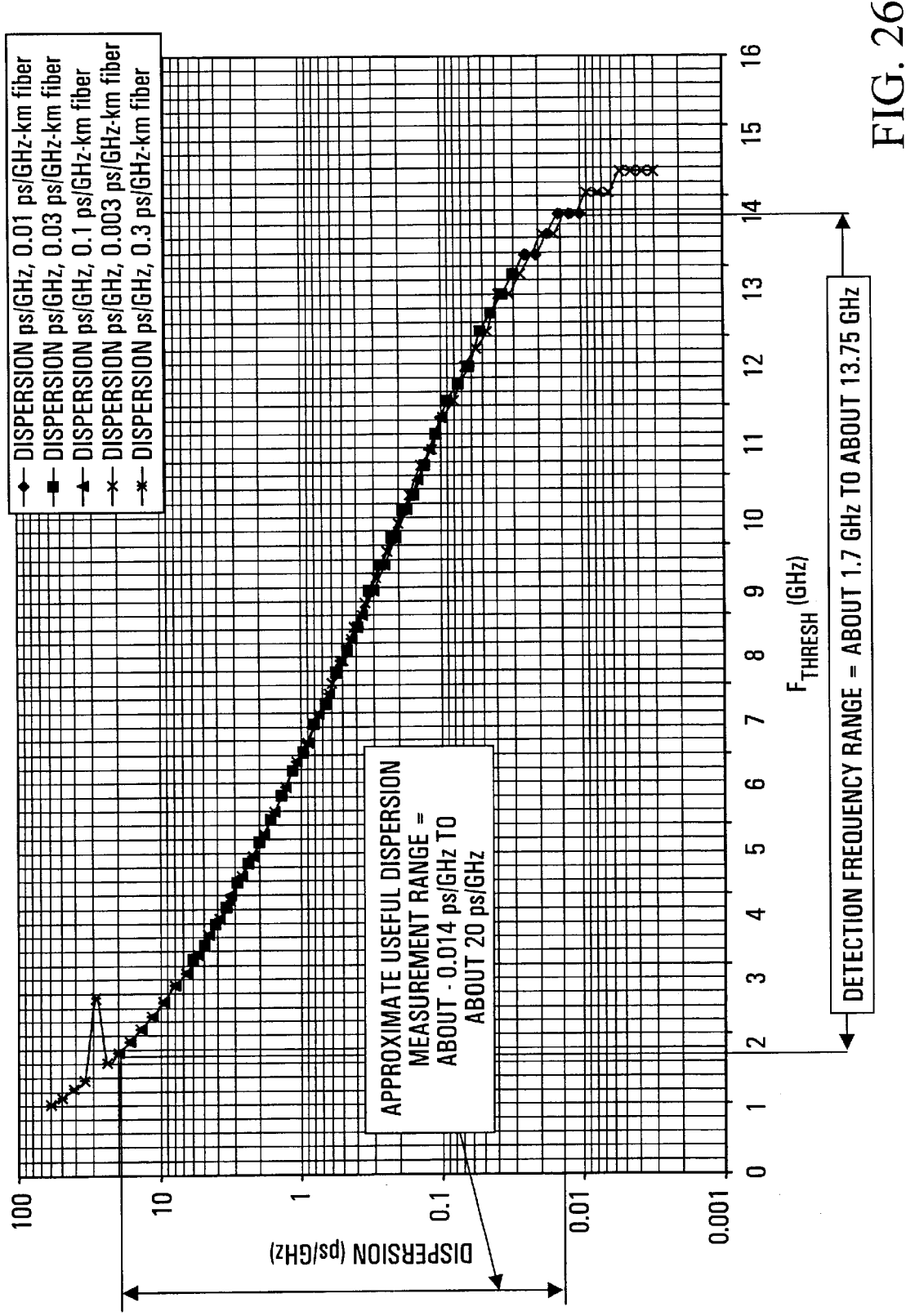
FIG. 26 is a graph illustrating a mapping between the frequency at which the difference curve exceeds a predetermined threshold and the dispersion along the transmission path leading to the dispersion discriminator.

An example set of curves of measured dispersion (T*D) versus threshold frequency ($F_{thresh}$) are shown in FIG. 26, based on a simulation for a specific set of values (L1*d1), (L2*d2) for the additional dispersion in the arms 1912, 1914 and for a specific value of the threshold "u/t". The curves represent different values of the dispersion coefficient "D" for the transmission link 104. It is noted that the various curves in FIG. 26 exhibit a very similar behaviour, which means that irrespective of the type of fiber on the transmission link 104, the same mapping from $F_{thresh}$ to (T*D) is obtained. This advantageous property follows from using a balanced detector, i.e., by setting (L1*d1) to be substantially equal in magnitude and opposite in polarity to (L2*d2). It should also be apparent to those skilled in the art that once several points on a given curve are obtained, the mapping of $F_{thresh}$ to (T*D) for a value of $F_{thresh}$ that is not in the initial set of points can be obtained by an interpolation of the given curve.

Thus, there are at least three ways of solving for T*D when given $F_{thresh}$ (and u/t), namely by analytical/numerical solution of the transcendental equation (xiii), by look-up table based on a pre-computed, finely granular curve of the type shown in FIG. 26 or by interpolation of a sparsely populated curve of the type shown in FIG. 26.

Figure 24:
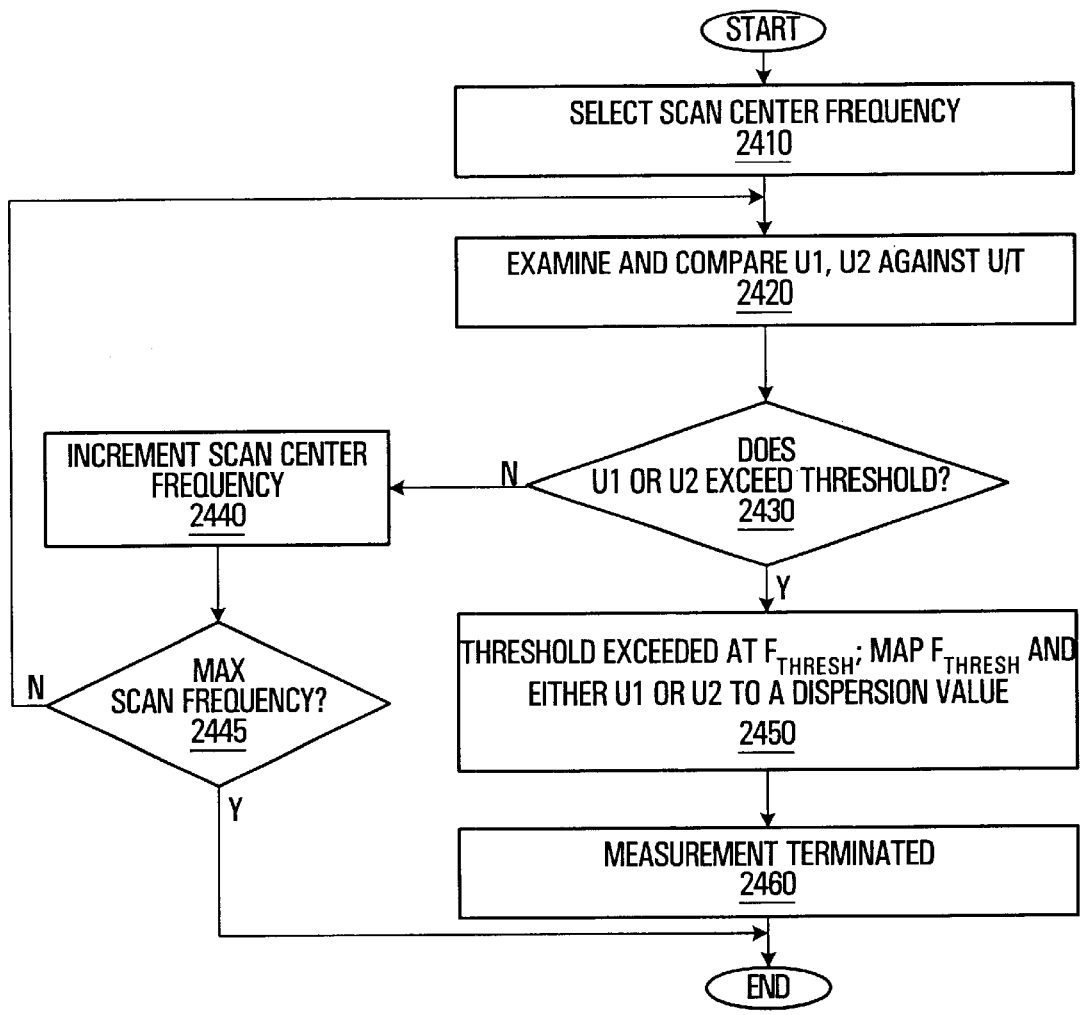
FIG. 24 is a flowchart indicating a sequence of events involved in determining the amount of dispersion on in an input signal, according to the embodiment of FIGS. 19 and 20.

With reference now to FIG. 24, operation of the magnitude calculation of the dispersion discriminator is now described, the polarity determination being directly from which of U1, U2 is the larger when the magnitude calculation is taken. At step 2410, the frequency selector 2010 sets the scan center frequency to its minimum value. At step 2420, the quantities U1, U2 are examined and compared against the pre-set discrimination threshold "u/t". In an alternative embodiment of the present invention, it is verified whether either U1 exceeds "u/t" or falls below "−u/t".

At step 2430, it is verified whether U1 or U2 exceeds the threshold "u/t". If neither U1 nor U2 exceeds the threshold "u/t", then at step 2440, the scan center frequency is incremented by one step and the process returns to step 2420. If the maximum scan center frequency is reached, then either there is no measurable dispersion on the transmission path or no signal is present. However, if the threshold is exceeded at step 2430, then at step 2450 it is noted whether U1 or U2 triggered the crossing (which gives polarity information) and the scan center frequency $F_{thresh}$ at which the threshold is crossed is also noted. Based upon this scan center frequency $F_{thresh}$, the calculation in Equation (xiii) (or a table look-up) is performed in order to evaluate the dispersion value, following which the measurement is terminated.

It is noted that since the dispersion discriminator 1900 operates by comparing modified to unmodified, or differently modified versions of the same signal, it makes no assumptions or demands on the data format, bit-rate or spectrum of the signal other than that there must be signal spectral energy present at the frequencies F where the discriminator 1900 operates. Furthermore, the dispersion discriminator 1900 does not need information on the originating spectrum of the signal. Various examples of operation of the present invention are now described.

Figure 21:
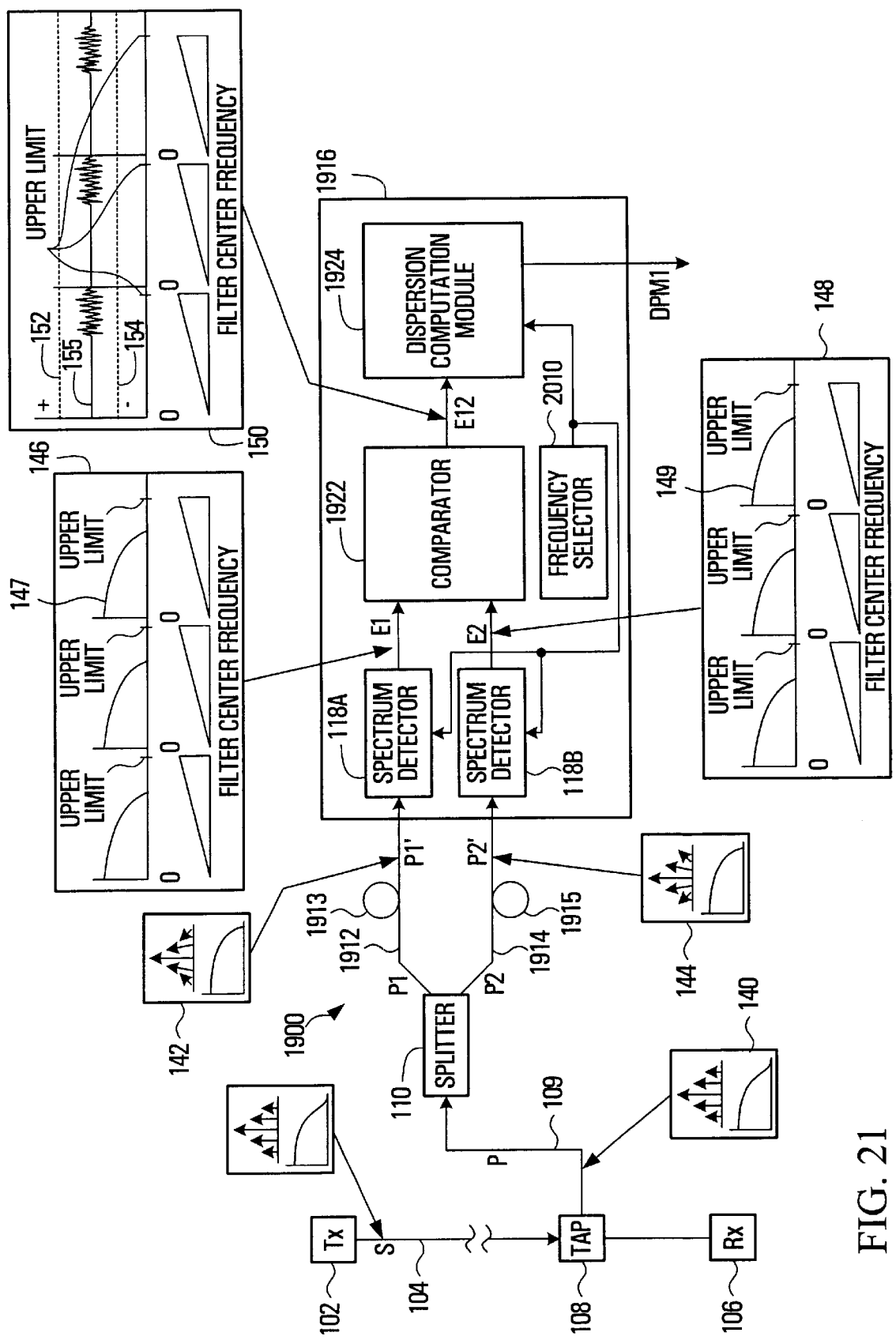
FIG. 21 depicts the operation of the dispersion discriminator of FIG. 20 on an input signal having negligible dispersion.

FIG. 21 is a diagram of the dispersion discriminator of FIG. 20 with waveforms of certain signals to explain its operation. The portion P of the signal S, transmitted by the optical transmitter 102, is tapped from the transmission link 104 by the tap 108 and input to the dispersion discriminator 1900. The phase-amplitude and power spectrum diagrams for the signal P are shown in a box 140 beside the signal P. From these diagrams, it can be observed that the signal P has no dispersion, and hence represents a zero-dispersion source to the dispersion discriminator 1900. The signal P is split into the two signals P1 and P2 by the splitter 110. After traversing the first 1912 and second 1914 dispersions arms respectively, the altered versions P1' and P2' of the signals P1 and P2 arrive at the inputs of the dispersion detector 1916. Phase-amplitude and power spectrum diagrams are shown in boxes 142 and 144 for the altered signals P1' and P2', respectively.

In this particular situation, it can be seen that the signal P1' has a positive dispersion (i.e. arrows in phase-amplitude diagram are rotated towards the carrier) and that the signal P2' has a negative dispersion (i.e. arrows in the phase-amplitude diagram are rotated away from the carrier). This is because arms 1912 and 1914 add positive and negative dispersion, respectively.

The operation of the spectrum detectors 118a and 118b was described previously with respect to FIG. 20. Specifically, the first spectrum detector 118a outputs the signal E1 and the second spectrum detector 118b outputs the signal E2. Amplitude vs. time curves 147 and 149 for these signals E1 and E2 are shown in boxes 146 and 148, respectively. As indicated by the curves 147, 149 the amplitude of the signals E1, E2 remain constant initially, but roll off in amplitude with time as of the center frequency of the scanning band-pass filter 2030 in each spectrum detector 118a, 118b is increased, with additional notches appearing in the amplitude spectrum at higher frequencies. The signals E1 and E2 are input to the comparator 1922 and the resultant signal E12 is input to the dispersion computation module 1924. An amplitude vs. time curve 155 of the signal E12 is shown in a box 150. The curve 155 remains at a relatively constant value, with some small amount noise when the signals E1 and E2 have low levels, and between positive 152 and negative 154 decision thresholds (i.e., u/t and −u/t, respectively). Since the signal E12 does not cross either of the thresholds 152, 154, the comparator 1922 provides the dispersion computation module 1924 with the indication of zero dispersion in the input signal P. This result is indicated in the signal DPM1 output by the dispersion computation module 1924.

For further clarity, the normalized power measurements represented by the signals E1 and E2 track the power spectral density of the modulation sidebands at the input to the discriminator optical receivers 126. Whilst the relationship of these normalized power measurements to the power of the source transmitter 102 is unknown (i.e. the original line code may have had a roll-off in its spectrum) the difference in the strength with which the signals P1', P2' are received is determined, for each of a plurality of scan center frequencies, by comparing the outputs E1, E2 of the two spectrum detectors 118a, 118b at each scan center frequency. Any perturbations in the originating spectrum will result in a common-mode effect, but perturbations due to transmission will result in a differential effect. Under such conditions, it is not necessary to have a copy of the original data to determine the polarity of the dispersion.

Figure 22:
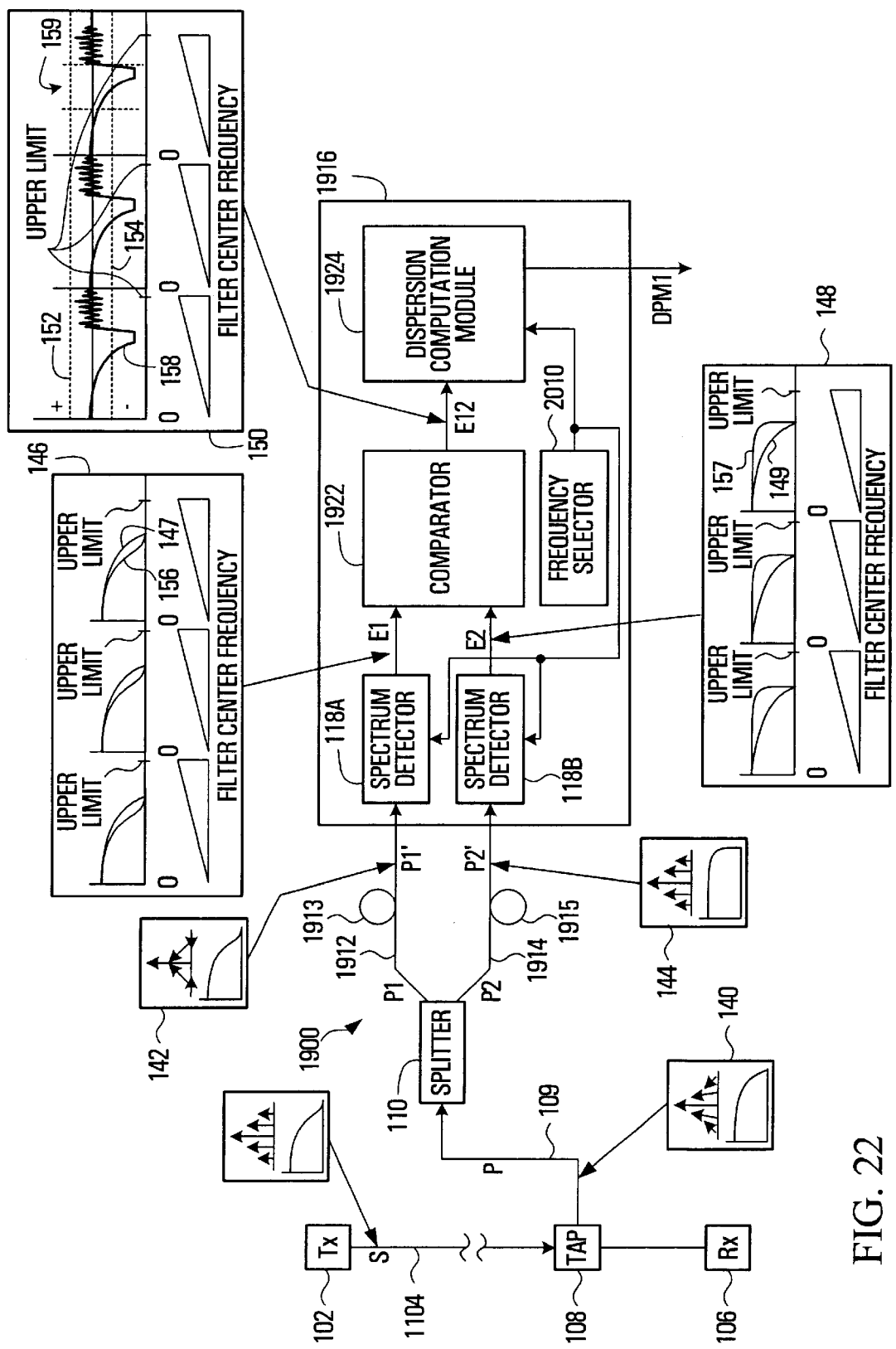
FIG. 22 depicts the operation of the dispersion discriminator of FIG. 20 on an input signal having a moderate amount of positive dispersion.

FIG. 22 shows the operation of the discriminator 1900 with a moderate amount of positive dispersion in the input signal P. Under this condition, when the first dispersion arm 1912 applies positive dispersion, the sidebands of the signal P1' will be further band-limited, as can be observed from the phase-amplitude and power spectrum diagrams in the box 142. Similarly, if the second dispersion arm 1914 adds negative dispersion, then the second dispersion arm 1914 partially or fully compensates for the positive dispersion on the input signal P. This compensation can be observed from the phase-amplitude and power spectrum diagrams in the box 144 for the signal P2'. As a result of propagating along the first 1912 and second 1914 dispersion arms, the signals P1' and P2' have different bandwidths. This difference can be determined by comparing the spectra of the signals E1 and E2 at the outputs of the spectrum detectors 118a and 118b.

The scanning band-pass filter 2030 and power measuring device 128b in each spectrum detector 118a, 118b provide a crude spectral analysis. Typically, the scanning band-pass filter 2030 could have a filter "Q" value in the order of 15–50. Alternatively, an arrangement including a series of fixed filters, each with a power monitor, and each spaced approximately $\frac{1}{16}^{th}$ to $\frac{1}{32}^{nd}$ of an octave apart, over the range 800 MHz–8 GHz could be used, though a lower number of points can be used with degraded resolution. This arrangement would result in the need for 3.2×16=about 52 filters/receivers, which would be simple and low cost since most of the filters (those from about 800 MHz to about 3 GHz) could be simple resonant structures on a printed circuit board (e.g. resonant quarter-wave stubs). Whether a scanning band-pass filter 2030, a series of scanning filters, or a bank of fixed filters is used, the power measurements are processed in the same way. Alternatively, a fixed filter shape and a heterodyne scanning technique could be used. In this case, the signal is combined with a scanning radio-frequency (RF) source and the resultant sum or difference components are filtered in a fixed microwave filter. This replaces the array of filters with a sweep oscillator, a mixer and a single fixed filter.

Curves 156 and 157 in the boxes 146 and 148 respectively display amplitude vs. time of the signals E1 and E2. These signals E1 and E2 correlate to the frequency spectra of the signals P1' and P2', which are input to the dispersion detector 1916. The comparator 1922 processes these signals E1 and E2 in a manner which effectively compares the power measurements starting from the lowest scan center frequency and moving to an upper limit to determine a particular scan center frequency at which the absolute or relative difference between the power spectral densities of the two signals P1' or P2' input to the dispersion detector 1916 falls outside a predetermined range. For example, it has been described how the center frequency of the scanning bandpass filters 2030 is increased until either U1 or U2 exceeds the threshold u/t. By effecting this comparison starting with lower frequencies and moving to higher ones, detection of the lowest particular scan center frequency is enabled, thus resolving any ambiguity in Equation (xiii).

Curve 158 in the box 150 shows the amplitude vs. time of the signal E12 output from the comparator 1922. The dispersion computation module 1924 receives the signal E12 from the comparator 1922 and uses the polarity as well as the magnitude of this signal to determine the polarity and magnitude of dispersion in the signal P. This determination is made by using the data relating the difference in the real component of the relative magnitude of the sideband component after transmission down the fiber and each of the two arms 1912, 1914 to transmission path dispersion (T*D) for known amounts of dispersion in the first 1912 and second 1914 arms. To this end, Equation (xiii) may be used. Alternatively, this data may be kept in the form of a table which is indexed according to (a) U1-U2; (b) u/t; (c) whether it is U1-U2 or U2-U1 that has exceeded u/t; (d) L1 , L2, d1, d2. The resulting determination of the dispersion in the input signal P is output by the dispersion computation module 1924 in the signal DPM1.

Figure 23:
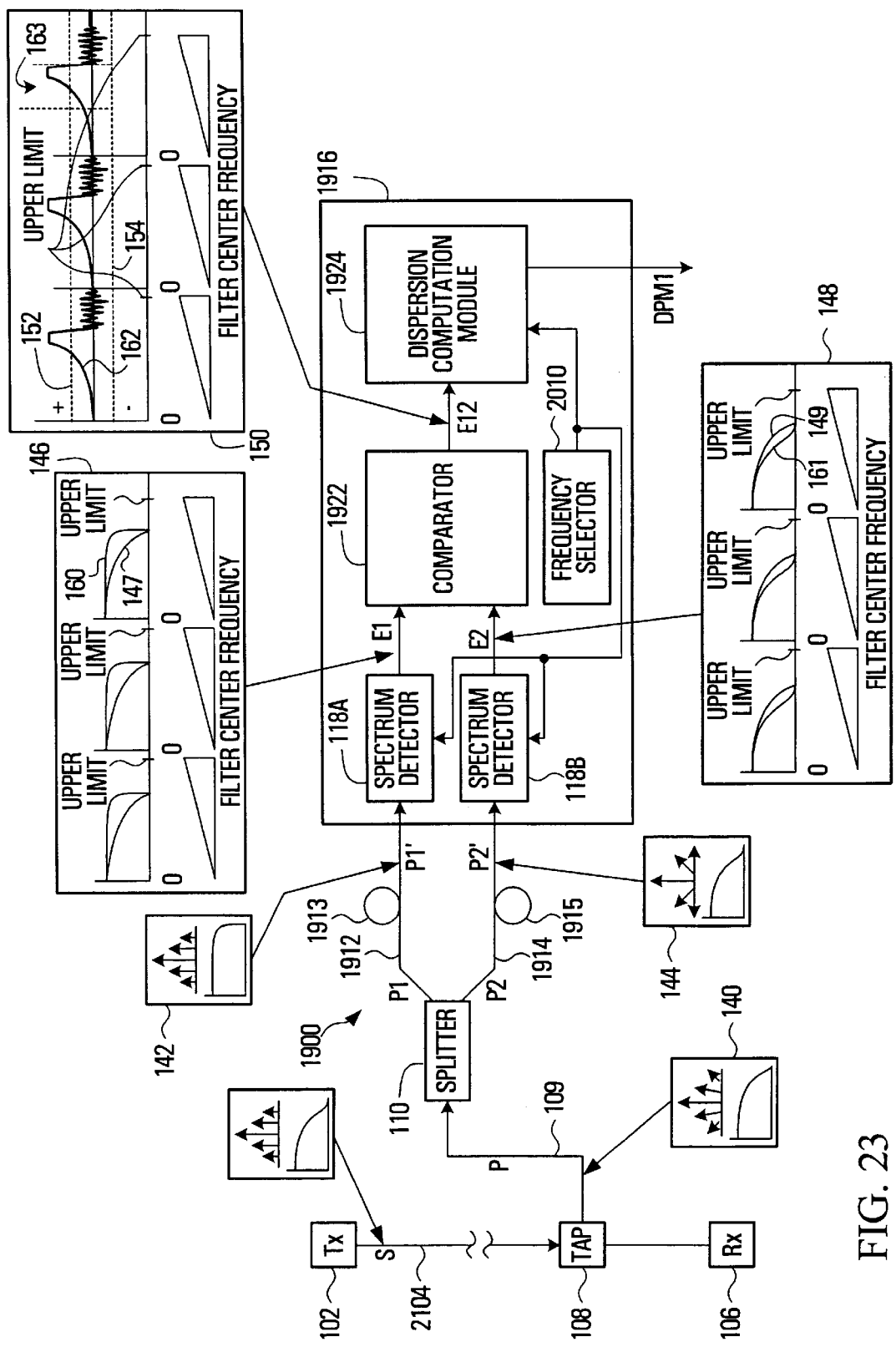
FIG. 23 depicts the operation of the dispersion discriminator of FIG. 20 on an input signal having a moderate amount of negative dispersion.

FIG. 23 shows the operation of the dispersion discriminator 1900 with a moderate amount of negative dispersion in the input signal P. Note that in this case, the effects of the two arms 1912, 1914 have been reversed. The output of the comparator 1922 remains within the range defined by [−u/t, u/t] until a sufficiently high scan center frequency has been reached, at which point the magnitude of the difference between the signals E1 or E2 will cause the output of the comparator 1922 to eventually fall outside the predetermined range. Amplitude vs. time curves 160 and 161 of the signals E1 and E2 are shown in the boxes 146 and 148, respectively. Curve 162 representing amplitude vs. time of the output signal E12 of the comparator 1922 is shown in the box 150. The curve 162 is above the positive threshold 152 for a period of time 163 in which the signal E1 is greater in magnitude than the signal E2, thereby indicating negative dispersion in the input signal P of the dispersion discriminator 1900.

Those of ordinary skill in the art will appreciate that numerous modifications may be made without departing from the scope of the invention. For example, different upper and lower thresholds may be selected. Also, the range of scan center frequencies can be varied. Also, by scan "center" frequency is meant any frequency that distinguishes one narrow frequency range from another one admitted by the scanning band-pass filters 2030. Moreover, it is not necessary to restrict the measurements to ones of power spectral density. It is plainly within the scope of the present invention to allow for measurements of root-mean-square power or other characteristics, with different averaging functions, and with or without normalization.

Numerous other alterations, variations and adaptations to the embodiments of the invention described above are possible within the scope of the invention, which is defined by the claims appended hereto.

I claim:

1. A dispersion discriminator for determining an amount of dispersion in an amplitude modulated optical signal from two portions of the optical signal, comprising:
 a first dispersion arm for causing a first additional amount of dispersion in a first portion of the optical signal;
 a second dispersion arm for causing a second additional amount of dispersion in a second portion of the optical signal, said first and second additional amounts being of opposite polarity; and a dispersion detector capable of:
- receiving the first and second portions of the optical signal from the respective dispersion arms;
- detecting, for each of a plurality of electrical frequencies, a difference in a characteristic of the first and second portions of the optical signal;
- determining a particular electrical frequency at which said difference falls outside a predetermined range; and
- mapping the particular electrical frequency and the difference at the particular electrical frequency to a magnitude of dispersion in the optical signal.

2. A dispersion discriminator as defined in claim 1, wherein determining a particular electrical frequency at which said difference falls outside a predetermined range includes determining a particular electrical frequency at which said difference exceeds a predetermined upper bound or falls below a predetermined lower bound, wherein the dispersion detector is further capable of:
- concluding that the dispersion in the optical signal is of a first polarity if said difference exceeds the predetermined upper bound at the particular electrical frequency; and
- concluding that the dispersion in the optical signal is of a second polarity opposite to the first polarity if said difference falls below the predetermined lower bound at the particular electrical frequency.

3. A dispersion discriminator as defined in claim 2, wherein receiving the first and second portions of the optical signal from the respective dispersion arms includes converting each of the first and second portions of the optical signal into respective first and second converted signals.

4. A dispersion discriminator as defined in claim 3, wherein detecting, for each of a plurality of electrical frequencies, a difference in a characteristic of the first and second portions of the optical signal includes detecting a difference in power spectral density of the first and second converted signals within a band of electrical frequencies centered about each of the plurality of electrical frequencies.

5. A dispersion discriminator as defined in claim 2, wherein detecting, for each of a plurality of electrical frequencies, a difference in a characteristic of the first and second portions of the optical signal includes detecting a difference in power spectral density of the first and second portions of the optical signal within a band of electrical frequencies centered about each of the plurality of electrical frequencies.

6. A dispersion discriminator as defined in claim 5, wherein detecting a difference in power spectral density of the first and second portions of the optical signal within a band of electrical frequencies centered about each of the plurality of electrical frequencies includes:
- for each individual one of the plurality of electrical frequencies, filtering the first and second portions of the optical signal within the band of electrical frequencies centered about that individual electrical frequency in order to generate a couple consisting of the power spectral density of the first portion of the optical signal and the power spectral density of the second portion of the optical signal; and
- evaluating the difference between the power spectral densities of the first and second portions of the optical signal for that individual electrical frequency.

7. A dispersion discriminator as defined in claim 6, wherein evaluating the difference between the power spectral densities of the first and second portions of the optical signal for an individual electrical frequency includes evaluating the relative difference between the power spectral densities of the first and second portions of the optical signal for that individual electrical frequency.

8. A dispersion discriminator as defined in claim 7, wherein determining a particular electrical frequency at which said difference falls outside the predetermined range includes determining the lowest electrical frequency at which the relative difference between the power spectral densities of the first and second portions of the optical signal exceeds the predetermined upper bound or falls below the predetermined lower bound.

9. A dispersion discriminator as defined in claim 6, wherein evaluating the difference between the power spectral densities of the first and second portions of the optical signal for an individual electrical frequency includes evaluating the absolute difference between the power spectral densities of the first and second portions of the optical signal for that individual electrical frequency.

10. A dispersion discriminator as defined in claim 9, wherein determining a particular electrical frequency at which said difference falls outside the predetermined range includes determining the lowest electrical frequency at which the absolute difference between the power spectral densities of the first and second portions of the optical signal exceeds the predetermined upper bound or falls below the predetermined lower bound.

11. A dispersion discriminator as defined in claim 6, wherein mapping the particular electrical frequency and the difference at the particular electrical frequency to a magnitude of dispersion in the optical signal includes computing the amount of dispersion by solving an equation relating:
- the particular electrical frequency;
- the predetermined lower and upper bounds;
- the additional amounts of dispersion caused by the first and second arms of said dispersion discriminator.

12. A dispersion discriminator as defined in claim 2, wherein mapping the particular electrical frequency and the difference at the particular electrical frequency to a magnitude of dispersion in the optical signal includes determining the amount of dispersion by consulting a lookup table indexed according to:
- the particular electrical frequency;
- the lower and upper bounds;
- the additional amounts of dispersion caused by the first and second arms of said dispersion discriminator.

13. A dispersion discriminator as defined in claim 2, wherein the dispersion detector includes:
- a first band-pass filter for filtering the first portion of the optical signal within a selectable band of electrical frequencies in order to generate a first indication of the power spectral density of the first portion of the optical signal; and
- a second band-pass filter for filtering the second portion of the optical signal within the same selectable band of electrical frequencies in order to generate a second indication of the power spectral density of the second portion of the optical signal.

14. A dispersion discriminator as defined in claim 13, wherein the dispersion detector further includes:
- a discriminator unit for evaluating a difference between the first and second indications for the selected band of electrical frequencies, said difference in a characteristic of the first and second portions of the optical signal being said difference between the first and second indications for the selected band of electrical frequencies.

15. A dispersion discriminator as defined in claim 14, wherein each distinct band of electrical frequencies is associated with a corresponding center electrical frequency, the dispersion detector further including:

a control unit for selecting the center electrical frequency of the selected band of electrical frequencies and identifying the lowest center electrical frequency at which the relative difference between the first and second indications exceeds the predetermined upper bound or falls below the predetermined lower bound, said lowest center electrical frequency being said particular electrical frequency.

16. A dispersion discriminator as defined in claim 15, wherein said first and second band-pass filters are scanning band-pass filters.

17. The system as defined in claim 15, wherein said first and second band-pass filters are digital filters and wherein the dispersion discriminator further includes:

a first sampler disposed at an entry point to said first band-pass filter, for transforming the first portion of the optical signal received from the first dispersion arm into a first discrete-time sequence; and a first sampler disposed at an entry point to said second band-pass filter, for transforming the second portion of the optical signal received from the second dispersion arm into a second discrete-time sequence.

18. A dispersion discriminator as defined in claim 2, wherein the lower bound is between about −1 dB and about −7 dB and wherein the upper bound is between about +1 dB and about +7 dB.

19. A dispersion discriminator as defined in claim 2, wherein the lower bound is −3 dB and the upper bound is about +3 dB.

20. A dispersion discriminator as defined in claim 2, wherein the lower bound is −12 dB and the upper bound is about +12 dB.

21. A dispersion discriminator as defined in claim 2, further comprising: an optical splitting unit for diverting the first and second portions of the optical signal from a main transmission path.

22. A dispersion discriminator as defined in claim 21, wherein the optical splitting unit includes a first splitter for diverting an intermediate portion of the optical signal from the main transmission path and a second splitter for separating the intermediate portion of the optical signal into the first and second portions of the optical signal.

23. A dispersion discriminator as defined in claim 22, wherein the first splitter is an asymmetric splitter that causes less than 50% of the optical signal on the main transmission path to be diverted to the intermediate portion of the optical signal.

24. A dispersion discriminator as defined in claim 2, wherein the first and second dispersion arms include predetermined lengths of optical fiber having known dispersion properties.

25. A dispersion discriminator as defined in claim 24, wherein at least one of the dispersion arms includes SMF fiber.

26. A dispersion discriminator as defined in claim 24, wherein at least one of the dispersion arm includes NZ-DSF fiber.

27. A dispersion discriminator as defined in claim 2, wherein the first and second dispersion arms cause detectably different additional amounts of dispersion of opposite polarity in the respective first and second portions of the optical signal.

28. A dispersion discriminator as defined in claim 2, wherein the first and second dispersion arms cause substantially equal-magnitude additional amounts of dispersion of opposite polarity in the respective first and second portions of the optical signal.

29. A dispersion discriminator as defined in claim 1, wherein the first and second dispersion arms cause substantially equal-magnitude additional amounts of dispersion of opposite polarity in the respective first and second portions of the optical signal.

30. A dispersion discriminator as defined in claim 3, further comprising first and second photodetectors for converting each of the respective first and second portions of the optical signal into the first and second converted signals, respectively.

31. A dispersion discriminator as defined in claim 2, wherein the optical signal is a broadband optical signal containing multiple distinct optical signals carried by plural carriers at respective optical frequencies.

32. A dispersion discriminator as defined in claim 31, wherein the optical frequencies span at least two ITU grids.

33. A dispersion discriminator as defined in claim 31, further comprising an optical selection stage for selecting one of the plural optical frequencies and allowing only the portion of the broadband optical signal surrounding the selected optical frequency to reach the dispersion detector.

34. A method of determining an amount of dispersion in an amplitude modulated optical signal from first and second portions of the optical signal, the first portion of the optical signal having travelled along a first dispersion arm that adds a first additional amount of dispersion, the second portion of the optical signal having travelled along a second dispersion arm that adds a second additional amount of dispersion, the first and second additional amounts being of opposite polarity, the method comprising:

receiving the first and second portions of the optical signal from the respective dispersion arms;

detecting, for each of a plurality of electrical frequencies, a difference in a characteristic of the first and second portions of the optical signal;

determining a particular electrical frequency at which said difference falls outside a predetermined range; and mapping the particular electrical frequency and the difference at the particular electrical frequency to a magnitude of dispersion in the optical signal.

35. A method as defined in claim 34, wherein mapping the particular electrical frequency and the difference at the particular electrical frequency to a magnitude of dispersion in the optical signal includes computing the amount of dispersion by solving an equation relating:

the particular electrical frequency;

the predetermined lower and upper bounds;

the additional amounts of dispersion caused by the first and second arms of said dispersion discriminator.

36. A method as defined in claim 34, wherein mapping the particular electrical frequency and the difference at the particular electrical frequency to a magnitude of dispersion in the optical signal includes determining the amount of dispersion by consulting a lookup table indexed according to:

the particular electrical frequency;

the lower and upper bounds;

the additional amounts of dispersion caused by the first and second arms of said dispersion discriminator.

37. A method as defined in claim 34, wherein mapping the particular electrical frequency and the difference at the particular electrical frequency to a magnitude of dispersion in the optical signal includes determining the amount of dispersion by interpolating values in a lookup table indexed according to:

the particular electrical frequency;

the lower and upper bounds;

the additional amounts of dispersion caused by the first and second arms of said dispersion discriminator.

* * * * *

UNITED STATES PATENT AND TRADEMARK OFFICE
CERTIFICATE OF CORRECTION

PATENT NO.   : 6,657,186 B2
DATED        : December 2, 2003
INVENTOR(S)  : Alan F. Graves It is certified that error appears in the above-identified patent and that said Letters Patent is hereby corrected as shown below:

<u>Title page,</u>
Item [54], Title, should read:
-- CHROMATIC DISPERSION DISCRIMINATOR HAVING A DISPERSION DETECTOR WITH FREQUENCY MAPPING FUNCTION --

Signed and Sealed this

Twenty-ninth Day of June, 2004

JON W. DUDAS
*Acting Director of the United States Patent and Trademark Office*